(12) United States Patent
Spiewla et al.

(10) Patent No.: US 11,164,585 B2
(45) Date of Patent: Nov. 2, 2021

(54) SYSTEMS AND METHODS FOR VIRTUAL ASSISTANT ROUTING

(71) Applicant: Mitsubishi Electric Automotive America, Inc., Mason, OH (US)

(72) Inventors: Jacek Spiewla, Northville, MI (US); Sorin M. Panainte, Northville, MI (US)

(73) Assignee: Mitsubishi Electric Automotive America, Inc., Mason, OH (US)

( * ) Notice: Subject to any disclaimer, the term of this patent is extended or adjusted under 35 U.S.C. 154(b) by 265 days.

(21) Appl. No.: 16/435,096

(22) Filed: Jun. 7, 2019

(65) Prior Publication Data

US 2020/0388285 A1 Dec. 10, 2020

(51) Int. Cl.
*G10L 15/32* (2013.01)
*H04L 29/08* (2006.01)
*G10L 15/26* (2006.01)

(52) U.S. Cl.
CPC .............. *G10L 15/32* (2013.01); *G10L 15/26* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 6,144,938 A * | 11/2000 | Surace | ................. | G10L 13/033 704/257 |
| 6,757,362 B1 * | 6/2004 | Cooper | ................. | H04M 3/527 379/88.01 |
| 7,486,649 B2 * | 2/2009 | Marsico | ................. | H04L 51/38 370/338 |
| 8,660,849 B2 * | 2/2014 | Gruber | ............. | H04M 1/72484 704/275 |
| 9,172,747 B2 | 10/2015 | Walters et al. | | |
| 9,229,734 B2 * | 1/2016 | Hulse | ................. | H04N 21/231 |

(Continued)

FOREIGN PATENT DOCUMENTS

WO    WO 2018/009897    1/2018

OTHER PUBLICATIONS

Harman—Intelligent Personal Digital Assistant Solution; available at http://info.services.harman.com/rs/378-OMF-030/images/Factsheet_HCS_Auto_Intelligent_Personal_Digital_Assistant_Solution.pdf ; Downloaded from Internet on Jun. 10, 2019.

(Continued)

*Primary Examiner* — Neeraj Sharma
(74) *Attorney, Agent, or Firm* — Leydig, Voit & Mayer, Ltd.

(57) ABSTRACT

Systems, methods and software are disclosed for processing requests from users of an infotainment system. The method includes receiving a request from a user of the infotainment system. The method includes determining a domain for the received request based on information contained in the received request. The domain specifies one or more categories for the request. The method includes routing the received request to a virtual assistant assigned to handle requests for the determined domain. The virtual assistant is one of a plurality of virtual assistants respectively assigned to handle requests for a plurality of respectively assigned domains. The method includes transmitting a response to the request to the user.

11 Claims, 18 Drawing Sheets

(56) References Cited

U.S. PATENT DOCUMENTS

| | | | |
|---|---|---|---|
| 2005/0033582 A1* | 2/2005 | Gadd | G06Q 30/02 |
| | | | 704/277 |
| 2015/0078581 A1 | 3/2015 | Etter et al. | |
| 2015/0186154 A1 | 7/2015 | Brown et al. | |
| 2017/0017694 A1* | 1/2017 | Roytman | H04M 3/51 |
| 2017/0242860 A1 | 8/2017 | Souche et al. | |
| 2018/0054464 A1* | 2/2018 | Zhang | H04L 65/1096 |
| 2018/0293484 A1 | 10/2018 | Wang et al. | |
| 2018/0314689 A1 | 11/2018 | Wang et al. | |
| 2019/0013019 A1 | 1/2019 | Lawrence | |
| 2019/0378019 A1* | 12/2019 | Scheutz | G06N 5/02 |
| 2020/0167597 A1* | 5/2020 | Nguyen | G06F 3/011 |
| 2020/0175983 A1* | 6/2020 | Goodman | G06F 9/453 |
| 2020/0302923 A1* | 9/2020 | Ni | G10L 15/30 |

OTHER PUBLICATIONS

U.S. Patent and Trademark Office, International Search Report and the Written Opinion in International Application No. PCT/US2019/064658 (dated Feb. 7, 2020).

* cited by examiner

SYSTEMS AND METHODS FOR VIRTUAL ASSISTANT ROUTING

TECHNICAL FIELD

The present disclosure relates to infotainment systems, and, more particularly, to systems and methods for virtual assistant routing used with infotainment systems.

BACKGROUND

Infotainment systems provide users information and fulfil requests in a number of contexts such as automobiles and at home. Apart from the convenience of using infotainment systems, in some contexts, infotainment systems are relied upon more and more for safety purposes, including in times of emergency. At least some known infotainment systems rely upon a single information source via remote network communication. In the event the single source is unavailable, some known systems do not provide an alternate means of obtaining information. In other such systems, a single information source may be very well suited for providing information responsive to particular request categories, but not as well suited as compared to other information sources with respect to other request categories.

At least some known infotainment systems may require users to make multiple requests separately in time, rather than in a single spoken phrase, for example. Similarly, in cases of infotainment users making various requests at or about the same time, some such systems may not be able to respond accordingly in a speedy, accurate and/or responsive manner. For these, and other reasons, known systems and methods for processing and routing requests via infotainment systems may pose impediments to user comfort and convenience and, in cases such as driving or riding in a vehicle, may pose safety risks to users due to undue inconvenience and potential distraction during operation.

SUMMARY

The systems and methods for virtual assistant routing disclosed herein present a new and improved methodology and system architecture for processing and routing virtual assistant requests and responses thereto. Users of the systems, methods and software described herein are provided with a more comfortable, user-friendly, responsive, and safe interface for making virtual assistant requests and receiving prompt and accurate responses from pertinent and reliable sources of information. Technical effects and user advantages such as these may be enjoyed in either single- or multi-user contexts, including vehicles such as automobiles. In contexts like driving or riding in an automobile, user(s) operating and/or otherwise interacting with the infotainment systems and related methods and software disclosed herein are provided with convenient and effective information and/or fulfillment of their various requests in manner that is less prone to cause undue distraction and discomfort for the driver, and thus safety and comfort of all vehicle occupants is substantially improved.

In a first aspect of the disclosure, a method for processing requests from users of an infotainment system is provided. The method includes the steps of: receiving a request from a user of the infotainment system; determining a domain for the received request based on information contained in the received request; routing the received request to a virtual assistant assigned to handle requests for the determined domain; and transmitting a response to the request to the user.

In one embodiment of the method of the first aspect, the virtual assistant may be one of a plurality of virtual assistants respectively assigned to handle requests for a plurality of respectively assigned domains. In the embodiment, the step of routing the received request to the virtual assistant may include routing the received request to one of the plurality of virtual assistants respectively assigned to handle requests for the determined domain.

In any of the above-described embodiments of the method of the first aspect, the method may further include the steps of: receiving configuration information for assigning at least one domain to be handled by at least one of the plurality of virtual assistants; storing the configuration information in at least one memory device; and mapping the at least one domain to the at least one of the plurality of virtual assistants based on the received configuration information.

In any of the above-described embodiments of the method of the first aspect, the step of receiving the configuration information may include receiving the configuration information via a graphical user interface (GUI).

In any of the above-described embodiments of the method of the first aspect, the step of receiving the request may include receiving the request from the user as speech; and the step of determining the domain for the received request may include determining the domain for the received request based on information contained in the speech.

In any of the above-described embodiments of the method of the first aspect, the method may further include the step of identifying a spoken language based on the information contained in the received speech. In the embodiment, the step of transmitting the response to the user may include transmitting the response in the identified spoken language.

In any of the above-described embodiments of the method of the first aspect, the step of determining the domain for the received request may include mapping the received request to the domain based on the information contained in the received request.

In any of the above-described embodiments of the method of the first aspect, the step of receiving the request may include receiving the request as a compound request including two or more requests from the user; the step of mapping the received request to the domain may include iteratively mapping each of the two or more requests to one of the respectively assigned domains; and the step of routing the received request to the virtual assistant may include iteratively routing each of the two or more requests to the one of the plurality of virtual assistants assigned to handle requests for each of the respectively determined domains.

In any of the above-described embodiments of the method of the first aspect: the step of receiving the request includes receiving the request as a compound request including two or more requests from the user; the step of determining the domain for the received request includes iteratively determining a respective domain for each of the two or more requests; and the step of routing the received request to the virtual assistant includes iteratively routing each of the two or more requests to the one of the plurality of virtual assistants assigned to handle requests for each respectively determined domain.

In any of the above-described embodiments of the method of the first aspect, the step of receiving the configuration information may include receiving a designation of a default virtual assistant that is different from the virtual assistant.

In any of the above-described embodiments of the method of the first aspect, the method may further include the step of determining the availability of the one of the plurality of virtual assistants respectively assigned to handle requests for the determined domain. In the embodiment, the step of determining the availability of the one of the plurality of virtual assistants respectively assigned to handle requests for the determined domain may include: if, after a first request transmission attempt, the one of the plurality of virtual assistants assigned to handle requests for the determined domain is not available, then for at least a second attempt, retransmitting the request to the one of the plurality of virtual assistants. In the embodiment, the method may further include the step of transmitting the request to the default virtual assistant. In the embodiment, the step of transmitting the request to the default virtual assistant may include: transmitting the request to the default virtual assistant when, after the at least a second attempt, the one of the plurality of virtual assistants is not available. In the embodiment, the method may further include the step of determining an availability of the default virtual assistant, where determining the availability of the default assistant includes: if, after at least a first request transmission attempt, the default assistant is not available, then for at least a second attempt, retransmitting the request to the default virtual assistant. In the embodiment, when, after the at least a second attempt, the default virtual assistant is not available, then the method may further include the step of transmitting a message to the user indicating that no virtual assistants are available.

In any of the above-described embodiments of the method of the first aspect, the step of routing the received request to the virtual assistant may include determining an availability of the one of the plurality of virtual assistants respectively assigned to handle requests for the determined domain. In the embodiment, if the one of the plurality of virtual assistants assigned to handle requests for the determined domain is available, then the step of routing the received request to the virtual assistant may include transmitting the request to the one of the plurality of virtual assistants. In the embodiment, if the one of the plurality of virtual assistants assigned to handle requests for the determined domain is not available, then the step of routing the received request to the virtual assistant may include transmitting the request to the default virtual assistant.

In any of the above-described embodiments of the method of the first aspect, the step of routing the received request to the virtual assistant may include: transmitting the request to the one of the plurality of virtual assistants; and determining an availability of the one of the plurality of virtual assistants respectively assigned to handle requests for the determined domain.

In any of the above-described embodiments of the method of the first aspect, if the one of the plurality of virtual assistants assigned to handle requests for the determined domain is not available, then the method may further include the step of retransmitting, for up to a predetermined number of iterations, the request to the one of the plurality of virtual assistants until it is determined that the one of the plurality of virtual assistants is available. In the embodiment, if the one of the plurality of virtual assistants assigned to handle requests for the determined domain is not available, then the method may further include the step of: transmitting the request to the default virtual assistant.

In any of the above-described embodiments of the method of the first aspect, the method may further comprise the step of: determining an availability of the default assistant to handle the request. In the embodiment, if the default virtual assistant is not available, then the method may further include the step of: retransmitting, for up to a predetermined number of iterations, the request to the default assistant until it is determined that the default virtual assistant is available. In the embodiment, if the default virtual assistant is not available, then the method may further include the step of transmitting a message to the user indicating that no virtual assistants are available for processing requests.

In any of the above-described embodiments of the method of the first aspect, the method may further include the steps of: if one or more of the virtual assistants and/or the default virtual assistant is/are not available, then the method may further include the step of: retransmitting, after a predetermined period of time has elapsed, the request to the one of more virtual assistants and/or the default assistant until it is determined that the one of more virtual assistants and/or the default assistant is/are available. In the embodiment, the method may further include the step of transmitting a message to the user indicating that a reattempt to transmit the request to the one or more of the virtual assistants and/or the default virtual assistant will be made after the predetermined period of time has elapsed.

In any of the above-described embodiments of the method of the first aspect, one or more messages transmitted to the user may be transmitted as audible speech and/or text. In the embodiment, for the one or more messages transmitted to the user as text, the text of the one or more messages may be transmitted to the user via a display screen, which may include a GUI.

In any of the above-described embodiments of the method of the first aspect, the method may further include the step of determining a spoken language of the user based on the received speech.

In any of the above-described embodiments of the method of the first aspect, the one or more messages transmitted to the user may be transmitted to the user in the determined spoken language.

In any of the above-described embodiments of the method of the first aspect, the step of transmitting the response to the request to the user may include transmitting the response in the determined spoken language.

In any of the above-described embodiments of the method of the first aspect, the method may further include the step of storing recorded audio of the received speech.

In any of the above-described embodiments of the method of the first aspect, the method may further include the step of transmitting the stored audio to a text-to-speech (TTS) engine for voice model generation.

In any of the above-described embodiments of the method of the first aspect, the step of storing recorded audio of the received speech may include storing the recorded audio of the received speech of one or more requests received from the user.

In any of the above-described embodiments of the method of the first aspect, the method may further include the step of determining a file size of the stored audio.

In any of the above-described embodiments of the method of the first aspect, the step of transmitting the stored audio to the TTS engine may include transmitting the stored audio to the TTS engine when the stored audio attains a predetermined file size.

In any of the above-described embodiments of the method of the first aspect, the method may further include the step of transmitting a message to the user requesting a user permission status to transmit the stored audio to a text-to-speech (TTS) engine.

In any of the above-described embodiments of the method of the first aspect, the method may further include the step of receiving the user permission status from the user for whom the recorded audio of the request received as speech was stored. In the embodiment, if an affirmative user permission status is received, then the method may further include the steps of: transmitting the stored audio to the TTS engine; receiving the generated voice model from the TTS engine; and storing the received voice model according to a user identity of the user for whom the recorded audio of the request received as speech was stored. In the embodiment, if a negative user permission status is received, then the method may further include the step of deleting the stored audio of the user for whom the recorded audio of the request received as speech was stored.

In any of the above-described embodiments of the method of the first aspect, the user may include one or more users of the infotainment system. In the embodiment, the method may further include the step of storing recorded audio of a speech sample of the one or more users.

In any of the above-described embodiments of the method of the first aspect, the method may further include the step of transmitting a message to the one or more users for whom the recorded audio of the speech sample was stored requesting a permission status to transmit the stored audio of the speech sample to a TTS engine.

In any of the above-described embodiments of the method of the first aspect, the method may further include the step of receiving the user permission status from the one or more users for whom the recorded audio of the speech sample was stored. In the embodiment, if an affirmative user permission status is received, then the method may further include the steps of: transmitting the stored audio of the speech sample to the TTS engine; receiving the generated voice model from the TTS engine; and storing the received voice model according to a user identity of the one or more users for whom the recorded audio of the speech sample was stored. In the embodiment, if a negative user permission status is received, the method may further include the step of deleting the stored audio of the speech sample of the one or more users for whom the recorded audio of the speech sample was stored.

In any of the above-described embodiments of the method of the first aspect, the method may further include the steps of: determining a spoken language of the user based on the received speech of the user; and selecting a language model according to the determined spoken language for at least one of: speech to text conversion, and text to speech conversion, in one or more of the receiving, determining, routing, and transmitting steps of the method. In the embodiment, the step of transmitting the response to the request to the user may include transmitting the response in the determined spoken language.

In any of the above-described embodiments of the method of the first aspect, the step of receiving the request may include receiving a plurality of requests from a plurality of users of the infotainment system.

In any of the above-described embodiments of the method of the first aspect, the step of receiving the plurality of requests from the plurality of users may include concurrently receiving the plurality of requests from the plurality of users.

In any of the above-described embodiments of the method of the first aspect, the request received as speech may include a multi-user speech signal. In the embodiment, the method may further include the step of separating the multi-user speech signal into a plurality of individual speech signals for each of the plurality of users.

In any of the above-described embodiments of the method of the first aspect, the step of transmitting the response to the request to the user may include iteratively transmitting a plurality of responses to each of the plurality of requests.

In any of the above-described embodiments of the method of the first aspect, the method may further include the step of determining a time of arrival (TOA) for each of the plurality of individual speech signals.

In any of the above-described embodiments of the method of the first aspect, the step of transmitting the response to the request to the user may include iteratively transmitting a plurality of responses to each of the plurality of requests.

In any of the above-described embodiments of the method of the first aspect, the method may further include the step of determining a rank order of determined TOAs.

In any of the above-described embodiments of the method of the first aspect, the step of iteratively transmitting the plurality of responses may include first transmitting one of the plurality of responses having the least determined TOA.

In any of the above-described embodiments of the method of the first aspect, the method may further include receiving configuration information for prioritizing iteratively transmitting the plurality of responses to each of the plurality of requests according to an ascending order of determined TOA.

In any of the above-described embodiments of the method of the first aspect, the step of iteratively transmitting the plurality of responses may include first transmitting one of the plurality of responses having the greatest determined TOA.

In any of the above-described embodiments of the method of the first aspect, the method may further include the step of receiving configuration information for prioritizing iteratively transmitting the plurality of responses to each of the plurality of requests according to a descending order of determined TOA.

In any of the above-described embodiments of the method of the first aspect, the method may further include the step of determining, for each of the plurality of individual speech signals, a processing time for determining the domain for the received request based on the information contained in the received request.

In any of the above-described embodiments of the method of the first aspect, the step of transmitting the response to the request to the user may include iteratively transmitting a plurality of responses to each of the plurality of requests.

In any of the above-described embodiments of the method of the first aspect, the method may further include the step of determining a rank order of determined processing times.

In any of the above-described embodiments of the method of the first aspect, the step of iteratively transmitting the plurality of responses may include first transmitting one of the plurality of responses having the least determined processing time.

In any of the above-described embodiments of the method of the first aspect, the step of iteratively transmitting the plurality of responses may include first transmitting one of the plurality of responses having the greatest determined processing time.

In any of the above-described embodiments of the method of the first aspect, the method may further include the step of receiving configuration information for prioritizing iteratively transmitting the plurality of responses to each of the plurality of requests according to an ascending order of determined processing time.

In any of the above-described embodiments of the method of the first aspect, the method may further include the step of receiving configuration information for prioritizing iteratively transmitting the plurality of responses to each of the plurality of requests according to a descending order of determined processing time.

In any of the above-described embodiments of the method of the first aspect, the step of receiving configuration information for prioritizing iteratively transmitting the plurality of responses may include receiving a user priority scheme for prioritizing iteratively transmitting the plurality of responses.

In any of the above-described embodiments of the method of the first aspect, the user priority scheme may specify that a response to a first user is transmitted before a response is transmitted to at least a second user.

In any of the above-described embodiments of the method of the first aspect, each of the plurality of users may be positioned in a plurality of spatially-separated audio zones.

In any of the above-described embodiments of the method of the first aspect, the method may further include the step of determining a respective one of the plurality of spatially-separated audio zones from where one or more of the plurality of requests originated.

In any of the above-described embodiments of the method of the first aspect, the step of determining the respective one of the plurality of spatially-separated audio zones from where one or more of the plurality of requests originated may include determining the respective one of the plurality of spatially-separated audio zones from where one or more of the plurality of requests originated based on one or more of: a comparison between amplitudes of received signals in the multi-user speech signal, and a comparison between TOAs of received signals in the multi-user speech signal.

In any of the above-described embodiments of the method of the first aspect, the at least two of the plurality of spatially-isolated audio zones may include a respective one or more audio loadspeakers. In the embodiment, the step of transmitting the response to the request to the user may include transmitting each of the plurality of responses to the respective one or more audio loudspeakers according to the determined respective one of the plurality of spatially-separated audio zones.

In any of the above-described embodiments of the method of the first aspect, each of the plurality of spatially-isolated audio zones may include a respective one or more audio loudspeakers. In the embodiment, the step of transmitting the response to the request to the user may include transmitting each of the plurality of responses to the respective one or more audio loudspeakers according to the determined respective one of the plurality of spatially-separated audio zones.

In any of the above-described embodiments of the method of the first aspect, the method may further include the step of determining an identity of each of the plurality of spatially-separated audio zones from where the one or more of the plurality of requests originated.

In any of the above-described embodiments of the method of the first aspect, the step of determining the identity of the each of the plurality of spatially-separated audio zones may include comparing each of the plurality of spatially-separated audio zones from where the one or more requests originated to one or more stored pre-registered audio zone profiles.

In any of the above-described embodiments of the method of the first aspect, the method may further include the step of receiving configuration information for registering audio zone profile(s) for one or more of the plurality of spatially-separated audio zones. In the embodiment, the audio zone profile(s) may include a name and/or a location for the one or more of the plurality of spatially-separated audio zones.

In any of the above-described embodiments of the method of the first aspect, the method may further include the step of prepending a name of a respectively determined audio zone identity to each of the plurality of responses. In the embodiment, the step of transmitting the response to the request to the user may include transmitting the name of the respectively determined audio zone identity prior to transmitting the response.

In any of the above-described embodiments of the method of the first aspect, the method may further include the steps of: determining an identity of each of the plurality of users from whom one or more of the plurality of requests originated; and prepending a name of a respectively determined user identity to each of a plurality of responses to each of the plurality of requests. In the embodiment, the step of transmitting the response to the request to the user may include transmitting the name of the respectively determined user identity prior to transmitting the response.

In any of the above-described embodiments of the method of the first aspect, the method may further include the step of determining an identity of each of the plurality of users from whom the one or more of the plurality of requests originated based on the plurality of individual speech signals.

In any of the above-described embodiments of the method of the first aspect, the step of determining the identity of each of the plurality of users may include comparing each of the plurality of users from whom the one or more of the plurality of requests originated to one or more stored pre-registered user profiles.

In any of the above-described embodiments of the method of the first aspect, the method may further include the steps of: receiving configuration information for registering user profile(s) for one or more users of the infotainment system; and storing this received configuration information in at least one memory device. In the embodiment, the user profile(s) may include at least one of a first name, a last name, a nickname, and a title, for the one or more users.

In any of the above-described embodiments of the method of the first aspect, the method may further include the step of prepending a name of a respectively determined user identity to each of the plurality of responses. In the embodiment, the step of transmitting the response to the request to the user comprises transmitting the name of the respectively determined user identity prior to transmitting the response.

In any of the above-described embodiments of the method of the first aspect, the method may further include the step of prepending the name of a respectively determined user identity, and the name of a respectively determined audio zone identity, to each of the plurality of responses.

In any of the above-described embodiments of the method of the first aspect, the method may further include the step of rephrasing the received request. In the embodiment, the step of rephrasing the request may include determining a rephrased request based on the information contained in the request.

In any of the above-described embodiments of the method of the first aspect, the method may further include the step of prepending the rephrased request to the response to the request. In the embodiment, the step of transmitting the response to the request to the user may include transmitting the rephrased request prior to transmitting the response to the received request.

In any of the above-described embodiments of the method of the first aspect, the method may further include the step of receiving configuration information for an audible speech response style for transmitting the response to the request to the user. In the embodiment, the response style for transmitting the response to the request to the user may include a voice gender, a volume, a spoken language, and a speech rate (e.g., words per minute).

In any of the above-described embodiments of the method of the first aspect, the method may further include the step of converting the information contained in the received speech from speech to request text.

In any of the above-described embodiments of the method of the first aspect, the step of determining the domain for the received request based on information contained in the speech may include determining the domain for the received request based on information contained in the request text.

In any of the above-described embodiments of the method of the first aspect, the step of routing the received request to the virtual assistant may include transmitting the request text to the virtual assistant.

In any of the above-described embodiments of the method of the first aspect, the method may further include the steps of: receiving response text from the virtual assistant; and converting the response text to response speech for transmitting the response to the request to the user.

In a second aspect of the disclosure, a system for processing requests from users of an infotainment system is provided. The system includes: one or more input/output (I/O) devices for: receiving a request from a user of the infotainment system, and communicating a response to the request to the user; a transceiver for: transmitting the request to a virtual assistant, and receiving a response to the request from the virtual assistant; at least one memory device; and at least one processor in communication with: the one or more I/O devices, the transceiver, and the at least one memory device. The at least one processor of the system is programmed to: receive the request from the input device; determine a domain for the received request based on information contained in the received request, the domain specifying one or more categories for the request; route the received request to the virtual assistant assigned to handle requests for the determined domain, where the virtual assistant is one of a plurality of virtual assistants respectively assigned to handle requests for a plurality of respectively assigned domains; and transmit the response to the request to the user.

In one embodiment of the system of the second aspect, the virtual assistant may be one of a plurality of virtual assistants respectively assigned to handle requests for a plurality of respectively assigned domains. In the embodiment, to route the received request to the virtual assistant, the at least one processor may be further programmed to route the received request to one of the plurality of virtual assistants respectively assigned to handle requests for the determined domain.

In any of the above-described embodiments of the system of the second aspect, the at least one processor may be further programmed to: receive configuration information for assigning at least one domain to be handled by at least one of the plurality of virtual assistants; store the configuration information in the at least one memory device; and map the at least one domain to the at least one of the plurality of virtual assistants based on the received configuration information.

In any of the above-described embodiments of the system of the second aspect, the one or more I/O devices may include at least one display screen. In the embodiment, to receive the configuration information, the at least one processor may be further programmed to: display a GUI to the user on the at least one display screen; receive the configuration information from the user via the GUI; and store the configuration information in the at least one memory device.

In any of the above-described embodiments of the system of the second aspect, the one or more I/O devices may include at least one microphone. In the embodiment: to receive the request, the at least one processor may be further programmed to receive the request from the user as speech via the microphone; and to determine the domain for the received request, the at least one processor may be further programmed to determine the domain for the received request based on information contained in the speech.

In any of the above-described embodiments of the system of the second aspect, the at least one processor may be further programmed to identify a spoken language based on the information contained in the received speech. In the embodiment, to transmit the response to the user, the at least one processor may be further programmed to transmit the response in the identified spoken language.

In any of the above-described embodiments of the system of the second aspect, to determine the domain for the received request, the at least one processor may be further programmed to map the received request to the domain based on the information contained in the received request.

In any of the above-described embodiments of the system of the second aspect: to receive the request, the at least one processor may be further programmed to receive the request as a compound request including two or more requests from the user; to map the received request to the domain, the at least one processor may be further programmed to iteratively map each of the two or more requests to one of the respectively assigned domains; and to route the received request to the virtual assistant, the at least one processor may be further programmed to iteratively route each of the two or more requests to the one of the plurality of virtual assistants assigned to handle requests for each of the respectively determined domains.

In any of the above-described embodiments of the system of the second aspect: to receive the request, the at least one processor may be further programmed to receive the request as a compound request including two or more requests from the user; to determine the domain for the received request, the at least one processor may be further programmed to iteratively determine a respective domain for each of the two or more requests; and to route the received request to the virtual assistant, the at least one processor may be further programmed to iteratively route each of the two or more requests to the one of the plurality of virtual assistants assigned to handle requests for each respectively determined domain.

In any of the above-described embodiments of the system of the second aspect, to receive the configuration information, the at least one processor may be further programmed to receive a designation of a default virtual assistant that is different from the virtual assistant.

In any of the above-described embodiments of the system of the second aspect, the at least one processor may be further programmed to determine the availability of the one of the plurality of virtual assistants respectively assigned to handle requests for the determined domain. In the embodiment, to determine the availability of the one of the plurality of virtual assistants respectively assigned to handle requests for the determined domain, the at least one processor may be further programmed to: if, after a first request transmission attempt, the one of the plurality of virtual assistants assigned to handle requests for the determined domain is not available, then for at least a second attempt, retransmit the request to the one of the plurality of virtual assistants. In the embodiment, the at least one processor may be further programmed to transmit the request to the default virtual assistant. In the embodiment, to transmit the request to the default virtual assistant, the at least one processor may be further programmed to: transmit the request to the default virtual assistant when, after the at least a second attempt, the one of the plurality of virtual assistants is not available. In the embodiment, the at least one processor may be further programmed to determine an availability of the default virtual assistant. To determine the availability of the default assistant, the at least one processor may be further programmed to: if, after at least a first request transmission attempt, the default assistant is not available, then for at least a second attempt, retransmit the request to the default virtual assistant. In the embodiment, when, after the at least a second attempt, the default virtual assistant is not available, then the at least one processor may be further programmed to: transmit a message to the user indicating that no virtual assistants are available.

In any of the above-described embodiments of the system of the second aspect, to route the received request to the virtual assistant, the at least one processor may be further programmed to determine an availability of the one of the plurality of virtual assistants respectively assigned to handle requests for the determined domain. In the embodiment, if the one of the plurality of virtual assistants assigned to handle requests for the determined domain is available, then the at least one processor may be further programmed to transmit the request to the one of the plurality of virtual assistants. In the embodiment, if the one of the plurality of virtual assistants assigned to handle requests for the determined domain is not available, the at least one processor may be further programmed to transmit the request to the default virtual assistant.

In any of the above-described embodiments of the system of the second aspect, to route the received request to the virtual assistant, the at least one processor may be further programmed to: transmit the request to the one of the plurality of virtual assistants; and determine an availability of the one of the plurality of virtual assistants respectively assigned to handle requests for the determined domain.

In any of the above-described embodiments of the system of the second aspect, if the one of the plurality of virtual assistants assigned to handle requests for the determined domain is not available, then the at least one processor may be further programmed to: retransmit, for up to a predetermined number of iterations, the request to the one of the plurality of virtual assistants until it is determined that the one of the plurality of virtual assistants is available. In the embodiment, if the one of the plurality of virtual assistants assigned to handle requests for the determined domain is not available, the at least one processor may be further programmed to transmit the request to the default virtual assistant.

In any of the above-described embodiments of the system of the second aspect, the at least one processor may be further programmed to determine an availability of the default assistant to handle the request. In the embodiment, if the default virtual assistant is not available, then the at least one processor may be further programmed to retransmit, for up to a predetermined number of iterations, the request to the default assistant until it is determined that the default virtual assistant is available. In the embodiment, if the default virtual assistant is not available, then the at least one processor may be further programmed to transmit a message to a user indicating that no virtual assistants are available for processing requests.

In any of the above-described embodiments of the system of the second aspect: if one or more of the virtual assistants and/or the default virtual assistant is/are not available, then the at least one processor may be further programmed to retransmit, after a predetermined period of time has elapsed, the request to the one or more of the virtual assistants and/or the default assistant until it is determined that the one of more virtual assistants and/or the default assistant is/are available. In the embodiment, the at least one processor may be further programmed to transmit a message to the user indicating that a reattempt to transmit the request to the one or more of the virtual assistants and/or the default virtual assistant will be made after the predetermined period of time has elapsed.

In any of the above-described embodiments of the system of the second aspect, one or more messages transmitted to the user may be transmitted as audible speech and/or text. In the embodiment, for the one or more messages transmitted to the user as text, the text of the one or more messages may be transmitted to the user via a display screen, which may include a GUI.

In any of the above-described embodiments of the system of the second aspect, the at least one processor may be further programmed to determine a spoken language of the user based on the received speech.

In any of the above-described embodiments of the system of the second aspect, the one or more messages transmitted to the user may be transmitted to the user in the determined spoken language.

In any of the above-described embodiments of the system of the second aspect, to transmit the response to the request to the user, the at least one processor may be further programmed to transmit the response in the determined spoken language.

In any of the above-described embodiments of the system of the second aspect, the at least one processor may be further programmed to store recorded audio of the received speech in the at least one memory device.

In any of the above-described embodiments of the system of the second aspect, the at least one processor may be further programmed to transmit the stored audio to a TTS engine for voice model generation.

In any of the above-described embodiments of the system of the second aspect, to store the recorded audio of the received speech, the at least one processor may be further programmed to store the recorded audio of the received speech of one or more requests received from the user.

In any of the above-described embodiments of the system of the second aspect, the at least one processor may be further programmed to determine a file size of the stored audio.

In any of the above-described embodiments of the system of the second aspect, to transmit the stored audio to the TTS engine, the at least one processor may be further programmed to transmit the stored audio to the TTS engine when the stored audio attains a predetermined file size.

In any of the above-described embodiments of the system of the second aspect, the at least one processor may be further programmed to transmit a message to the user requesting a user permission status to transmit the stored audio to the TTS engine.

In any of the above-described embodiments of the system of the second aspect, the at least one processor may be further programmed to receive the user permission status from the user for whom the recorded audio of the request received as speech was stored. In the embodiment, if an affirmative user permission status is received, then the at least one processor may be further programmed to: transmit the stored audio to the TTS engine; receive the generated voice model from the TTS engine; and store the received voice model in the at least one memory device according to a user identity of the user for whom the recorded audio of the request received as speech was stored. In the embodiment, if a negative user permission status is received, then the at least one processor may be further programmed to delete the stored audio of the user for whom the recorded audio of the request received as speech was stored from the at least one memory device.

In any of the above-described embodiments of the system of the second aspect, the user may include one or more users of the infotainment system. In the embodiment, the at least one processor may be further programmed to store recorded audio of a speech sample of the one or more users in the at least one memory device.

In any of the above-described embodiments of the system of the second aspect, the at least one processor may be further programmed to transmit a message to the one of more users for whom the recorded audio of the speech sample was stored requesting a permission status to transmit the stored audio of the speech sample to a TTS engine.

In any of the above-described embodiments of the system of the second aspect, the at least one processor may be further programmed to receive the user permission status from the one or more users for whom the recorded audio of the speech sample was stored. In the embodiment, if an affirmative user permission status is received, then the at least one processor may be further programmed to: transmit the stored audio of the speech sample to the TTS engine; receive the generated voice model from the TTS engine; and store the received voice model in the at least one memory device according to a user identity of the one or more users for whom the recorded audio of the speech sample was stored. In the embodiment, if a negative user permission status is received, then the at least one processor may be further programmed to delete the stored audio of the speech sample of the one or more users for whom the recorded audio of the speech sample was stored from the at least one memory device.

In any of the above-described embodiments of the system of the second aspect, the at least one processor may be further programmed to: determine a spoken language of the user based on the received speech of the user; and select a language model according to the determined spoken language for at least one of: speech to text conversion, and text to speech conversion, for one or more of the receiving, determining, routing, and transmitting operations of the at least one processor. In the embodiment, to transmit the response to the request to the user may, the at least one processor may be further programmed to transmit the response in the determined spoken language.

In any of the above-described embodiments of the system of the second aspect, to receive the request, the at least one processor may be further programmed to receive a plurality of requests from a plurality of users of the infotainment system.

In any of the above-described embodiments of the system of the second aspect, to receive the plurality of requests from the plurality of users, the at least one processor may be further programmed to receive the plurality of requests from the plurality of users.

In any of the above-described embodiments of the system of the second aspect, the request received as speech may include a multi-user speech signal. In the embodiment, the at least one processor may be further programmed to separate the multi-user speech signal into a plurality of individual speech signals for each of the plurality of users.

In any of the above-described embodiments of the system of the second aspect, to transmit the response to the request to the user, the at least one processor may be further programmed to iteratively transmit a plurality of responses to each of the plurality of requests.

In any of the above-described embodiments of the system of the second aspect, the at least one processor may be further programmed to determine a TOA for each of the plurality of individual speech signals.

In any of the above-described embodiments of the system of the second aspect, to transmit the response to the request to the user, the at least one processor may be further programmed to iteratively transmit a plurality of responses to each of the plurality of requests.

In any of the above-described embodiments of the system of the second aspect, the at least one processor may be further programmed to determine a rank order of determined TOAs.

In any of the above-described embodiments of the system of the second aspect, to iteratively transmit the plurality of responses, the at least one processor may be further programmed to first transmit one of the plurality of responses having the least determined TOA.

In any of the above-described embodiments of the system of the second aspect, the at least one processor may be further programmed to: receive configuration information for prioritizing iteratively transmitting the plurality of responses to each of the plurality of requests according to an ascending order of determined TOA; and store the configuration information for prioritizing iteratively transmitting the plurality of responses in the at least one memory device.

In any of the above-described embodiments of the system of the second aspect, to iteratively transmit the plurality of responses, the at least one processor may be further programmed to first transmit one of the plurality of responses having the greatest determined TOA.

In any of the above-described embodiments of the system of the second aspect, the at least one processor may be further programmed to: receive configuration information for prioritizing iteratively transmitting the plurality of responses to each of the plurality of requests according to a descending order of determined TOA; and store the configuration information for prioritizing iteratively transmitting the plurality of responses in the at least one memory device.

In any of the above-described embodiments of the system of the second aspect, the at least one processor may be further programmed to, for each of the plurality of individual speech signals, determine a processing time for determining the domain for the received request based on the information contained in the received request.

In any of the above-described embodiments of the system of the second aspect, to transmit the response to the request to the user, the at least one processor may be further programmed to iteratively transmit a plurality of responses to each of the plurality of requests.

In any of the above-described embodiments of the system of the second aspect, the at least one processor may be further programmed to determine a rank order of determined processing times.

In any of the above-described embodiments of the system of the second aspect, to iteratively transmit the plurality of responses, the at least one processor may be further programmed to first transmit one of the plurality of responses having the least determined processing time.

In any of the above-described embodiments of the system of the second aspect, to iteratively transmit the plurality of responses, the at least one processor may be further programmed to first transmit one of the plurality of responses having the greatest determined processing time.

In any of the above-described embodiments of the system of the second aspect, the at least one processor may be further programmed to: receive configuration information for prioritizing iteratively transmitting the plurality of responses to each of the plurality of requests according to an ascending order of determined processing time; and store the configuration information for prioritizing iteratively transmitting the plurality of responses in the at least one memory device.

In any of the above-described embodiments of the system of the second aspect, the at least one processor may be further programmed to receive configuration information for prioritizing iteratively transmitting the plurality of responses to each of the plurality of requests according to a descending order of determined processing times.

In any of the above-described embodiments of the system of the second aspect, to receive the configuration information for prioritizing iteratively transmitting the plurality of responses, the at least one processor may be further programmed to receive a user priority scheme for prioritizing iteratively transmitting the plurality of responses.

In any of the above-described embodiments of the system of the second aspect, the user priority scheme may specify that a response to a first user is transmitted before a response is transmitted to at least a second user.

In any of the above-described embodiments of the system of the second aspect, each of the plurality of users may be positioned in a plurality of spatially-separated audio zones.

In any of the above-described embodiments of the system of the second aspect, the at least one processor may be further programmed to determine a respective one of the plurality of spatially-separated audio zones from where one or more of the plurality of requests originated.

In any of the above-described embodiments of the system of the second aspect, to determine the respective one of the plurality of spatially-separated audio zones from where one or more of the plurality of requests originated, the at least one processor may be further programmed to: determine the respective one of the plurality of spatially-separated audio zones from where one or more of the plurality of requests originated based on one or more of: a comparison between amplitudes of received signals in the multi-user speech signal, and a comparison between TOAs of received signals in the multi-user speech signal.

In any of the above-described embodiments of the system of the second aspect: the one or more I/O devices may include a plurality of audio loudspeakers; at least two of the plurality of spatially-isolated audio zones may include a respective one or more audio loudspeakers of the plurality of audio loudspeakers; and to transmit the response to the request to the user, the at least one processor may be further programmed to transmit each of the plurality of responses to the respective one or more audio loudspeakers according to the determined respective one of the plurality of spatially-separated audio zones.

In any of the above-described embodiments of the system of the second aspect, each of the plurality of spatially-isolated audio zones may include a respective one or more audio loudspeakers of the plurality of audio loudspeakers. In the embodiment, to transmit the response to the request to the user, the at least one processor may be further programmed to transmit each of the plurality of responses to the respective one or more audio loudspeakers according to the determined respective one of the plurality of spatially-separated audio zones.

In any of the above-described embodiments of the system of the second aspect, the at least one processor may be further programmed to determine an identity of each of the plurality of spatially-separated audio zones from where the one or more of the plurality of requests originated.

In any of the above-described embodiments of the system of the second aspect, to determine the identity of the each of the plurality of spatially-separated audio zones, the at least one processor may be further programmed to compare each of the plurality of spatially-separated audio zones from where the one or more requests originated to one or more pre-registered audio zone profiles stored in the at least one memory device.

In any of the above-described embodiments of the system of the second aspect, the at least one processor may be further programmed to: receive configuration information for registering audio zone profile(s) for one or more of the plurality of spatially-separated zones; and store this configuration information in the at least one memory device. In the embodiment, the audio zone profile(s) may include a name and/or a location for the one or more of the plurality of spatially-separated audio zones.

In any of the above-described embodiments of the system of the second aspect, the at least one processor may be further programmed to prepend a name of a respectively determined audio zone identity to each of the plurality of responses. In the embodiment, to transmit the response to the request to the user, the at least one processor may be further programmed to transmit the name of the respectively determined audio zone identity prior to transmitting the response.

In any of the above-described embodiments of the system of the second aspect, the at least one processor may be further programmed to: determine an identity of each of the plurality of users from whom one or more of the plurality of requests originated; and prepend a name of a respectively determined user identity to each of a plurality of responses to each of the plurality of requests. In the embodiment, to transmit the response to the request to the user, the at least one processor may be further programmed to transmit the name of the respectively determined user identity prior to transmitting the response.

In any of the above-described embodiments of the system of the second aspect, the at least one processor may be further programmed to determine an identity of each of the plurality of users from whom the one or more of the plurality of requests originated based on the plurality of individual speech signals.

In any of the above-described embodiments of the system of the second aspect, to determine the identity of each of the plurality of users, the at least one processor may be further programmed to compare each of the plurality of users from whom the one or more of the plurality of requests originated to one or more pre-registered user profiles stored in the at least one memory device.

In any of the above-described embodiments of the system of the second aspect, the at least one processor may be further programmed to: receive configuration information for registering user profile(s) for one or more users of the infotainment system; and store this received configuration information in the at least one memory device. In the embodiment, the user profile(s) may include at least one of a first name, a last name, a nickname, and a title, for the one or more users.

In any of the above-described embodiments of the system of the second aspect, the at least one processor may be further programmed to prepend a name of a respectively determined user identity to each of the plurality of responses. In the embodiment, to transmit the response to the request to the user, the at least one processor may be further programmed to transmit the name of the respectively determined user identity prior to transmitting the response.

In any of the above-described embodiments of the system of the second aspect, the at least one processor may be further programmed to prepend the name of a respectively determined user identity, and the name of a respectively determined audio zone identity, to each of the plurality of responses.

In any of the above-described embodiments of the system of the second aspect, the at least one processor may be further programmed to rephrase the received request. In the embodiment, to rephrase the request, the at least one processor may be further programmed to determine a rephrased request based on the information contained in the request.

In any of the above-described embodiments of the system of the second aspect, the at least one processor may be further programmed to prepend the rephrased request to the response to the request. In the embodiment, to transmit the response to the request to the user, the at least one processor may be further programmed to transmit the rephrased request prior to transmitting the response to the received request.

In any of the above-described embodiments of the system of the second aspect, the at least one processor may be further programmed to receive configuration information for an audible speech response style for transmitting the response to the request to the user. In the embodiment, the response style for transmitting the response to the request to the user may include a voice gender, a volume, a spoken language, and a speech rate (e.g., words per minute).

In any of the above-described embodiments of the system of the second aspect, the at least one processor may be further programmed to convert the information contained in the received speech from speech to request text.

In any of the above-described embodiments of the system of the second aspect, to determine the domain for the received request based on information contained in the speech, the at least one processor may be further programmed to determine the domain for the received request based on information contained in the request text.

In any of the above-described embodiments of the system of the second aspect, to route the received request to the virtual assistant, the at least one processor may be further programmed to transmit the request text to the virtual assistant.

In any of the above-described embodiments of the system of the second aspect, the at least one processor may be further programmed to: receive response text from the virtual assistant; and convert the response text to response speech for transmitting the response to the request to the user.

In a third aspect of the disclosure, a non-transitory computer-readable storage medium is provided. The non-transitory computer-readable storage medium stores program instructions for processing requests from users of an infotainment system, which, when executed by at least one processor, cause the at least one processor to: receive a request from a user of the infotainment system; determine a domain for the received request based on information contained in the received request, the domain specifying a category for the request; route the received request to a virtual assistant assigned to handle requests for the determined domain, where the virtual assistant is one of a plurality of virtual assistants respectively assigned to handle requests for a plurality of respectively assigned domains; and transmit a response to the request to the user.

In one embodiment of the non-transitory computer-readable storage medium of the third aspect, the virtual assistant may be one of a plurality of virtual assistants respectively assigned to handle requests for a plurality of respectively assigned domains. In the embodiment, to route the received request to the virtual assistant, the program instructions may further cause the at least one processor to route the received request to one of the plurality of virtual assistants respectively assigned to handle requests for the determined domain.

In any of the above-described embodiments of the non-transitory computer-readable storage medium of the third aspect, the program instructions may further cause the at least one processor to: receive configuration information for assigning at least one domain to be handled by at least one of the plurality of virtual assistants; store the configuration information in at least one memory device; and map the at least one domain to the at least one of the plurality of virtual assistants based on the received configuration information.

In any of the above-described embodiments of the non-transitory computer-readable storage medium of the third aspect, to receive the configuration information, the program instructions may further cause the at least one processor: display a GUI to the user on at least one display screen; receive the configuration information from the user via the GUI; and store the configuration information in at least one memory device.

In any of the above-described embodiments of the non-transitory computer-readable storage medium of the third aspect: to receive the request, the program instructions may further cause the at least one processor to receive the request from the user as speech via the microphone; and to determine the domain for the received request, the program instructions may further cause the at least one processor to determine the domain for the received request based on information contained in the speech.

In any of the above-described embodiments of the non-transitory computer-readable storage medium of the third aspect, the program instructions may further cause the at least one processor to identify a spoken language based on the information contained in the received speech. In the embodiment, to transmit the response to the user, the program instructions may further cause the at least one processor to transmit the response in the identified spoken language.

In any of the above-described embodiments of the non-transitory computer-readable storage medium of the third aspect, to determine the domain for the received request, the program instructions may further cause the at least one processor to map the received request to the domain based on the information contained in the received request.

In any of the above-described embodiments of the non-transitory computer-readable storage medium of the third aspect: to receive the request, the program instructions may further cause the at least one processor to receive the request as a compound request including two or more requests from the user; to map the received request to the domain, the program instructions may further cause the at least one processor to iteratively map each of the two or more requests to one of the respectively assigned domains; and to route the received request to the virtual assistant, the program instructions may further cause the at least one processor to iteratively route each of the two or more requests to the one of the plurality of virtual assistants assigned to handle requests for each of the respectively determined domains.

In any of the above-described embodiments of the non-transitory computer-readable storage medium of the third aspect: to receive the request, the program instructions may further cause the at least one processor to receive the request as a compound request including two or more requests from the user; to determine the domain for the received request, the program instructions may further cause the at least one processor to iteratively determine a respective domain for each of the two or more requests; and to route the received request to the virtual assistant, the program instructions may further cause the at least one processor to iteratively route each of the two or more requests to the one of the plurality of virtual assistants assigned to handle requests for each respectively determined domain.

In any of the above-described embodiments of the non-transitory computer-readable storage medium of the third aspect, to receive the configuration information, the program instructions may further cause the at least one processor to receive a designation of a default virtual assistant that is different from the virtual assistant.

In any of the above-described embodiments of the non-transitory computer-readable storage medium of the third aspect, the program instructions may further cause the at least one processor to determine the availability of the one of the plurality of virtual assistants respectively assigned to handle requests for the determined domain. In the embodiment, to determine the availability of the one of the plurality of virtual assistants respectively assigned to handle requests for the determined domain, the program instructions may further cause the at least one processor to: if, after a first request transmission attempt, the one of the plurality of virtual assistants assigned to handle requests for the determined domain is not available, then for at least a second attempt, retransmit the request to the one of the plurality of virtual assistants. In the embodiment, the program instructions may further cause the at least one processor to transmit the request to the default virtual assistant. In the embodiment, to transmit the request to the default virtual assistant, the program instructions may further cause the at least one processor to: transmit the request to the default virtual assistant when, after the at least a second attempt, the one of the plurality of virtual assistants is not available. In the embodiment, the program instructions may further cause the at least one processor to determine an availability of the default virtual assistant. To determine the availability of the default assistant, the program instructions may further cause the at least one processor to: if, after at least a first request transmission attempt, the default assistant is not available, then for at least a second attempt, retransmit the request to the default virtual assistant. In the embodiment, when, after the at least a second attempt, the default virtual assistant is not available, then the program instructions may further cause the at least one processor to: transmit a message to the user indicating that no virtual assistants are available.

In any of the above-described embodiments of the non-transitory computer-readable storage medium of the third aspect, to route the received request to the virtual assistant, the program instructions may further cause the at least one processor to determine an availability of the one of the plurality of virtual assistants respectively assigned to handle requests for the determined domain. In the embodiment, if the one of the plurality of virtual assistants assigned to handle requests for the determined domain is available, then the program instructions may further cause the at least one processor to transmit the request to the one of the plurality of virtual assistants. In the embodiment, if the one of the plurality of virtual assistants assigned to handle requests for the determined domain is not available, the program instructions may further cause the at least one processor to transmit the request to the default virtual assistant.

In any of the above-described embodiments of the non-transitory computer-readable storage medium of the third aspect, to route the received request to the virtual assistant, the program instructions may further cause the to: transmit the request to the one of the plurality of virtual assistants; and determine an availability of the one of the plurality of virtual assistants respectively assigned to handle requests for the determined domain.

In any of the above-described embodiments of the non-transitory computer-readable storage medium of the third aspect, if the one of the plurality of virtual assistants assigned to handle requests for the determined domain is not available, then the program instructions may further cause the at least one processor to retransmit, for up to a predetermined number of iterations, the request to the one of the plurality of virtual assistants until it is determined that the one of the plurality of virtual assistants is available. In the embodiment, if the one of the plurality of virtual assistants assigned to handle requests for the determined domain is not available, then the program instructions may further cause the at least one processor to transmit the request to the default virtual assistant.

In any of the above-described embodiments of the non-transitory computer-readable storage medium of the third aspect, the program instructions may further cause the at least one processor to determine an availability of the default assistant to handle the request. In the embodiment, if the default virtual assistant is not available, then the program instructions may further cause the at least one processor to retransmit, for up to a predetermined number of iterations, the request to the default assistant until it is determined that the default virtual assistant is available. In the embodiment, if the default virtual assistant is not available, then the program instructions may further cause the at least one processor to transmit a message to a user indicating that no virtual assistants are available for processing requests.

In any of the above-described embodiments of the non-transitory computer-readable storage medium of the third aspect: if one or more of the virtual assistants and/or the default virtual assistant is/are not available, then the program instructions may further cause the at least one processor to retransmit, after a predetermined period of time has elapsed, the request to the one or more of the virtual assistants and/or the default assistant until it is determined that the one of more virtual assistants and/or the default assistant is/are available. In the embodiment, the program instructions may further cause the at least one processor to transmit a message to the user indicating that a reattempt to transmit the request to the one or more of the virtual assistants and/or the default virtual assistant will be made after the predetermined period of time has elapsed.

In any of the above-described embodiments of the non-transitory computer-readable storage medium of the third aspect, one or more messages transmitted to the user may be transmitted as audible speech and/or text. In the embodiment, for the one or more messages transmitted to the user as text, the text of the one or more messages may be transmitted to the user via a display screen, which may include a GUI.

In any of the above-described embodiments of the non-transitory computer-readable storage medium of the third aspect, the program instructions may further cause the at least one processor to determine a spoken language of the user based on the received speech.

In any of the above-described embodiments of the non-transitory computer-readable storage medium of the third aspect, the one or more messages transmitted to the user may be transmitted to the user in the determined spoken language.

In any of the above-described embodiments of the non-transitory computer-readable storage medium of the third aspect, to transmit the response to the request to the user, the program instructions may further cause the at least one processor to transmit the response in the determined spoken language.

In any of the above-described embodiments of the non-transitory computer-readable storage medium of the third aspect, the program instructions may further cause the at least one processor to store recorded audio of the received speech in at least one memory device.

In any of the above-described embodiments of the non-transitory computer-readable storage medium of the third aspect, the program instructions may further cause the at least one processor to transmit the stored audio to a TTS engine for voice model generation.

In any of the above-described embodiments of the non-transitory computer-readable storage medium of the third aspect, to store the recorded audio of the received speech, the program instructions may further cause the at least one processor to store the recorded audio of the received speech of one or more requests received from the user.

In any of the above-described embodiments of the non-transitory computer-readable storage medium of the third aspect, the program instructions may further cause the at least one processor to determine a file size of the stored audio.

In any of the above-described embodiments of the non-transitory computer-readable storage medium of the third aspect, to transmit the stored audio to the TTS engine, the program instructions may further cause the at least one processor to transmit the stored audio to the TTS engine when the stored audio attains a predetermined file size.

In any of the above-described embodiments of the non-transitory computer-readable storage medium of the third aspect, the program instructions may further cause the at least one processor to transmit a message to the user requesting a user permission status to transmit the stored audio to a TTS engine.

In any of the above-described embodiments of the non-transitory computer-readable storage medium of the third aspect, the program instructions may further cause the at least one processor to receive the user permission status from the user for whom the recorded audio of the request received as speech was stored. In the embodiment, if an affirmative user permission status is received, then the program instructions may further cause the at least one processor to: transmit the stored audio to the TTS engine; receive the generated voice model from the TTS engine; and store the received voice model in the at least one memory device according to a user identity of the user for whom the recorded audio of the request received as speech was stored. In the embodiment, if a negative user permission status is received, then the program instructions may further cause the at least one processor to delete the stored audio of the user for whom the recorded audio of the request received as speech was stored from the at least one memory device.

In any of the above-described embodiments of the non-transitory computer-readable storage medium of the third aspect, the user may include one or more users of the infotainment system. In the embodiment, the program instructions may further cause the at least one processor to store recorded audio of a speech sample of the one or more users in at least one memory device.

In any of the above-described embodiments of the non-transitory computer-readable storage medium of the third aspect, the program instructions may further cause the at least one processor to transmit a message to the one of more users for whom the recorded audio of the speech sample was stored requesting a permission status to transmit the stored audio of the speech sample to a TTS engine.

In any of the above-described embodiments of the non-transitory computer-readable storage medium of the third aspect, the program instructions may further cause the at least one processor to receive the user permission status from the one or more users for whom the recorded audio of the speech sample was stored. In the embodiment, if an affirmative user permission status is received, then the program instructions may further cause the at least one processor to: transmit the stored audio of the speech sample to the TTS engine; receive the generated voice model from the TTS engine; and store the received voice model in the at least one memory device according to a user identity of the one or more users for whom the recorded audio of the speech sample was stored. In the embodiment, if a negative user permission status is received, then the program instructions may further cause the at least one processor to delete the stored audio of the speech sample of the one or more users for whom the recorded audio of the speech sample was stored from the at least one memory device.

In any of the above-described embodiments of the non-transitory computer-readable storage medium of the third aspect, the program instructions further cause the at least one processor to: determine a spoken language of the user based on the received speech of the user; and select a language model according to the determined spoken language for at least one of: speech to text conversion, and text to speech conversion, for one or more of the receiving, determining, routing, and transmitting operations of the at least one processor. In the embodiment, to transmit the response to the request to the user may, the program instructions further cause the at least one processor to transmit the response in the determined spoken language.

In any of the above-described embodiments of the non-transitory computer-readable storage medium of the third aspect, to receive the request, the program instructions may further cause the at least one processor to receive a plurality of requests from a plurality of users of the infotainment system.

In any of the above-described embodiments of the non-transitory computer-readable storage medium of the third aspect, to receive the plurality of requests from the plurality of users, the program instructions may further cause the at least one processor to receive the plurality of requests from the plurality of users.

In any of the above-described embodiments of the non-transitory computer-readable storage medium of the third aspect, the request received as speech may include a multi-user speech signal. In the embodiment, the program instructions may further cause the at least one processor to separate the multi-user speech signal into a plurality of individual speech signals for each of the plurality of users.

In any of the above-described embodiments of the non-transitory computer-readable storage medium of the third aspect, to transmit the response to the request to the user, the program instructions may further cause the at least one processor to iteratively transmit a plurality of responses to each of the plurality of requests.

In any of the above-described embodiments of the non-transitory computer-readable storage medium of the third aspect, the program instructions may further cause the at least one processor to determine a TOA for each of the plurality of individual speech signals.

In any of the above-described embodiments of the non-transitory computer-readable storage medium of the third aspect, to transmit the response to the request to the user, the program instructions may further cause the at least one processor to iteratively transmit a plurality of responses to each of the plurality of requests.

In any of the above-described embodiments of the non-transitory computer-readable medium of the third aspect, the program instructions may cause the at least one processor to determine a rank order of determined TOAs.

In any of the above-described embodiments of the non-transitory computer-readable storage medium of the third aspect, to iteratively transmit the plurality of responses, the program instructions may further cause the at least one processor to first transmit one of the plurality of responses having the least determined TOA.

In any of the above-described embodiments of the non-transitory computer-readable storage medium of the third aspect, the program instructions further cause the at least one processor to: receive configuration information for prioritizing iteratively transmitting the plurality of responses to each of the plurality of requests according to an ascending order of determined TOA; and store the configuration information for prioritizing iteratively transmitting the plurality of responses in at least one memory device.

In any of the above-described embodiments of the non-transitory computer-readable storage medium of the third aspect, to iteratively transmit the plurality of responses, the program instructions may further cause the at least one processor to first transmit one of the plurality of responses having the greatest determined TOA.

In any of the above-described embodiments of the non-transitory computer-readable storage medium of the third aspect, the program instructions may further cause the at least one processor to: receive configuration information for prioritizing iteratively transmitting the plurality of responses to each of the plurality of requests according to a descending order of determined TOA; and store the configuration information for prioritizing iteratively transmitting the plurality of responses in at least one memory device.

In any of the above-described embodiments of the non-transitory computer-readable storage medium of the third aspect, the program instructions may further cause the at least one processor to, for each of the plurality of individual speech signals, determine a processing time for determining the domain for the received request based on the information contained in the received request.

In any of the above-described embodiments of the non-transitory computer-readable storage medium of the third aspect, to transmit the response to the request to the user, the program instructions may further cause the at least one processor to iteratively transmit a plurality of responses to each of the plurality of requests.

In any of the above-described embodiments of the non-transitory computer-readable storage medium of the third aspect, to iteratively transmit the plurality of responses, the program instructions may further cause the at least one processor to first transmit one of the plurality of responses having the least determined processing time.

In any of the above-described embodiments of the non-transitory computer-readable storage medium of the third aspect, the program instructions may further cause the at least one processor to first transmit one of the plurality of responses having the greatest determined processing time.

In any of the above-described embodiments of the non-transitory computer-readable storage medium of the third aspect, the program instructions may further cause the at least one processor to: receive configuration information for prioritizing iteratively transmitting the plurality of responses to each of the plurality of requests according to an ascending order of determined processing time; and store the configuration information for prioritizing iteratively transmitting the plurality of responses in at least one memory device.

In any of the above-described embodiments of the non-transitory computer-readable storage medium of the third aspect, the program instructions may further cause the at least one processor to receive configuration information for prioritizing iteratively transmitting the plurality of responses to each of the plurality of requests according to a descending order of determined processing times.

In any of the above-described embodiments of the non-transitory computer-readable storage medium of the third aspect, to receive the configuration information for prioritizing iteratively transmitting the plurality of responses, the program instructions may further cause the at least one processor to receive a user priority scheme for prioritizing iteratively transmitting the plurality of responses.

In any of the above-described embodiments of the non-transitory computer-readable storage medium of the third aspect, the user priority scheme may specify that a response to a first user is transmitted before a response is transmitted to at least a second user.

In any of the above-described embodiments of the non-transitory computer-readable storage medium of the third aspect, each of the plurality of users may be positioned in a plurality of spatially-separated audio zones.

In any of the above-described embodiments of the non-transitory computer-readable storage medium of the third aspect, the program instructions may further cause the at least one processor to determine a respective one of the plurality of spatially-separated audio zones from where one or more of the plurality of requests originated.

In any of the above-described embodiments of the non-transitory computer-readable storage medium of the third aspect, to determine the respective one of the plurality of spatially-separated audio zones from where one or more of the plurality of requests originated, the program instructions may further cause the at least one processor to: determine the respective one of the plurality of spatially-separated audio zones from where one or more of the plurality of requests originated based on one or more of: a comparison between amplitudes of received signals in the multi-user speech signal, and a comparison between TOAs of received signals in the multi-user speech signal.

In any of the above-described embodiments of the non-transitory computer-readable storage medium of the third aspect: at least two of the plurality of spatially-isolated audio zones include a respective one or more audio loudspeakers; and to transmit the response to the request to the user, the program instructions may further cause the at least one processor to transmit each of the plurality of responses to the respective one or more audio loudspeakers according to the determined respective one of the plurality of spatially-separated audio zones.

In any of the above-described embodiments of the non-transitory computer-readable storage medium of the third aspect: each of the plurality of spatially-isolated audio zones includes a respective one or more audio loudspeakers; and to transmit the response to the request to the user, the program instructions may further cause the at least one processor to transmit each of the plurality of responses to the respective one or more audio loudspeakers according to the determined respective one of the plurality of spatially-separated audio zones.

In any of the above-described embodiments of the non-transitory computer-readable storage medium of the third aspect the program instructions may further cause the at least one processor to determine an identity of each of the plurality of spatially-separated audio zones from where the one or more of the plurality of requests originated.

In any of the above-described embodiments of the non-transitory computer-readable storage medium of the third aspect, to determine the identity of the each of the plurality of spatially-separated audio zones, the program instructions may further cause the at least one processor to compare each of the plurality of spatially-separated audio zones from where the one or more requests originated to one or more pre-registered audio zone profiles stored in at least one memory device.

In any of the above-described embodiments of the non-transitory computer-readable storage medium of the third aspect, the program instructions may further cause the at least one processor to: receive configuration information for registering audio zone profile(s) for one or more of the plurality of spatially-separated zones; and store this configuration information in at least one memory device. In the embodiment, the audio zone profile(s) may include a name and/or a location for the one or more of the plurality of spatially-separated audio zones.

In any of the above-described embodiments of the non-transitory computer-readable storage medium of the third aspect, the program instructions may further cause the at least one processor to prepend a name of a respectively determined audio zone identity to each of the plurality of responses. In the embodiment, to transmit the response to the request to the user, the program instructions may further cause the at least one processor to transmit the name of the respectively determined audio zone identity prior to transmitting the response.

In any of the above-described embodiments of the non-transitory computer-readable medium of the third aspect, the program instructions may further cause the at least one processor: determine an identity of each of the plurality of users from whom one or more of the plurality of requests originated; and prepend a name of a respectively determined user identity to each of a plurality of responses to each of the plurality of requests. In the embodiment, to transmit the response to the request to the user, the program instructions may further cause the at least one processor to transmit the name of the respectively determined user identity prior to transmitting the response.

In any of the above-described embodiments of the non-transitory computer-readable storage medium of the third aspect, the program instructions may further cause the at least one processor to determine an identity of each of the plurality of users from whom the one or more of the plurality of requests originated based on the plurality of individual speech signals.

In any of the above-described embodiments of the non-transitory computer-readable storage medium of the third aspect, to determine the identity of each of the plurality of users, the program instructions may further cause the at least one processor to compare each of the plurality of users from whom the one or more of the plurality of requests originated to one or more pre-registered user profiles stored in the at least one memory device.

In any of the above-described embodiments of the non-transitory computer-readable storage medium of the third aspect, the program instructions may further cause the at least one processor to: receive configuration information for registering user profile(s) for one or more users of the infotainment system; and store this received configuration information in at least one memory device. In the embodiment, the user profile(s) may include at least one of a first name, a last name, a nickname, and a title, for the one or more users.

In any of the above-described embodiments of the non-transitory computer-readable storage medium of the third aspect, the program instructions may further cause the at least one processor to prepend a name of a respectively determined user identity to each of the plurality of responses. In the embodiment, to transmit the response to the request to the user, the program instructions may further cause the at least one processor to transmit the name of the respectively determined user identity prior to transmitting the response.

In any of the above-described embodiments of the non-transitory computer-readable storage medium of the third aspect, the program instructions may further cause the at least one processor to prepend the name of a respectively determined user identity, and the name of a respectively determined audio zone identity, to each of the plurality of responses.

In any of the above-described embodiments of the non-transitory computer-readable storage medium of the third aspect, the program instructions may further cause the at least one processor to rephrase the received request. In the embodiment, the program instructions may further cause the at least one processor to determine a rephrased request based on the information contained in the request.

In any of the above-described embodiments of the non-transitory computer-readable storage medium of the third aspect, the program instructions may further cause the at least one processor to prepend the rephrased request to the response to the request. In the embodiment, to transmit the response to the request to the user, the program instructions may further cause the at least one processor to transmit the rephrased request prior to transmitting the response to the received request.

In any of the above-described embodiments of the non-transitory computer-readable storage medium of the third aspect, the program instructions may further cause the at least one processor to receive configuration information for an audible speech response style for transmitting the response to the request to the user. In the embodiment, the response style for transmitting the response to the request to the user may include a voice gender, a volume, a spoken language, and a speech rate (e.g., words per minute).

In any of the above-described embodiments of the non-transitory computer-readable storage medium of the third aspect, the program instructions may further cause the at least one processor to convert the information contained in the received speech from speech to request text.

In any of the above-described embodiments of the non-transitory computer-readable storage medium of the third aspect, to determine the domain for the received request based on information contained in the speech, the program instructions may further cause the at least one processor to determine the domain for the received request based on information contained in the request text.

In any of the above-described embodiments of the non-transitory computer-readable storage medium of the third aspect, to route the received request to the virtual assistant, the program instructions may further cause the at least one processor to transmit the request text to the virtual assistant.

In any of the above-described embodiments of the non-transitory computer-readable storage medium of the third aspect, the program instructions may further cause the at least one processor to: receive response text from the virtual assistant; and convert the response text to response speech for transmitting the response to the request to the user.

In a fourth aspect of the disclosure, a vehicle is provided. The vehicle includes an infotainment system. The vehicle includes a system for processing requests from users of the infotainment system. The system for processing requests from users of the infotainment system includes: one or more input/output (I/O) devices for: receiving a request from a user of the infotainment system, and communicating a response to the request to the user; a transceiver for: transmitting the request to a virtual assistant, and receiving a response to the request from the virtual assistant; at least one memory device; and at least one processor in communication with: the one or more I/O devices, the transceiver, and the at least one memory device. The at least one processor is programmed to: receive the request from the input device; determine a domain for the received request based on information contained in the received request, the domain specifying one or more categories for the request; route the received request to the virtual assistant assigned to handle requests for the determined domain, where the virtual assistant is one of a plurality of virtual assistants respectively assigned to handle requests for a plurality of respectively assigned domains; and transmit the response to the request to the user.

In one embodiment of the vehicle of the fourth aspect, the virtual assistant may be one of a plurality of virtual assistants respectively assigned to handle requests for a plurality of respectively assigned domains. In the embodiment, to route the received request to the virtual assistant, the at least one processor may be further programmed to route the received request to one of the plurality of virtual assistants respectively assigned to handle requests for the determined domain.

In any of the above-described embodiments of the vehicle of the fourth aspect, the at least one processor may be further programmed to: receive configuration information for assigning at least one domain to be handled by at least one of the plurality of virtual assistants; store the configuration information in the at least one memory device; and map the at least one domain to the at least one of the plurality of virtual assistants based on the received configuration information.

In any of the above-described embodiments of the vehicle of the fourth aspect, the one or more I/O devices may include at least one display screen. In the embodiment, to receive the configuration information, the at least one processor may be further programmed to: display a GUI to the user on the at least one display screen; receive the configuration information from the user via the GUI; and store the configuration information in the at least one memory device.

In any of the above-described embodiments of the vehicle of the fourth aspect, the one or more I/O devices may include at least one microphone. In the embodiment: to receive the request, the at least one processor may be further programmed to receive the request from the user as speech via the microphone; and to determine the domain for the received request, the at least one processor may be further programmed to determine the domain for the received request based on information contained in the speech.

In any of the above-described embodiments of the vehicle of the fourth aspect, the at least one processor may be further programmed to identify a spoken language based on the information contained in the received speech. In the embodiment, to transmit the response to the user, the at least one processor may be further programmed to transmit the response in the identified spoken language.

In any of the above-described embodiments of the vehicle of the fourth aspect, to determine the domain for the received request, the at least one processor may be further programmed to map the received request to the domain based on the information contained in the received request.

In any of the above-described embodiments of the vehicle of the fourth aspect: to receive the request, the at least one processor may be further programmed to receive the request as a compound request including two or more requests from the user; to map the received request to the domain, the at least one processor may be further programmed to iteratively map each of the two or more requests to one of the respectively assigned domains; and to route the received request to the virtual assistant, the at least one processor may be further programmed to iteratively route each of the two or more requests to the one of the plurality of virtual assistants assigned to handle requests for each of the respectively determined domains.

In any of the above-described embodiments of the vehicle of the fourth aspect: to receive the request, the at least one processor may be further programmed to receive the request as a compound request including two or more requests from the user; to determine the domain for the received request, the at least one processor may be further programmed to iteratively determine a respective domain for each of the two or more requests; and to route the received request to the virtual assistant, the at least one processor may be further programmed to iteratively route each of the two or more requests to the one of the plurality of virtual assistants assigned to handle requests for each respectively determined domain.

In any of the above-described embodiments of the vehicle of the fourth aspect, to receive the configuration information, the at least one processor may be further programmed to receive a designation of a default virtual assistant that is different from the virtual assistant.

In any of the above-described embodiments of the vehicle of the fourth aspect, the at least one processor may be further programmed to determine the availability of the one of the plurality of virtual assistants respectively assigned to handle requests for the determined domain. In the embodiment, to determine the availability of the one of the plurality of virtual assistants respectively assigned to handle requests for the determined domain, the at least one processor may be further programmed to: if, after a first request transmission attempt, the one of the plurality of virtual assistants assigned to handle requests for the determined domain is not available, then for at least a second attempt, retransmit the request to the one of the plurality of virtual assistants. In the embodiment, the at least one processor may be further programmed to transmit the request to the default virtual assistant. In the embodiment, to transmit the request to the default virtual assistant, the at least one processor may be further programmed to: transmit the request to the default virtual assistant when, after the at least a second attempt, the one of the plurality of virtual assistants is not available. In the embodiment, the at least one processor may be further programmed to determine an availability of the default virtual assistant. To determine the availability of the default assistant, the at least one processor may be further programmed to: if, after at least a first request transmission attempt, the default assistant is not available, then for at least a second attempt, retransmit the request to the default virtual assistant. In the embodiment, when, after the at least a second attempt, the default virtual assistant is not available, then the at least one processor may be further programmed to: transmit a message to the user indicating that no virtual assistants are available.

In any of the above-described embodiments of the vehicle of the fourth aspect, to route the received request to the virtual assistant, the at least one processor may be further programmed to determine an availability of the one of the plurality of virtual assistants respectively assigned to handle requests for the determined domain. In the embodiment, if the one of the plurality of virtual assistants assigned to handle requests for the determined domain is available, then the at least one processor may be further programmed to transmit the request to the one of the plurality of virtual assistants. In the embodiment, if the one of the plurality of virtual assistants assigned to handle requests for the determined domain is not available, the at least one processor may be further programmed to transmit the request to the default virtual assistant.

In any of the above-described embodiments of the vehicle of the fourth aspect, to route the received request to the virtual assistant, the at least one processor may be further programmed to: transmit the request to the one of the plurality of virtual assistants; and determine an availability of the one of the plurality of virtual assistants respectively assigned to handle requests for the determined domain.

In any of the above-described embodiments of the vehicle of the fourth aspect, if the one of the plurality of virtual assistants assigned to handle requests for the determined domain is not available, then the at least one processor may be further programmed to: retransmit, for up to a predetermined number of iterations, the request to the one of the plurality of virtual assistants until it is determined that the one of the plurality of virtual assistants is available. In the embodiment, if the one of the plurality of virtual assistants assigned to handle requests for the determined domain is not available, the at least one processor may be further programmed to transmit the request to the default virtual assistant.

In any of the above-described embodiments of the vehicle of the fourth aspect, the at least one processor may be further programmed to determine an availability of the default assistant to handle the request. In the embodiment, if the default virtual assistant is not available, then the at least one processor may be further programmed to retransmit, for up to a predetermined number of iterations, the request to the default assistant until it is determined that the default virtual assistant is available. In the embodiment, if the default virtual assistant is not available, then the at least one processor may be further programmed to transmit a message to a user indicating that no virtual assistants are available for processing requests.

In any of the above-described embodiments of the vehicle of the fourth aspect: if one or more of the virtual assistants and/or the default virtual assistant is/are not available, then the at least one processor may be further programmed to retransmit, after a predetermined period of time has elapsed, the request to the one or more of the virtual assistants and/or the default assistant until it is determined that the one of more virtual assistants and/or the default assistant is/are available. In the embodiment, the at least one processor may be further programmed to transmit a message to the user indicating that a reattempt to transmit the request to the one or more of the virtual assistants and/or the default virtual assistant will be made after the predetermined period of time has elapsed.

In any of the above-described embodiments of the vehicle of the fourth aspect, one or more messages transmitted to the user may be transmitted as audible speech and/or text. In the embodiment, for the one or more messages transmitted to the user as text, the text of the one or more messages may be transmitted to the user via a display screen, which may include a GUI.

In any of the above-described embodiments of the vehicle of the fourth aspect, the at least one processor may be further programmed to determine a spoken language of the user based on the received speech.

In any of the above-described embodiments of the vehicle of the fourth aspect, the one or more messages transmitted to the user may be transmitted to the user in the determined spoken language.

In any of the above-described embodiments of the vehicle of the fourth aspect, to transmit the response to the request to the user, the at least one processor may be further programmed to transmit the response in the determined spoken language.

In any of the above-described embodiments of the vehicle of the fourth aspect, the at least one processor may be further programmed to store recorded audio of the received speech in the at least one memory device.

In any of the above-described embodiments of the vehicle of the fourth aspect, the at least one processor may be further programmed to transmit the stored audio to a TTS engine for voice model generation.

In any of the above-described embodiments of the vehicle of the fourth aspect, to store the recorded audio of the received speech, the at least one processor may be further programmed to store the recorded audio of the received speech of one or more requests received from the user.

In any of the above-described embodiments of the vehicle of the fourth aspect, the at least one processor may be further programmed to determine a file size of the stored audio.

In any of the above-described embodiments of the vehicle of the fourth aspect, to transmit the stored audio to the TTS engine, the at least one processor may be further programmed to transmit the stored audio to the TTS engine when the stored audio attains a predetermined file size.

In any of the above-described embodiments of the vehicle of the fourth aspect, the at least one processor may be further programmed to transmit a message to the user requesting a user permission status to transmit the stored audio to the TTS engine.

In any of the above-described embodiments of the vehicle of the fourth aspect, the at least one processor may be further programmed to receive the user permission status from the user for whom the recorded audio of the request received as speech was stored. In the embodiment, if an affirmative user permission status is received, then the at least one processor may be further programmed to: transmit the stored audio to the TTS engine; receive the generated voice model from the TTS engine; and store the received voice model in the at least one memory device according to a user identity of the user for whom the recorded audio of the request received as speech was stored. In the embodiment, if a negative user permission status is received, then the at least one processor may be further programmed to delete the stored audio of the user for whom the recorded audio of the request received as speech was stored from the at least one memory device.

In any of the above-described embodiments of the vehicle of the fourth aspect, the user may include one or more users of the infotainment system. In the embodiment, the at least one processor may be further programmed to store recorded audio of a speech sample of the one or more users in the at least one memory device.

In any of the above-described embodiments of the vehicle of the fourth aspect, the at least one processor may be further programmed to transmit a message to the one of more users for whom the recorded audio of the speech sample was stored requesting a permission status to transmit the stored audio of the speech sample to a TTS engine.

In any of the above-described embodiments of the vehicle of the fourth aspect, the at least one processor may be further programmed to receive the user permission status from the one or more users for whom the recorded audio of the speech sample was stored. In the embodiment, if an affirmative user permission status is received, then the at least one processor may be further programmed to: transmit the stored audio of the speech sample to the TTS engine; receive the generated voice model from the TTS engine; and store the received voice model in the at least one memory device according to a user identity of the one or more users for whom the recorded audio of the speech sample was stored. In the embodiment, if a negative user permission status is received, then the at least one processor may be further programmed to delete the stored audio of the speech sample of the one or more users for whom the recorded audio of the speech sample was stored from the at least one memory device.

In any of the above-described embodiments of the vehicle of the fourth aspect, the at least one processor may be further programmed to: determine a spoken language of the user based on the received speech of the user; and select a language model according to the determined spoken language for at least one of: speech to text conversion, and text to speech conversion, for one or more of the receiving, determining, routing, and transmitting operations of the at least one processor. In the embodiment, to transmit the response to the request to the user may, the at least one processor may be further programmed to transmit the response in the determined spoken language.

In any of the above-described embodiments of the vehicle of the fourth aspect, to receive the request, the at least one processor may be further programmed to receive a plurality of requests from a plurality of users of the infotainment system.

In any of the above-described embodiments of the vehicle of the fourth aspect, to receive the plurality of requests from the plurality of users, the at least one processor may be further programmed to receive the plurality of requests from the plurality of users.

In any of the above-described embodiments of the vehicle of the fourth aspect, the request received as speech may include a multi-user speech signal. In the embodiment, the at least one processor may be further programmed to separate the multi-user speech signal into a plurality of individual speech signals for each of the plurality of users.

In any of the above-described embodiments of the vehicle of the fourth aspect, to transmit the response to the request to the user, the at least one processor may be further programmed to iteratively transmit a plurality of responses to each of the plurality of requests.

In any of the above-described embodiments of the vehicle of the fourth aspect, the at least one processor may be further programmed to determine a TOA for each of the plurality of individual speech signals.

In any of the above-described embodiments of the vehicle of the fourth aspect, to transmit the response to the request to the user, the at least one processor may be further programmed to iteratively transmit a plurality of responses to each of the plurality of requests.

In any of the above-described embodiments of the vehicle of the fourth aspect, the at least one processor may be further programmed to determine a rank order of determined TOAs.

In any of the above-described embodiments of the vehicle of the fourth aspect, to iteratively transmit the plurality of responses, the at least one processor may be further programmed to first transmit one of the plurality of responses having the least determined TOA.

In any of the above-described embodiments of the vehicle of the fourth aspect, the at least one processor may be further programmed to: receive configuration information for prioritizing iteratively transmitting the plurality of responses to each of the plurality of requests according to an ascending order of determined TOA; and store the configuration information for prioritizing iteratively transmitting the plurality of responses in the at least one memory device.

In any of the above-described embodiments of the vehicle of the fourth aspect, to iteratively transmit the plurality of responses, the at least one processor may be further programmed to first transmit one of the plurality of responses having the greatest determined TOA.

In any of the above-described embodiments of the vehicle of the fourth aspect, the at least one processor may be further programmed to: receive configuration information for prioritizing iteratively transmitting the plurality of responses to each of the plurality of requests according to a descending order of determined TOA; and store the configuration information for prioritizing iteratively transmitting the plurality of responses in the at least one memory device.

In any of the above-described embodiments of the vehicle of the fourth aspect, the at least one processor may be further programmed to, for each of the plurality of individual speech signals, determine a processing time for determining the domain for the received request based on the information contained in the received request.

In any of the above-described embodiments of the vehicle of the fourth aspect, to transmit the response to the request to the user, the at least one processor may be further programmed to iteratively transmit a plurality of responses to each of the plurality of requests.

In any of the above-described embodiments of the vehicle of the fourth aspect, the at least one processor may be further programmed to determine a rank order of determined processing times.

In any of the above-described embodiments of the vehicle of the fourth aspect, to iteratively transmit the plurality of responses, the at least one processor may be further programmed to first transmit one of the plurality of responses having the least determined processing time.

In any of the above-described embodiments of the vehicle of the fourth aspect, to iteratively transmit the plurality of responses, the at least one processor may be further programmed to first transmit one of the plurality of responses having the greatest determined processing time.

In any of the above-described embodiments of the vehicle of the fourth aspect, the at least one processor may be further programmed to: receive configuration information for prioritizing iteratively transmitting the plurality of responses to each of the plurality of requests according to an ascending order of determined processing time; and store the configuration information for prioritizing iteratively transmitting the plurality of responses in the at least one memory device.

In any of the above-described embodiments of the vehicle of the fourth aspect, the at least one processor may be further programmed to receive configuration information for prioritizing iteratively transmitting the plurality of responses to each of the plurality of requests according to a descending order of determined processing times.

In any of the above-described embodiments of the vehicle of the fourth aspect, to receive the configuration information for prioritizing iteratively transmitting the plurality of responses, the at least one processor may be further programmed to receive a user priority scheme for prioritizing iteratively transmitting the plurality of responses.

In any of the above-described embodiments of the vehicle of the fourth aspect, the user priority scheme may specify that a response to a first user is transmitted before a response is transmitted to at least a second user.

In any of the above-described embodiments of the vehicle of the fourth aspect, each of the plurality of users may be positioned in a plurality of spatially-separated audio zones.

In any of the above-described embodiments of the vehicle of the fourth aspect, the at least one processor may be further programmed to determine a respective one of the plurality of spatially-separated audio zones from where one or more of the plurality of requests originated.

In any of the above-described embodiments of the vehicle of the fourth aspect, to determine the respective one of the plurality of spatially-separated audio zones from where one or more of the plurality of requests originated, the at least one processor may be further programmed to: determine the respective one of the plurality of spatially-separated audio zones from where one or more of the plurality of requests originated based on one or more of: a comparison between amplitudes of received signals in the multi-user speech signal, and a comparison between TOAs of received signals in the multi-user speech signal.

In any of the above-described embodiments of the vehicle of the fourth aspect: the one or more I/O devices may include a plurality of audio loudspeakers; at least two of the plurality of spatially-isolated audio zones may include a respective one or more audio loudspeakers of the plurality of audio loudspeakers; and to transmit the response to the request to the user, the at least one processor may be further programmed to transmit each of the plurality of responses to the respective one or more audio loudspeakers according to the determined respective one of the plurality of spatially-separated audio zones.

In any of the above-described embodiments of the vehicle of the fourth aspect, each of the plurality of spatially-isolated audio zones may include a respective one or more audio loudspeakers of the plurality of audio loudspeakers. In the embodiment, to transmit the response to the request to the user, the at least one processor may be further programmed to transmit each of the plurality of responses to the respective one or more audio loudspeakers according to the determined respective one of the plurality of spatially-separated audio zones.

In any of the above-described embodiments of the vehicle of the fourth aspect, the at least one processor may be further programmed to determine an identity of each of the plurality of spatially-separated audio zones from where the one or more of the plurality of requests originated.

In any of the above-described embodiments of the vehicle of the fourth aspect, to determine the identity of the each of the plurality of spatially-separated audio zones, the at least one processor may be further programmed to compare each of the plurality of spatially-separated audio zones from where the one or more requests originated to one or more pre-registered audio zone profiles stored in the at least one memory device.

In any of the above-described embodiments of the vehicle of the fourth aspect, the at least one processor may be further programmed to: receive configuration information for registering audio zone profile(s) for one or more of the plurality of spatially-separated zones; and store this configuration information in the at least one memory device. In the embodiment, the audio zone profile(s) may include a name and/or a location for the one or more of the plurality of spatially-separated audio zones.

In any of the above-described embodiments of the vehicle of the fourth aspect, the at least one processor may be further programmed to prepend a name of a respectively determined audio zone identity to each of the plurality of responses. In the embodiment, to transmit the response to the request to the user, the at least one processor may be further programmed to transmit the name of the respectively determined audio zone identity prior to transmitting the response.

In any of the above-described embodiments of the vehicle of the fourth aspect, the at least one processor may be further programmed to: determine an identity of each of the plurality of users from whom one or more of the plurality of requests originated; and prepend a name of a respectively determined user identity to each of a plurality of responses to each of the plurality of requests. In the embodiment, to transmit the response to the request to the user, the at least one processor may be further programmed to transmit the name of the respectively determined user identity prior to transmitting the response.

In any of the above-described embodiments of the vehicle of the fourth aspect, the at least one processor may be further programmed to determine an identity of each of the plurality of users from whom the one or more of the plurality of requests originated based on the plurality of individual speech signals.

In any of the above-described embodiments of the vehicle of the fourth aspect, to determine the identity of each of the plurality of users, the at least one processor may be further programmed to compare each of the plurality of users from whom the one or more of the plurality of requests originated to one or more pre-registered user profiles stored in the at least one memory device.

In any of the above-described embodiments of the vehicle of the fourth aspect, the at least one processor may be further programmed to: receive configuration information for registering user profile(s) for one or more users of the infotainment system; and store this received configuration information in the at least one memory device. In the embodiment, the user profile(s) may include at least one of a first name, a last name, a nickname, and a title, for the one or more users.

In any of the above-described embodiments of the vehicle of the fourth aspect, the at least one processor may be further programmed to prepend a name of a respectively determined user identity to each of the plurality of responses. In the embodiment, to transmit the response to the request to the user, the at least one processor may be further programmed to transmit the name of the respectively determined user identity prior to transmitting the response.

In any of the above-described embodiments of the vehicle of the fourth aspect, the at least one processor may be further programmed to prepend the name of a respectively determined user identity, and the name of a respectively determined audio zone identity, to each of the plurality of responses.

In any of the above-described embodiments of the vehicle of the fourth aspect, the at least one processor may be further programmed to rephrase the received request. In the embodiment, to rephrase the request, the at least one processor may be further programmed to determine a rephrased request based on the information contained in the request.

In any of the above-described embodiments of the vehicle of the fourth aspect, the at least one processor may be further programmed to prepend the rephrased request to the response to the request. In the embodiment, to transmit the response to the request to the user, the at least one processor may be further programmed to transmit the rephrased request prior to transmitting the response to the received request.

In any of the above-described embodiments of the vehicle of the fourth aspect, the at least one processor may be further programmed to receive configuration information for an audible speech response style for transmitting the response to the request to the user. In the embodiment, the response style for transmitting the response to the request to the user may include a voice gender, a volume, a spoken language, and a speech rate (e.g., words per minute).

In any of the above-described embodiments of the vehicle of the fourth aspect, the at least one processor may be further programmed to convert the information contained in the received speech from speech to request text.

In any of the above-described embodiments of the vehicle of the fourth aspect, to determine the domain for the received request based on information contained in the speech, the at least one processor may be further programmed to determine the domain for the received request based on information contained in the request text.

In any of the above-described embodiments of the vehicle of the fourth aspect, to route the received request to the virtual assistant, the at least one processor may be further programmed to transmit the request text to the virtual assistant.

In any of the above-described embodiments of the vehicle of the fourth aspect, the at least one processor may be further programmed to: receive response text from the virtual assistant; and convert the response text to response speech for transmitting the response to the request to the user.

In any of the above-described embodiments of the vehicle of the fourth aspect, the vehicle is an automobile.

Further and alternative aspects and features of the disclosed principles will be appreciated from the following detailed description and the accompanying drawings. As will be appreciated, the principles related to the disclosed systems, methods, and software for virtual assistant routing are capable of being carried out in other and different embodiments, and capable of being modified in various respects. Accordingly, it is to be understood that both the foregoing summary and the following detailed description are exemplary and explanatory only and do not restrict the scope of the appended claims.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

This disclosure relates to managing increasingly complex in-vehicle infotainment, safety and automation systems. In certain embodiments, a multi-modal interface is provided for a user to interact with an in-vehicle infotainment system. The multi-modal interface provides users multiple types of devices and methods by which they may interact with the infotainment system in a convenient and minimally intrusive manner. Users may interact with the infotainment system using just one mode, or they may interact with the infotainment system using two or more modes (e.g., two or more of speech, touch, and gesture). As described below, in some embodiments the multi-modal interface may include microphones and a speech recognition system, gesture input sensors and a gesture recognition system, head and eye tracking sensors and a head position and eye gaze direction measurement system, physical input controls and a physical control interpreter, and touch-sensitive displays and a touch sensitive display input interpreter. One or more of these input systems may be combined to provide the multi-modal interface.

Figure 1:
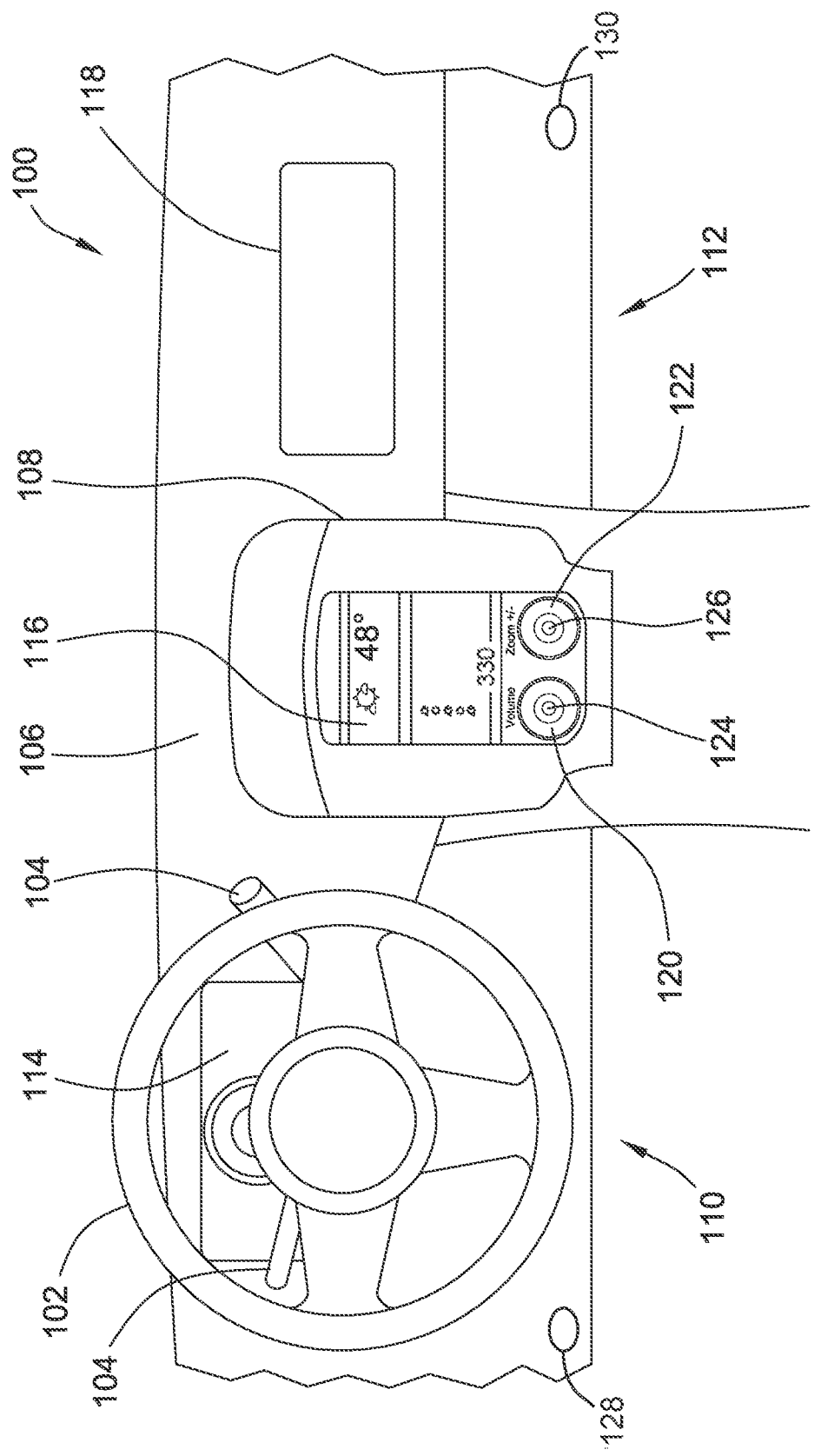
FIG. 1 is a diagram illustrating an exemplary interior of a vehicle.

FIG. 1 is a diagram illustrating an exemplary interior of a vehicle. The vehicle interior 100 includes common vehicle components such as a steering wheel 102, control levers 104 and dashboard 106. A center stack 108 is located between the driver position 110 and front passenger position 112. In the illustrated embodiment, three displays are provided. Each of the displays can be touch sensitive or non-touch sensitive. A first display is the instrument cluster display 114, which in front of the driver position 110. A second display is the center stack display 116 located in the center stack 108. A third display is the front passenger display 118 located in front of the front passenger position 112. Each of the three illustrated displays may comprise multiple individual displays. For example, in some embodiments, the center stack display 116 may be comprised of multiple individual displays.

Additionally, the vehicle interior 100 includes a first physical input control 120 and a second physical input control 122. As illustrated, physical input controls 120 and 122 are knobs. In other embodiments, the controls can be any appropriate physical input, such as a button or slider. The physical input controls 120 and 122 can be mounted on the center stack display 116 or may be mounted onto the passenger display 118. In some embodiments, when mounted on a display, the center of the physical input controls 120 and 122 is open, allowing the display to be visible. In other embodiments, the physical input controls 120 may be moveable to any position on a display, such as center stack display 116 and passenger display 118. For example, physical input controls 120 and 122 include physical input control display areas 124 and 126. In some embodiments, the physical input control display areas 124 and 126 are part of another screen, such as the center stack display 116. In other embodiments, physical input control display areas 124 and 126 each have a physical input control display separate from other displays in the vehicle. In this way, physical input controls 120 and 122 can have displays 124 and 126 mounted on them. Physical input controls 120 and 122 can be dynamically assigned a function, based either on the application being displayed or on a user command. The physical input control displays 124 and 126 can display an indication of the function assigned to their respective physical input controls 120 and 122.

Each of the displays can display in-vehicle infotainment, safety and automation systems. For example, the instrument cluster display 114 may display vehicle information, such as speed and fuel level and a navigation application. In this way, the displays can show more than one application at a time. An application can be any infotainment, safety or automation function shown on a display. In some embodiments, certain applications are not shown on the instrument cluster display 114. For example, applications such as video playback and messaging applications may distract a driver. Therefore, in some embodiments, instrument cluster display 114 only displays applications that will not distract a driver.

In the illustrated embodiment center stack display 116 shows a weather application. This display can show any appropriate application. As described above, examples include, but are not limited to, a weather application, a music application, a navigation application, a climate control application, a messaging application and a video playback application. In some embodiments multiple applications can be displayed at once. Additionally, the vehicle interior 100 includes audio loudspeakers 128 and 130 positioned in two or more locations in vehicle interior 100. In some embodiments, the vehicle interior 100 (e.g., cabin) includes additional loudspeakers instead of, or in addition to, loudspeakers 128 and 130 that are distributed throughout the vehicle interior 100 (e.g., cabin). As described below, the audio loudspeakers may be used to provide audio feedback to an occupant of the vehicle. The audio loudspeakers may also be used to provide infotainment functions, such as music playback, navigation prompts. Additionally, the loudspeakers may be used to provide vehicle status indications.

Figure 2:
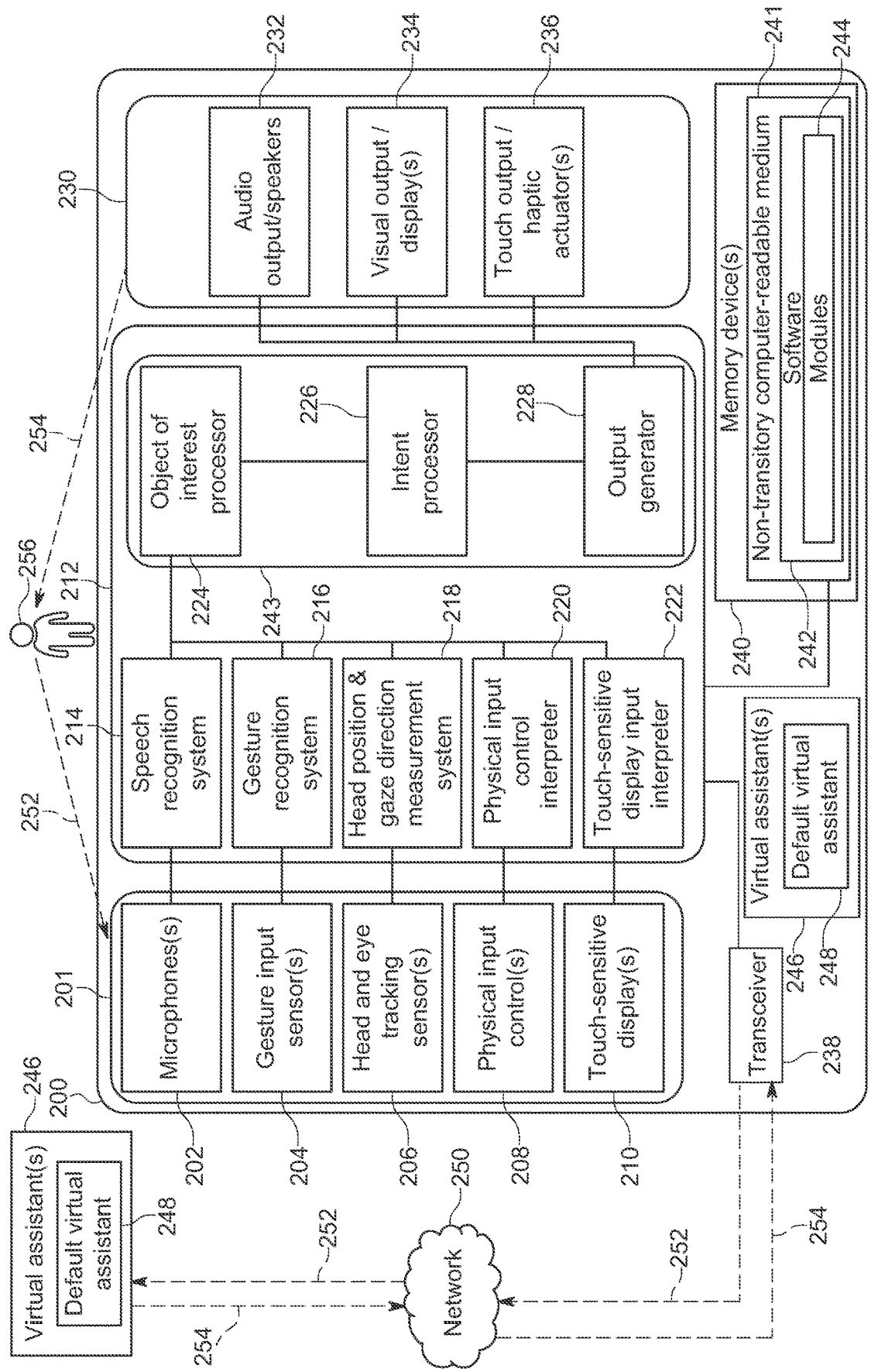
FIG. 2 is a system diagram depicting exemplary components in a vehicle infotainment system.

FIG. 2 is a system diagram depicting various components in a vehicle infotainment system 200. Inputs 201 to the system include one or more microphones 202, gesture input sensors 204, head and eye tracking sensors 206, physical input controls 208 and touch sensitive displays 210. A processing system 212 processes data from each of the inputs 201. The processing system 212 can be one or more general purpose or specialty processors. Each of the systems and functions in the processing system 212 can be implemented in software or hardware, using for example, an FPGA or ASIC. Each of the systems and functions in the processing system 212 can also be a combination of hardware and software.

A speech recognition system 214 connects to the microphones 202. The speech recognition system 214 can listen for a "wake" word or phrase. The wake word or phrase can be a name or phrase, such as "hello car." After the speech recognition system 214 detects the wake word, the system listens for a command from a user 256. A command can be, for example, to put a specific application on a specific display. For example, user 256 could say the wake word followed by "put navigation on the center display." After recognizing that command, the infotainment system would put a navigation application on the center stack display 116. Similar commands can be issued for the various combinations of applications and displays supported by the infotainment system.

A gesture recognition system 216 connects to the gesture input sensors 204. The gesture recognition system 216 recognizes when user 256 makes a gesture. For example, gesture recognition system 216 can recognize a user 256 pointing at an object or motioning towards an object. If a user 256 points or gestures towards one of the displays or physical input controls, the gesture recognition system 216 will recognize the gesture.

A head position and gaze direction measurement system 218 connects to the head and eye tracking sensors 206. The head position and gaze direction measurement system 218 determines where a user 256 is looking. For example, if a user 256 is looking at a display or physical input control, head position and gaze direction measurement system 218 will recognize where the user 256 is looking. The head position and gaze direction measurement system 218 can also determine that the user 256 is not looking at part of the vehicle infotainment system 200 (which may be more succinctly referred to herein as system 200). For example, a user

256 may be looking at the windshield, the rear-view mirror, side view mirror, shifter knob, etc.

A physical input control interpreter 220 connects to the physical input controls 208. The physical input control interpreter 220 determines if a user 256 is interacting with or touching one of the physical input controls 208. For example, if a user 256 is turning a knob or touching a surface, the physical input control interpreter 220 will determine which physical input control the user 256 is interacting with, and the physical action the user 256 is making.

A touch sensitive display input interpreter 222 connects to the touch sensitive displays 210. The touch sensitive display input interpreter 222 determines if a user 256 is interacting with or touching one of the touch sensitive displays 210. For example, if a user 256 is interacting with or touching one of the touch sensitive displays 210, touch sensitive display input interpreter 222 will determine which display the user 256 is interacting with, and the touch gesture the user 256 is making.

Each of the speech recognition system 214, gesture recognition system 216, head position and gaze direction measurement system 218, physical input control interpreter 220, and touch sensitive display input interpreter 222 connect to an object of interest processor 224. The object of interest processor 224 determines which object a user 256 is interested in based on a combination of one or more of the input systems, speech recognition system 214, gesture recognition system 216, head position and gaze direction measurement system 218, physical input control interpreter 220, and touch sensitive display input interpreter 222.

For example, a user 256 may initiate an interaction by activating the speech recognition system 214 using either a wake word or by touching a button on one of the touch sensitive displays 210 or physical input controls 208. The user 256 can then speak a command, such as "Put navigation on that display" or "I want to see the weather on this display." Additional exemplary commands include "move navigation from this display to that display" and "remove driver temperature from this knob." As described above, in some embodiments any application can be used on any display.

If the user 256 issues a complete voice command, such as "Put navigation on the center stack display," then the object of interest processor 224 can determine from the speech recognition system 214 alone that the object of interest is the center stack display 116. However, if a user 256 issues an ambiguous voice command, such as "Put navigation on that display", then the object of interest processor 224 must determine which object the user 256 is referring to. The object of interest processor 224 uses a combination of one or more of the input systems. For example, if a user 256 issues an ambiguous voice command, such as "Put navigation on that display", then the object of interest processor 224 determines which display the user 256 is referring to based on the remaining input systems. If the gesture recognition system 216 determines that the user 256 is pointing to a particular display, such as the center stack display 116, the object of interest processor 224 determines that the object of interest is the center stack display 116. Likewise, the head position and gaze direction measurement system 218 will determine if the user 256 is looking at a particular display or physical input control when issuing a command. The object of interest processor 224 will then determine the display or physical input of interest based on the head position and gaze direction measurement system 218 input.

Similarly, the physical input control interpreter 220 determines if the user 256 is touching or interacting with one of the physical controls 208. The object of interest processor 224 will then determine the physical input control is the object of interest based on the physical input control interpreter 220 input. Similarly, the touch sensitive display input interpreter 222 determines if the user 256 is touching or interacting with one of the touch sensitive displays 210. The object of interest processor 224 will then determine one of the displays is the object of interest based on the touch sensitive display input interpreter 222.

The object of interest processor 224 can also determine the object of interest based on a user's 256 position in the vehicle. Using a combination of the inputs, the object of interest processor 224 determines where the user 256 issuing a command is located in the vehicle. If a user 256 issues a command, such as "Put the weather on my display", the object of interest processor 224 will determine that the object of interest is the display associated with the user 256. For example, if the user 256 is in the front passenger location, the object of interest processor 224 will determine that the object of interest is the front passenger display 118. Additionally, the object of interest processor 224 may determine the object of interest relative to the position of the user 256. For example, a user 256 may issue a command, such as "put weather on the display behind me" or "show navigation on the screen next to me." In this example, based on the position of the user 256, the object of interest processor 224 would then determine that the object of interest is the display behind the user 256 or the display next to the user 256.

The intent processor 226 determines the intent of a user's 256 command. The following examples illustrate the use of the intent processor 226. However, any appropriate command can be issued by a user 256. For example, if a user 256 issues an ambiguous voice command, such as "Put navigation on that display", and the object of interest processor 224 determines through one or more of the remaining inputs that the user 256 is referring to the front passenger display 118, then the intent processor 226 determines that the user 256 wants to put the navigation application on the front passenger display 118. Similarly, a user 256 can issue a command, such as "Make that knob control the volume." The object of interest processor 224 determines through one or more of the remaining inputs that the user 256 is referring to a particular physical input, such as 122. Then the intent processor 226 determines that the user 256 wants to make physical input control 122 the volume control for the infotainment system.

The output generator 228 then generates the appropriate output based on the intent processor 226. For example, if the intent processor 226 determines that the user 256 wants to put the navigation application on the front passenger display 118, then the output generator directs the navigation application to the front passenger display 118. The output generator 228 can provide information through various outputs 230 including audio output/loudspeakers 232, visual output/displays 234 and touch output/haptic actuators 236. The touch output/haptic actuators 236 can be embedded in any of the displays or physical input controls to provide touch output to a user 256. The visual output/displays 234 can be any of the display in the vehicle. The audio output/loudspeakers 232 can be any or all of the loudspeakers associated with the vehicle infotainment system. Inputs 201 and outputs 230 may be more succinctly referred to herein as one or more input/output (I/O) devices.

System 200 includes one or more memory devices 240, also collectively referred to herein as memory 240. Memory 200 is in communication with at least one processor (e.g., 224, 226, and/or 228, which may be more succinctly referred to herein as processor(s) 243) of processing system 212.

Processor(s) 243 are in communication with the one or more I/O devices. Processor(s) 243 are capable of carrying out multiple functions in system 200. Memory 240 includes at least one non-transitory computer-readable medium 241. Non-transitory computer-readable medium 241 stores program instructions (e.g., software (or firmware) 242) for processing requests 252 from users 256 of system 200. Software 242 includes one or more software modules 244. When executed by processor(s) 243, the program instructions cause the processor(s) 243 to implement and/or otherwise perform or facilitate, at least in part, one or more of the disclosed steps of the disclosed methods, including, without limitation, using system 200.

System 200 includes at least one transceiver 238. Transceiver(s) 238 are in communication with processor(s) 243 to transmit a request 252 from the user 256 to a one or more virtual assistants 246 in communication with processor(s) 243 via transceiver(s) 238, and to receive a response 254 to the request 252 from the virtual assistant(s) 246. In some embodiments, one or more virtual assistants 246 are embedded in the infotainment system 200 rather than being cloud-based virtual assistant(s) 246. In such cases, processor(s) 243 may dispense with using transceiver(s) 238 and network 150 to transmit the request 252 from user 256 to the virtual assistant(s) 246. Where system 200 is capable of utilizing a plurality of virtual assistants 246 for processing requests 252 from users 256 of system 200, virtual assistants 246 include a default virtual assistant 248. In some embodiments, the default assistant 248 is embedded in the infotainment system 200 rather than being cloud-based default assistant(s) 248. In such cases, processor(s) 243 may dispense with using transceiver(s) 238 and network 150 to transmit the request 252 from user 256 to the default assistant 248. In an embodiment, not shown in FIG. 2, system 200 includes separate receiver and transmitter components in communication with processor(s) 243, and which are capable of carrying out substantially equivalent functions in system 200 as transceiver(s) 238.

In system 200, transceiver(s) 238 facilitate communication between processor(s) 243 and virtual assistant(s) 246 communicate with one another using signals (e.g., encoded data signals) sent and/or received through, a network 250. Communication among and between processor(s) 243 and virtual assistant(s) 246 using network 250 includes wireless communication equipment and protocols, for example, and without limitation, cellular and/or satellite protocols, practices, and/or standards. Communication among and between processor(s) 243 and virtual assistant(s) 246 using network 250 may include a combination of wireless and wired communication equipment and protocols. For example, communication among and between processor(s) 243 and virtual assistant(s) 246 may include wireless and/or wired communication equipment and protocols for utilizing cloud-based processing, data storage, and/or communication resources.

Figure 3:
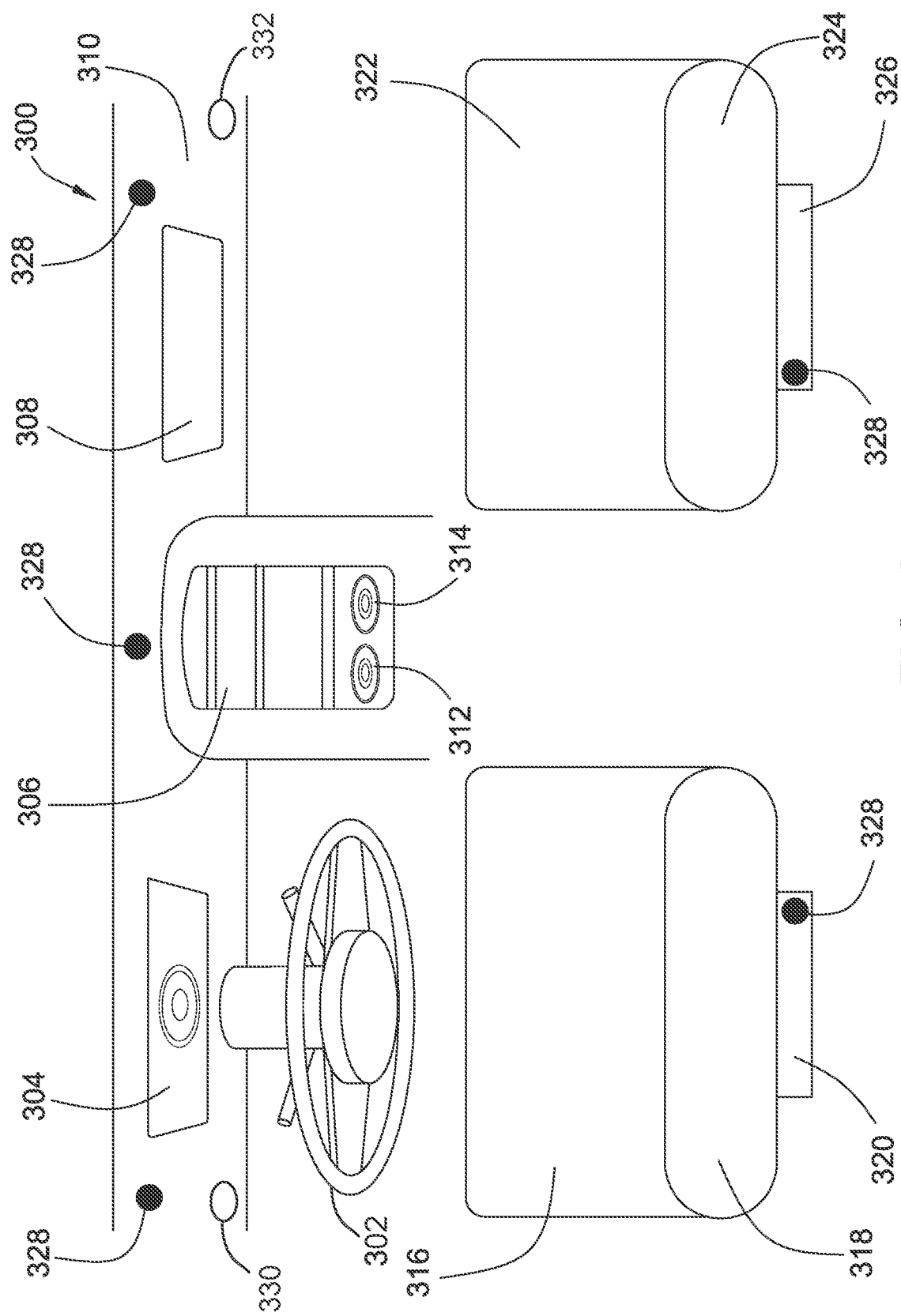
FIG. 3 is a plan view diagram illustrating an exemplary interior of a vehicle including an infotainment system.

FIG. 3 is a plan view illustrating a vehicle interior 300 including an infotainment system. The vehicle includes steering wheel 302 and dashboard 310. Various displays including instrument cluster display 304, center stack display 306, and front passenger display 308 are included. Physical input controls 312 and 314 are also included. In the illustrated embodiment, driver seat 316 including driver seat back 318 is shown. Likewise, front passenger seat 322 including front passenger seat back 324 is illustrated. A first rear passenger display 320 is mounted to driver seat back 318 and a second rear passenger display 326 is mounted to front passenger seat back 324. As described above in some embodiments, any of the displays can show any application. In some embodiments, certain applications, such as video playback, are prevented from being shown on the instrument cluster display 304.

Sensors 328 include the various inputs 201 discussed above. As described above, the sensors 328 may include one or more microphones 202, gesture input sensors 204, head and eye tracking sensors 206, physical input controls 208 and touch sensitive displays 210. While the illustrated embodiment shows five sensors, various numbers of sensors can be used. Additionally, in some embodiments all sensors 328 do not include all inputs. For example, there may be more sensor locations with microphones then gesture input sensors. Additionally, in some embodiments, the placement of various sensors will vary. Microphones, gesture input sensors, and head and eye tracking sensors may be put in the same locations as illustrated, but may also be put in various locations. The location of the sensors within a vehicle will vary. Additionally, the vehicle interior 100 includes audio loudspeakers 128 and 130 for providing audible information and feedback associated with the vehicle and infotainment system.

Figure 4:
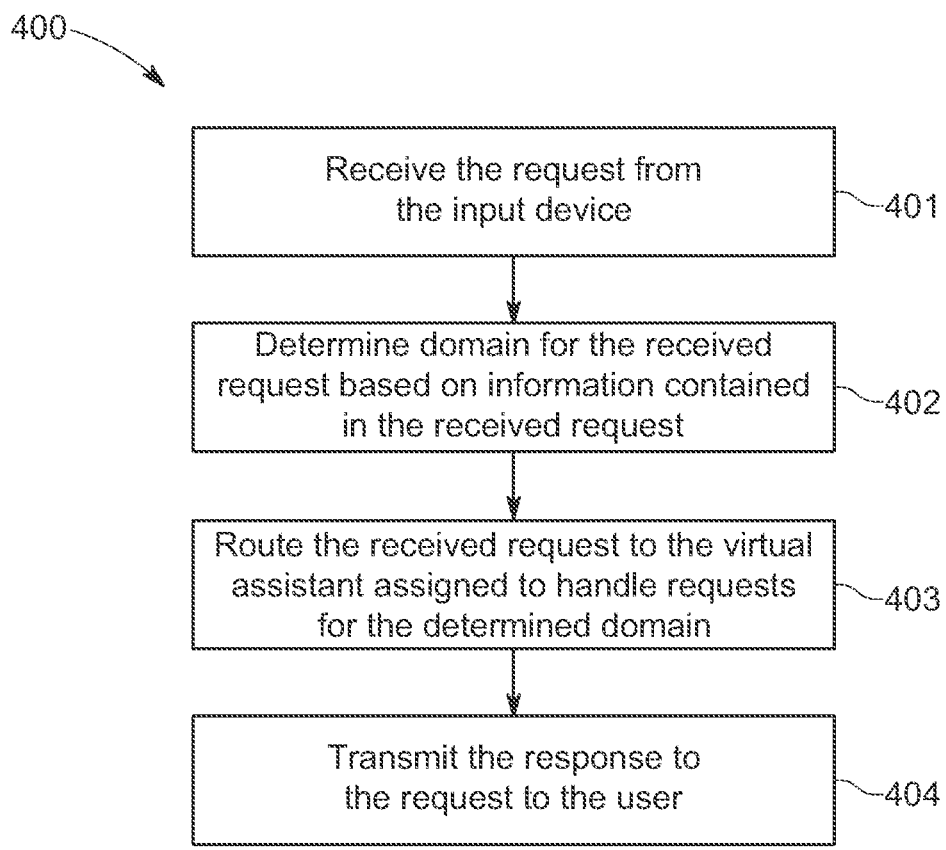
FIG. 4 is a flowchart illustrating an exemplary method for processing requests from users of an infotainment system.

FIG. 4 is a flow chart of a method 400 for processing requests 252 from users 256 of an infotainment system. In the illustrated examples, the method 400 shown in FIG. 4 is implemented, at least in part, using the system 200 of FIG. 2. While system 200 has been described herein as a vehicle infotainment system 200 used in the context of vehicle interiors (e.g., 100 and/or 300), a person of ordinary skill in the art will recognize and appreciate that system 200, and any of the disclosed systems and methods associated therewith may be readily practiced in, and adopted to, physical contexts instead of, or in addition to, vehicles. For instance, the disclosed systems and methods may be practiced, and their numerous benefits and advantageous technical effects may be realized, in any physical setting where, as in any single or multi-passenger, commercial or non-commercial, land, sea, air or space vehicle, users 256 may wish to take advantage of infotainment systems for any reason.

Referring to FIGS. 1-4, method 400 includes receiving 401, by processor(s) 243, the request 252 of the user 256 from the input device(s) (e.g., as input(s) 201 to I/O device(s)). Method 400 includes determining 402, by processor(s) 243, a domain for the received request 252 based on information contained in the received request 252. The domain specifies one or more categories for the request 252. For instance, a user 256 request 252 such as "what will the weather be in Kyoto tomorrow?" is determined 402 to be in a domain including a weather category, while a user 256 request such as "order and overnight ship 1 box of Cheerios to my home address" is determined 402 to be in a domain including a shopping category.

Method 400 includes routing 403, by processor(s) 243 and using transceiver(s) 238, the received request 252 to the virtual assistant 246 assigned to handle requests 252 for the determined domain. Method includes transmitting 404, by processor(s) 243 and using transceiver(s) 238 and output device(s) (e.g., as output(s) 230 to I/O device(s)), the response 254 to the request 252 to the user 256.

Figure 5:
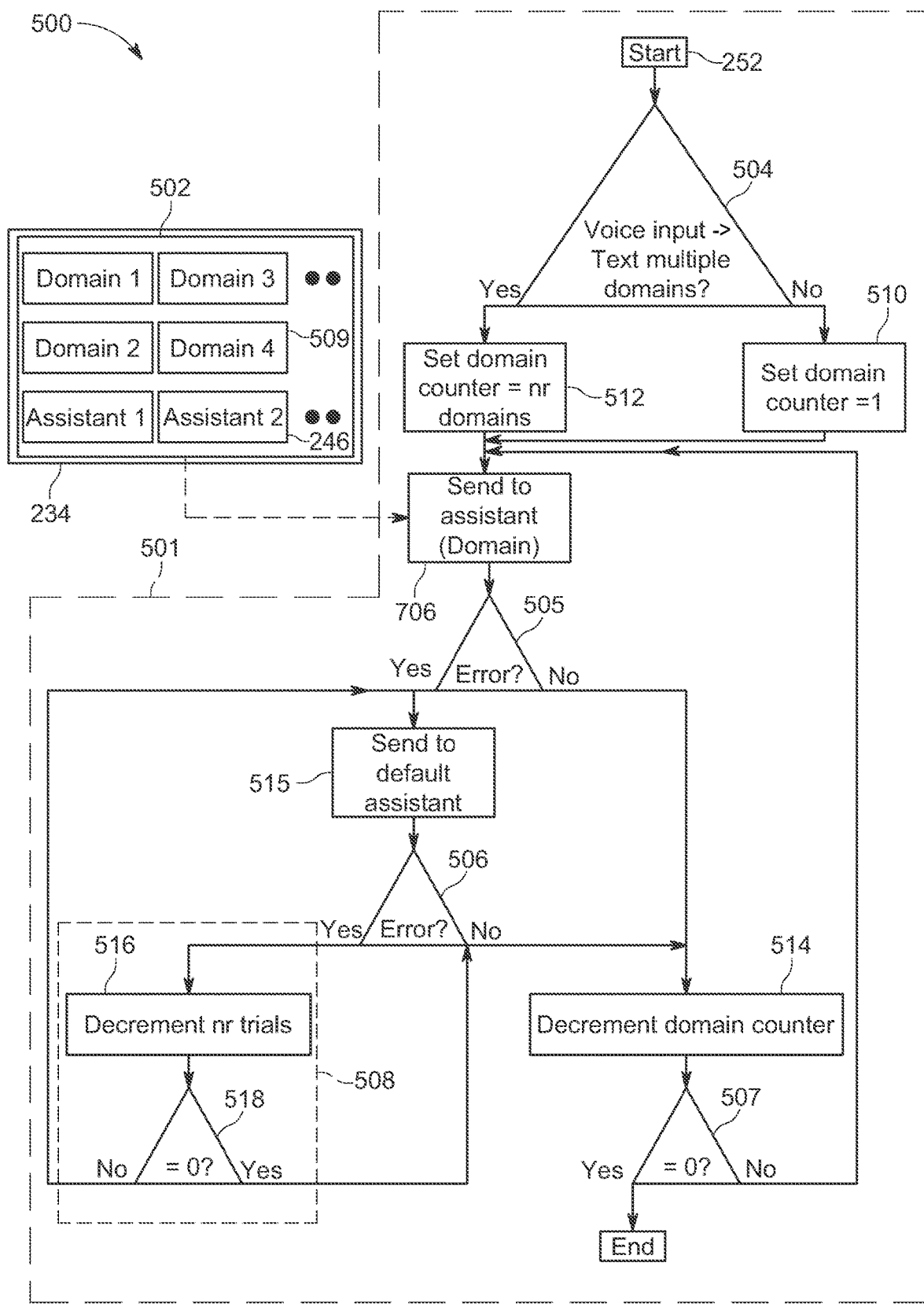
FIG. 5 is block diagram illustrating exemplary aspects of a system for processing requests from users of an infotainment system.
Figure 6:
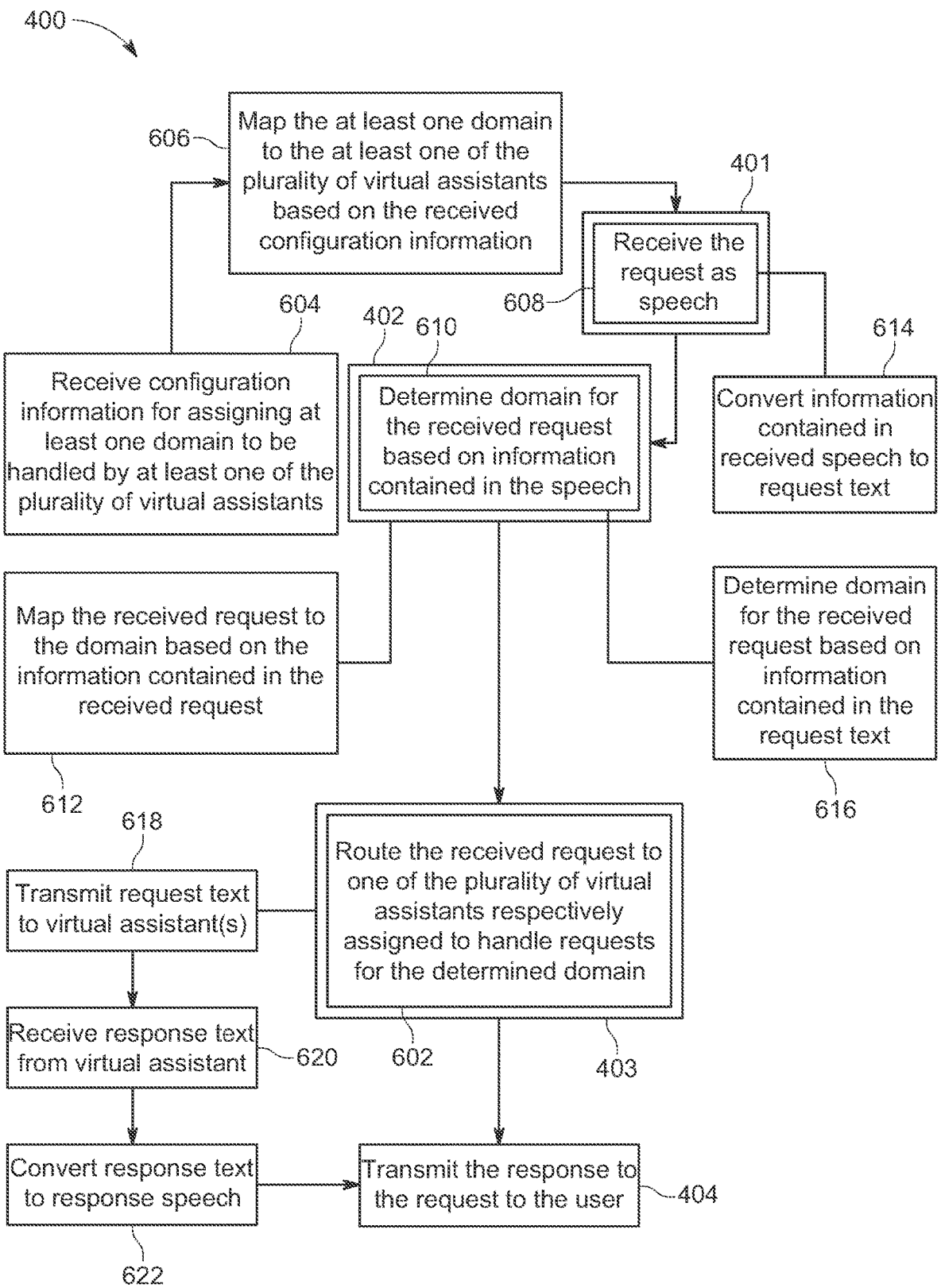
FIG. 6 is a flow chart diagram illustrating exemplary aspects of the method shown in FIG. 4.
Figure 7:
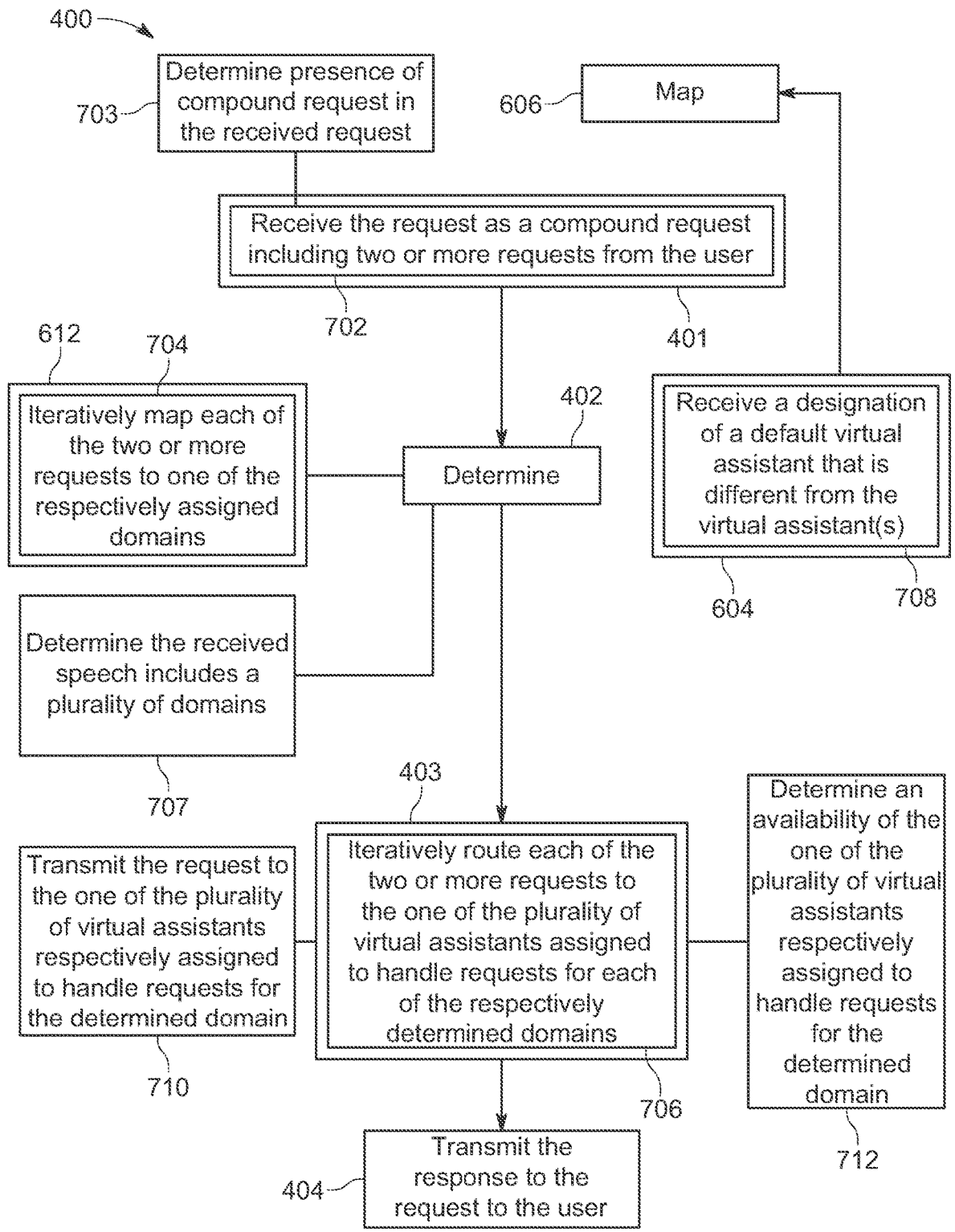
FIG. 7 is a flow chart diagram illustrating exemplary aspects of the method shown in FIG. 4.
Figure 8:
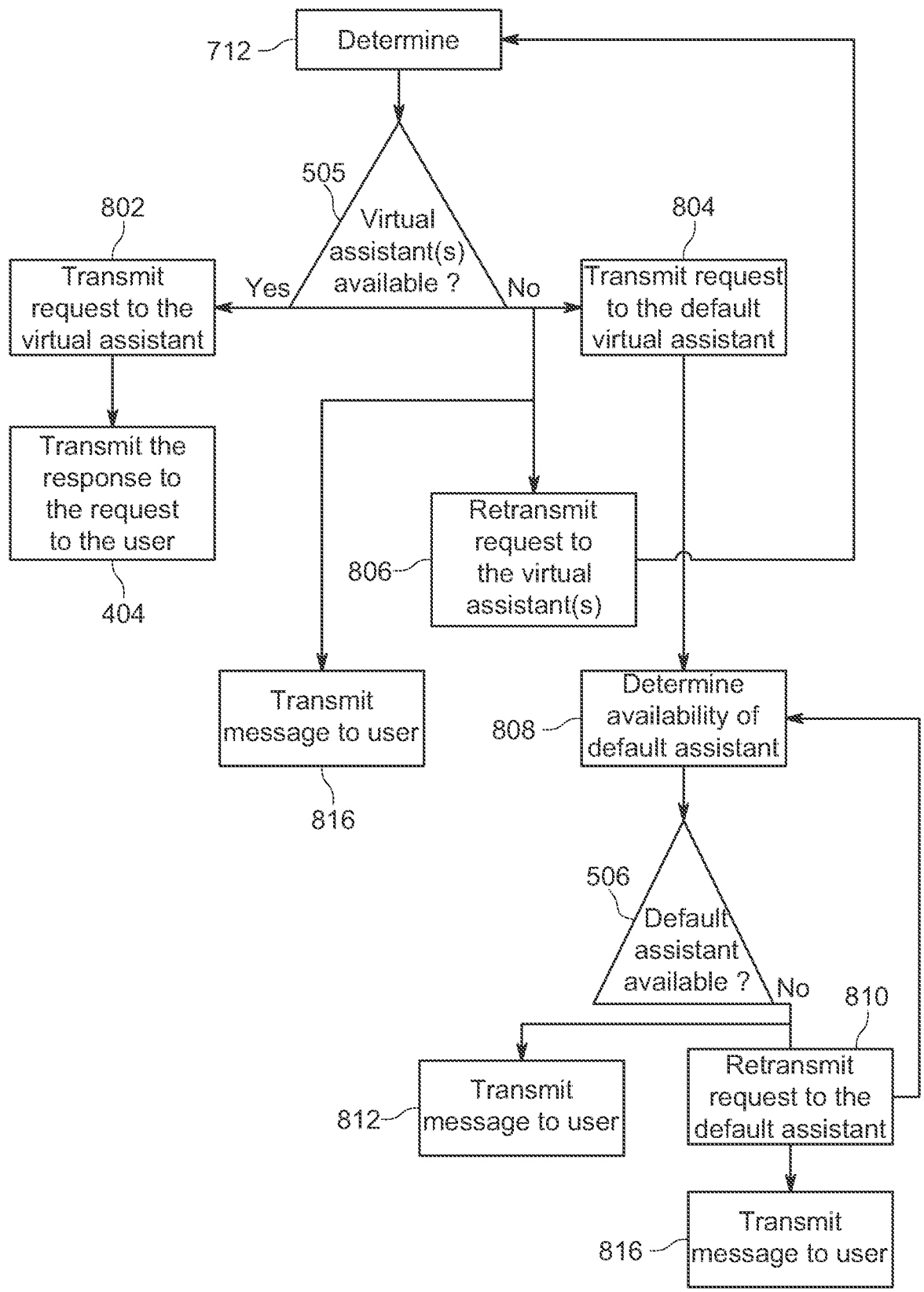
FIG. 8 is a flow chart diagram illustrating exemplary aspects of the method shown in FIG. 4.

FIG. 5 is block diagram of one aspect of a system 500 for processing requests 252 from users 256 of an infotainment system (e.g., system 200). FIGS. 6-8 are flow charts of exemplary aspects of method 400 according to exemplary embodiments of the disclosure. Referring to FIGS. 1-8, system 500 may be a subsystem of system 200 and may be implemented, at least in part, by system 200. System 500 utilizes one or more of the I/O devices of system 200. For example, system 500 utilizes display 234 in communication with processor(s) 234. Processor(s) 234 cause a graphical user interface (GUI) 502 to be displayed to user 256 on display 234. GUI 502 is capable of carrying out multiple functions in system 500. In its function as a configuration screen, GUI 502 includes graphical elements for user 256 selection of domains 509 (e.g., music, car, weather, sports, general, home) and graphical elements for user 256 selection of virtual assistants 246.

For example, where the virtual assistant 246 is one of a plurality of virtual assistants 246 respectively assigned to handle requests 252 for a plurality of respectively assigned domains 509, routing 403 the received request to the virtual assistant 246 includes routing 602, by the processor(s) 243 and using transceiver(s) 238, the received request 252 to one of the plurality of virtual assistants 246 respectively assigned to handle requests 252 for the determined domain 509. In the example, method 400 includes receiving 604, by the processor(s) 243 and using input device(s) (e.g., as input(s) 201 to I/O device(s)), configuration information for assigning at least one domain 509 to be handled by at least one of the plurality of virtual assistants 246. As shown in FIG. 5, this configuration information may be received 604 by processor(s) 243 from user 256 via the GUI 502. In another example, this configuration information is received using an input device other than, or in addition to, GUI 502 (e.g., microphone 202).

In response to receiving 604 the configuration information for assigning at least one domain 509 to be handled by at least one of the plurality of virtual assistants 246, processor(s) 243 cause this configuration information to be stored in memory 240. In this example, method 400 includes mapping 606 the at least one domain 509 to the at least one of the plurality of virtual assistants based on the received configuration information for assigning at least one domain 509 to be handled by at least one of the plurality of virtual assistants 246. Processor(s) 243 cause the result(s) of the mapping 606 to be stored in memory 240.

In an example, the user 256 selects the domain(s) 509 by selecting one or more of the graphical elements of the GUI 502, which changes the graphical element's appearance. Simultaneously, user 256 selection of virtual assistant(s) 246 by selecting one or more of the corresponding graphical elements of GUI 502 changes their appearance to signify whether the virtual assistant 246 can response to the selected domain(s) 509. The user 256 then selects the appropriate and/or desired virtual assistant 246 for the selected domain 509. In response to the selection by the user 256, the graphical element changes appearance to signify to the user 256 that the domain 509 has been assigned to the appropriate and/or desired virtual assistant 246.

Where the one or more I/O devices may include microphone(s) 202, receiving 401 the request 252 from the user 256 includes receiving 608, by processor(s) 243 and using microphone(s) 202, the request 252 from the user 256 as speech. In the example, determining 402 the domain 509 for the received request 252 includes determining 610 the domain 509 for the received request 252 based on information contained in the speech. In another example, determining 402 the domain 509 for the received request 252 includes mapping 612 the received request 252 to the domain 509 based on the information contained in the received request 252.

Referring to FIGS. 5 and 6, a process 501 includes the request 252 from the user 256 is received 608 by processor(s) 243 as speech. In a block 504 of process 501, processor(s) 243 implementing method 400 determine 610 the domain 509 for the received request 252 based on information contained in the speech by converting 614 the information contained in the received speech from speech to request text. In the example, determining 610 the domain 509 for the received request 252 based on information contained in the speech includes determining 616, by the processor(s) 243, the domain 509 for the received request 252 based on information contained in the request text.

Upon determining 616 the domain 509 for the received request 252 based on information contained in the request text, method 400 includes transmitting 618, by the processor(s) 243 in a block 706 of process 501, and using transceiver(s) 238, the request text to the virtual assistant 246. The virtual assistant 246 produces a response to the request 252 in the form of response text and transmits, via network 250, the response text back to system 200. In the example, method 400 includes receiving 620, by the processor(s) 243 and using transceiver(s) 238, response text from the virtual assistant 246. Processor(s) 243 convert 622 the response text to response speech for transmitting 404 (e.g., using audio loudspeaker(s) 232) the response 254 to the request 252 to the user 256.

Referring to FIGS. 5 and 7, receiving 401 the request 252 from the user 256 includes receiving 702 the request 252 as a compound request 252 including two or more requests 252 from the user 256. In a block 504 of process 501, processor(s) 243 implementing method 400 determine a presence of the compound request 252 in the received request 252. In embodiments where the compound request 252 is received 702 from the user 256 as speech, method 400 include determining 707, by processor(s) 243 in block 504 of process 501, that the received speech includes a plurality of domains 509 based on information contained in the received speech.

In an example, for mapping 612 the received request 252 to the domain 509 includes iteratively mapping 704, by processor(s) 243, each of the two or more requests 252 to one of the respectively assigned domains 509. Routing 403 the received request 252 to the virtual assistant 246 includes iteratively routing 706, by processor(s) 243, each of the two or more requests 252 to the one of the plurality of virtual assistants 246 assigned to handle requests 252 for each of the respectively determined 402 domains 509.

In process 501, domain(s) 509 determined 402 by processor(s) 243 in method 400 after request(s) 252 received as speech are converted 622 to request text in block 504 is/are transmitted 618, according to user 256 configuration received 604 by processor(s) 243, to the corresponding virtual assistant(s) 246 in block 706. Where, in block 504, processor(s) 243 determine 707 that the received request 252 includes just one domain 509, processor(s) 243, in a process 501 block 510, set a domain counter to 1, which in turn causes the one received request 252 to be transmitted 618 to the virtual assistant 246 assigned for the single domain 509. Where, in block 504, processor(s) 243 determine 707 that the received request 252 includes more than one domain 509, processor(s) 243, in a process 501 block 512, set the domain counter to a value "nr" that is greater than 1. In this example, the domain counter having the value of nr set to >1 causes the two or more received requests 252 to be transmitted 618 to the virtual assistant 246 assigned for the corresponding two or more domains 509 until the value of the domain counter reaches 0 (zero).

In an example, receiving 604 the configuration information includes receiving 708 a designation of a default virtual assistant 248 that is different from the virtual assistant 246. For instance, the default virtual assistant 248 may be a general purpose virtual assistant for providing a more compact set of functionality and/or data for providing responses 254 to received requests 252 from user 256. In an embodiment, the data set employed by the default virtual assistant 248 may be stored locally in memory 240 of system 200 such that processor(s) 243 need not utilize remote communication via network 250 to generate at least a limited response 254 to the user 256 request(s) 252. In another embodiment, processor(s) 243 periodically download via network 250, and store in memory 240, updates to the locally stored default virtual assistant 248 data set. For instance, where network 250 is available for remote communication with one or more virtual assistants 246, system 200 processor(s) 243 may determine a geographical location of system 200 (e.g., one or more zip codes of the determined location and/or its surroundings) and then download data pertinent to that location. Processor(s) 243 may further delete data from memory 240 for prior updates that are no longer likely to be pertinent to user 256 since user 256 is no longer location in those prior geographic locations. In this manner, system 200 memory 240 is utilized efficiently, and in the event of a failure of network 250 communication capability, user 256 may still receive some benefit from the default virtual assistant 248 for responding to requests 252.

In the example, routing 403 the received request 252 to the virtual assistant 246 includes: transmitting 710, by the processor(s) 243 and using transceiver(s) 238, the request 252 to the one of the plurality of virtual assistants 246, and determining 712, by the processor(s) 243, an availability of the one of the plurality of virtual assistants 246 respectively assigned to handle requests 252 for the determined domain 509.

Referring to FIGS. 5 and 8, routing 403 the received request 246 to the virtual assistant 246 includes determining 712 an availability of the one of the plurality of virtual assistants 246 respectively assigned to handle requests 252 for the determined domain 509. For instance, the availability of the virtual assistant(s) 246 may be tied to the availability of network 250 for remote communication between system 200 and the virtual assistant(s) 246.

Referring to FIGS. 5 and 8, where, in a block 505 of process 501, processor(s) 243 determine 712 that the one of the plurality of virtual assistants 246 assigned to handle requests 252 for the determined 402 domain 509 is/are available (e.g., no error in network 250 communication), then method 400 includes transmitting 802, by the processor(s) 243 in block 706 and using transceiver(s) 238, the request 252 to the one of the plurality of virtual assistants 246. In embodiments where the domain counter is set to nr, in a block 514, processor(s) 243 decrement the domain counter as each of the requests 252 are transmitted 710 to the respectively assigned virtual assistant(s) 246. In a block 507 of process 501, processor(s) 243 determine that the domain counter value has reached 0, and process 501 is ended with respect to the respective request(s) 252.

Where, in a block 505 of process 501, processor(s) 243 determine 712 that the one of the plurality of virtual assistants 246 assigned to handle requests 252 for the determined 402 domain 509 is/are not available (e.g., an error in network 250 communication exists), then method 400 includes transmitting 804, by the processor(s) 243 in block 515, the request 252 to the default virtual assistants 246. In embodiments where the default virtual assistant 248 is not locally resident in system 200, processor(s) 243 utilize transceiver(s) 238 to transmit 804 the request 252 to the default assistant 248. In embodiments where one or more of the requests 252 are to be transmitted 804 to the default virtual assistant 248, processor(s) 243, in a process 501 block 516, set a value ("NrTrials") of another domain counter to ≥1. In this example, the second domain counter having the value of NrTrials set to ≥1 causes the two or more received requests 252 to be transmitted 804 to the default virtual assistant 248 until the value of NrTrials reaches 0.

In an example, if the one of the plurality of virtual assistants 246 assigned to handle requests 252 for the determined domain 509 is not available, then method 400 includes retransmitting 806, by the processor(s) 243 and using transceiver(s) 238, for up to a predetermined number of iterations stored in memory 240, the request 252 to the one of the plurality of virtual assistants 246 until it is determined 712 that the one of the plurality of virtual assistants 246 is available. In the example, if the one of the plurality of virtual assistants 246 assigned to handle requests 252 for the determined 402 domain 509 is not available, method 400 includes transmitting 804, by the processor(s) 243, the request 252 to the default virtual assistant 248.

In an example, method 400 includes determining 808, by the processor(s) 243, an availability of the default virtual assistant 248 to handle the request 252. In the example, where, in a block 506, processor(s) 243 determine that the default virtual assistant 248 is not available, method 400 includes retransmitting 810, by the processor(s) 243, for up to a predetermined number of iterations stored in memory 240, the request 252 to the default virtual assistant 248 until it is determined 808 that the default virtual assistant 248 is available. In the example, if, after the predetermined number of iterations, the default virtual assistant 248 is not available, method 400 may include transmitting 812, by the processor(s) 243, a message to the user 256 indicating that no virtual assistants (246, 248) are available for processing requests 252.

In an example, if one or more of the virtual assistants 246 and/or the default virtual assistant 248 is/are not available, then method 400 includes retransmitting (806 and/or 810), by the processor(s) 243, after a predetermined period of time stored in memory 240 has elapsed, the request 252 to the one or more of the virtual assistants 246 and/or the default virtual assistant 248 until it is determined (712, 808) that the one of more virtual assistants 246 and/or the default virtual assistant 248 is/are available. In the example, method 400 may include transmitting 816 a message to the user 256 indicating that a reattempt to transmit (802 and/or 804) the request to the one or more of the virtual assistants 246 and/or the default virtual assistant 248 will be made after the predetermined period of time stored in memory 240 has elapsed.

In an example, one or more messages transmitted (812 and/or 816) to the user 256 may be transmitted (812 and/or 816) as text and/or as audible speech to the user 256. Where the one or more messages is/are transmitted (812 and/or 816) to the user 256 as text, the text of the one or more messages may be transmitted (812 and/or 816) to the user 256 via a display screen 234, which may include the GUI 502.

Where the virtual assistant(s) 246 are determined to be unavailable (e.g., due to network 250 unavailability, missing results, and/or timeout) for any of the received request(s) 252, the corresponding request(s) 252 is/are sent to the default assistant 248 regardless of the selection of the assigned virtual assistant(s) 246 by the aforementioned user 256 configuration received 604. In cases where the default virtual assistant 248 is determined to be unavailable (e.g., due to network 250 unavailability, missing results, and/or timeout) for any of the received request(s) 252, a retrial routine by the processor(s) 243 triggers the repetition of the request 252 in case of unavailability of the virtual assistant(s) 246 and/or the default virtual assistant 248. The loop starts again by sending the next request 252 to the corresponding virtual assistant 246 corresponding to the received 604 user 256 configuration information, and as directed by processor(s) 243 based on the status of the two counters described above.

Figure 9:
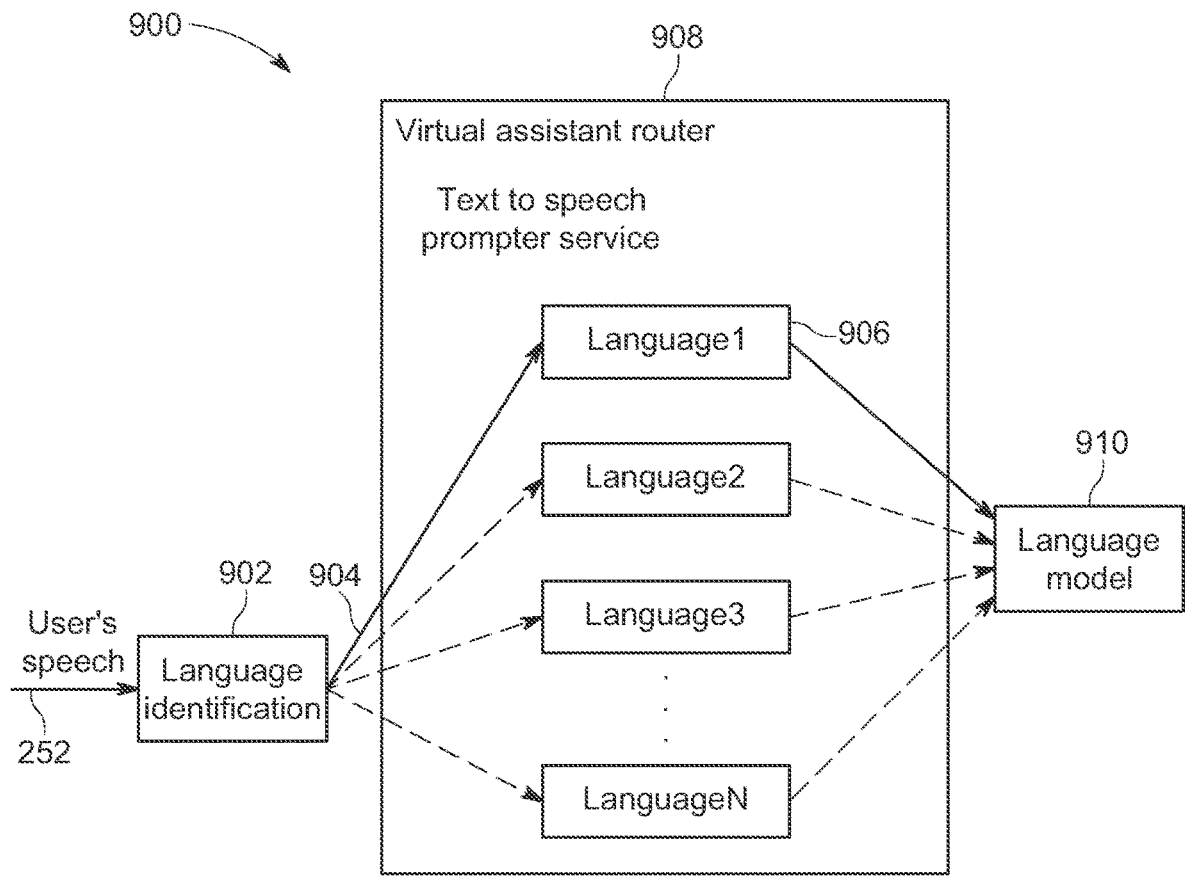
FIG. 9 is block diagram illustrating exemplary aspects of a system for processing requests from users of an infotainment system.
Figure 10:
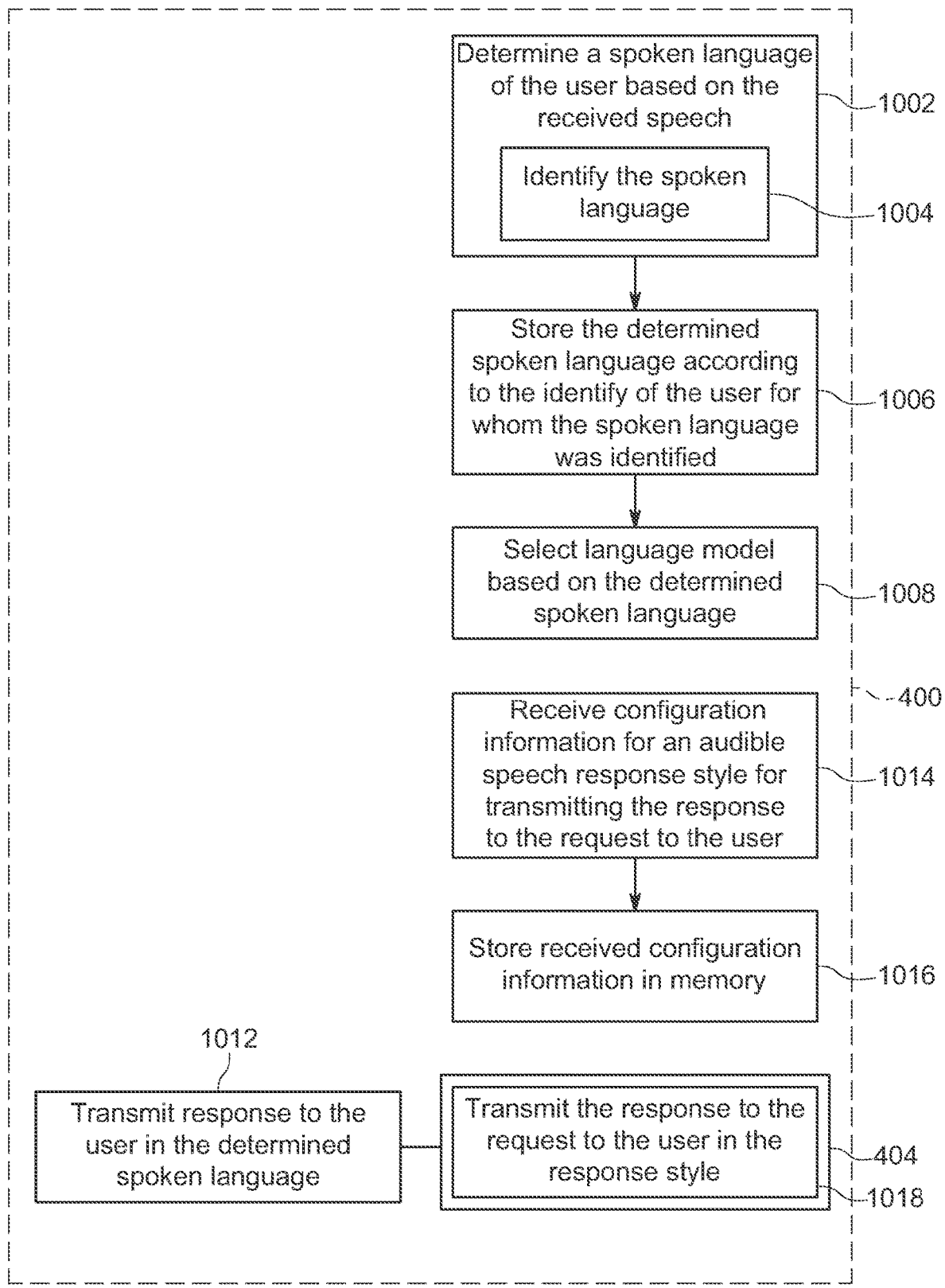
FIG. 10 is a flow chart diagram illustrating exemplary aspects of the method shown in FIG. 4.

FIG. 9 is block diagram of one aspect of a system 900 for processing requests 252 from users 256 of an infotainment system (e.g., system 200). FIG. 10 is a flow chart of exemplary aspects of method 400 according to exemplary embodiments of the disclosure. Referring to FIGS. 1-10, system 900 may be a subsystem of system 200 and may be implemented, at least in part by system 200. System 900 utilizes the one or more I/O devices of system 200. For example, system 900 utilizes microphone(s) 202 in communication with processor(s) 243.

Referring to FIGS. 9 and 10, method 400 includes determining 1002, by the processor(s) 243, a spoken language of the user 256 based on the received speech of the user 256. In an example, user 256 speech is utilized as a voice input to a language identification module 902 of system 900. In the example, method 400 includes identifying 1004, by the processor(s) 243 and using the language identification module 902, the spoken language based on information contained in the received speech (e.g., English versus Japanese, French versus Chinese, etc.).

In the example, method 400 includes storing 1006 the determined 1002 spoken language(s) 902 for respective user(s) 256 in memory 240 according to the identity of the user 256 for whom the spoken language was identified 1004. Determined 1002 spoken languages 902 (e.g., language 1, language 2, . . . , language N) for respective user(s) 256 are stored 1006 in memory 240 according to a data structure 906.

In an example, system 900 provides a text-to-speech prompter service 908 for enabling processor(s) 243 to select and utilize a language model 910 according to the determined 1002 spoken language 902. In the example, method 400 includes selecting 1008, by the processor(s) 243, the language model 910 based on the determined 1002 spoken language 908. In response, processor(s) 243 utilize those selected 1008 language model 910 for performing those aspects of method 400 described herein which utilize and/or rely on speech and/or text conversion, recognition, parsing, and/or communication.

In the example, transmitting 404 the response 254 to the request 252 to the user 256 includes transmitting 1010, by the processor(s) 243, the response 254 to the user 256 in the determined 1002 spoken language. Similarly, method 400 may include transmitting 1012 any of the one or more messages in steps 812 and/or 816 as text and/or speech in the determined 1002 spoken language.

In an example, method 400 includes receiving 1014, by the processor(s) 243, configuration information for an audible speech response style for transmitting 404 the response 254 to the request 252 to the user 256. The response style received 1014 for transmitting 404 the response 254 to the request 252 to the user 256 may include a voice gender, a volume, a spoken language, and a speech rate (e.g., words per minute). In the example, method 400 includes storing 1016 this received 1014 configuration information in memory 240. In the example, transmitting 404 the response 254 to the user 256 includes transmitting 1018 the response to the user 256 in the received 1014 and/or stored 1016 response style.

Figure 11:
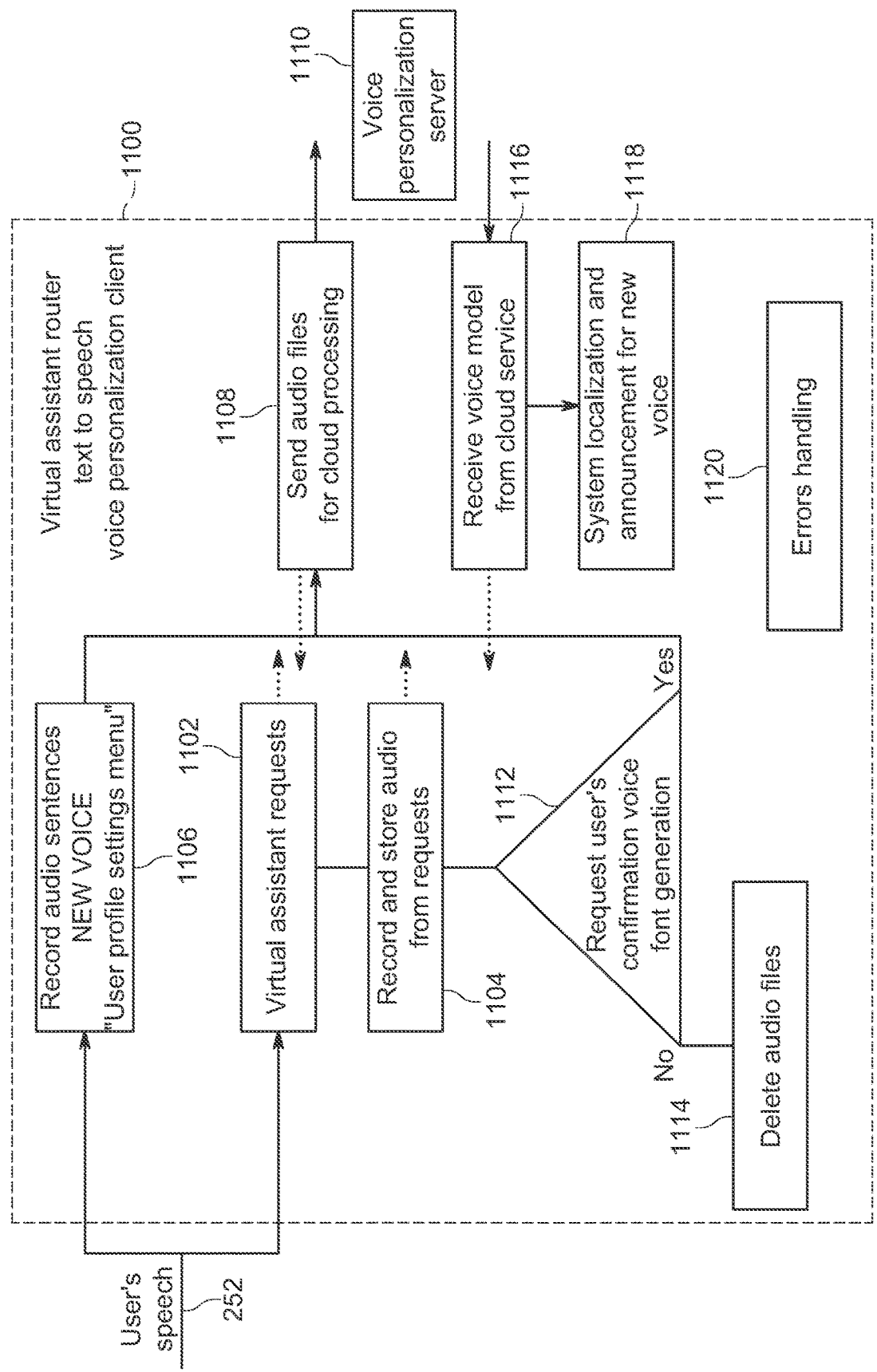
FIG. 11 is block diagram illustrating exemplary aspects of a system for processing requests from users of an infotainment system.
Figure 12:
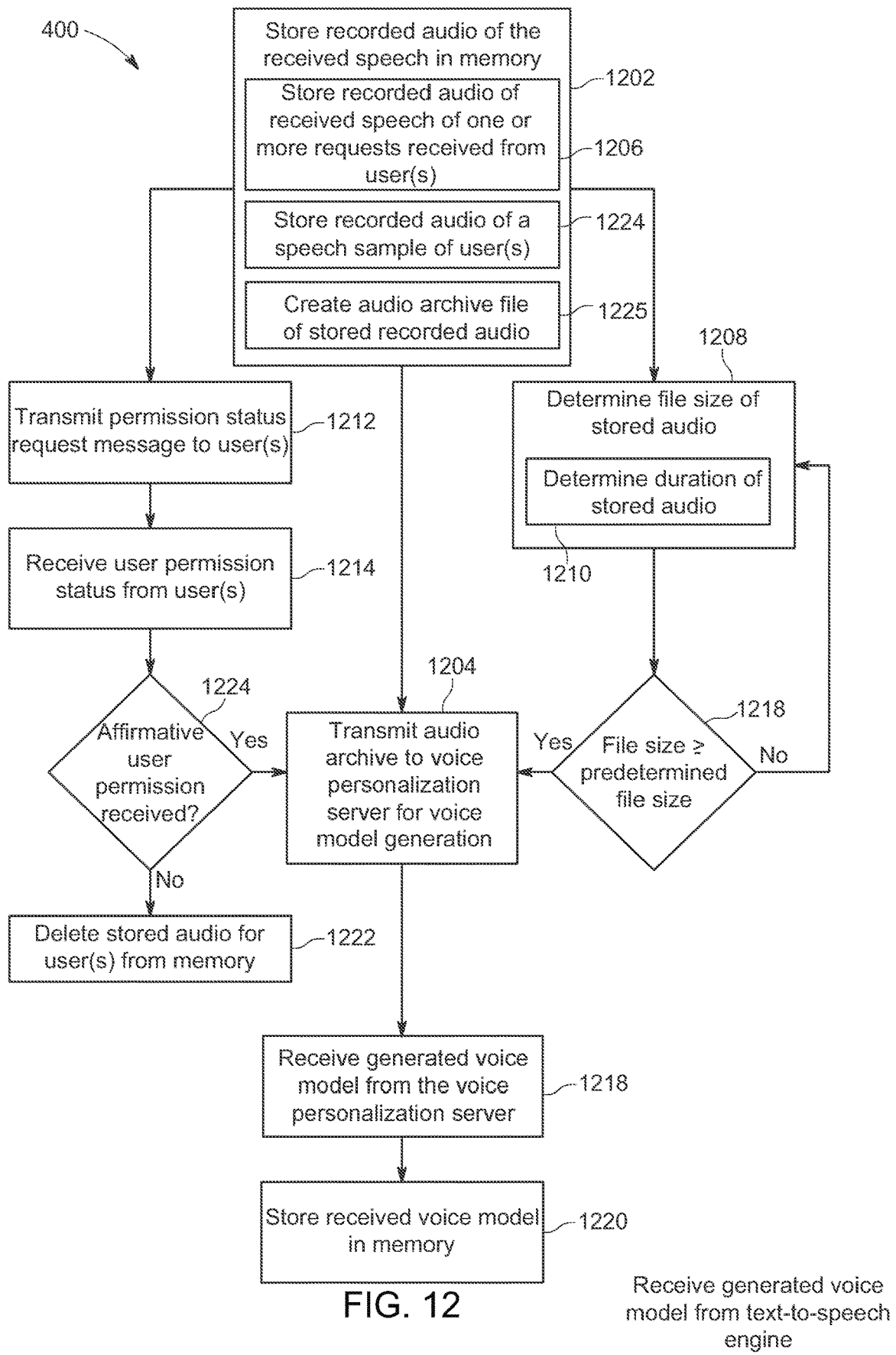
FIG. 12 is a flow chart diagram illustrating exemplary aspects of the method shown in FIG. 4.

FIG. 11 is block diagram of one aspect of a system 1100 for processing requests 252 from users 256 of an infotainment system (e.g., system 200). FIG. 12 is a flow chart of exemplary aspects of method 400 according to exemplary embodiments of the disclosure. Referring to FIGS. 1-12, system 1100 may be a subsystem of system 200 and may be implemented, at least in part by system 200. System 1100 utilizes the one or more I/O devices of system 200. For example, system 1100 utilizes microphone(s) 202 in communication with processor(s) 243. The user 256 may include one or more users 256 of the infotainment system (e.g., system 200).

Referring to FIGS. 11 and 12, method 400 includes storing 1202, by the processor(s) 243, recorded audio of the received speech of the user(s) 256 in memory 240. In one example, to store 1202 the recorded audio of the received speech, in blocks 1102 and 1104, processor(s) 243 create 1225 an audio archive file from the recorded audio and store 1206 the recorded audio of the received speech of one or more requests 252 received from the one or more users 256 in memory 240. In another example, to store 1202 the recorded audio of the received speech, in a block 1106, processor(s) 243 create 1225 an audio archive file from the recorded audio and store 1224 the recorded audio of speech sample(s) of the user(s) 256 in memory 240. The speech sample may include one or more fixed sentences for which user(s) 256 is/are prompted to pronounce in their desired spoken language. The one or more fixed sentences may be predetermined by system 200 user(s) 256 and/or designer(s), and stored in memory 240. The recorded audio of the speech sample(s) and/or of the request(s) of the user(s) 256 is stored (1206 and/or 1224) in memory 240 as an audio archive file.

Method 400 includes transmitting 1204, by processor(s) 243 in a system 1100 block 1108, and using transceiver(s) 238, the archive audio file of the stored 1202 audio to a text-to-speech (TTS) engine 1110 (e.g., running on a voice personalization server) for voice model generation (e.g., Acapela®, resident on a voice personalization server accessible to system 200 via network 150 and/or resident in system 200 as an embedded version). In one embodiment, method 400 includes determining 1208, by processor(s) 243, a file size of the stored 1202 audio. In an example, to determine 1208 the file size of the stored 1202 audio, processor(s) 243 determine 1210 a duration of the stored 1202 audio. In the example, the file size of the stored 1202 audio is determined 1208 based on the determined 1210 duration of the stored 1202 audio. For instance, the determined 1210 duration of the stored 1202

In an example, determining 1208 the file size of the stored 1202 audio includes utilizing a logic operation 1224 to determine if the file size of the stored 1202 audio is greater than (or greater than or equal to) a predetermined file size value stored in memory 240. In the example, transmitting 1204 the stored 1202 audio to the TTS engine 1110 includes transmitting 1204 the stored 1202 audio to the TTS engine 1110 (e.g., running on a voice personalization server) in response to the stored 1202 audio exceeding (or attaining) the predetermined file size value stored in memory 240.

In another embodiment, method 400 includes transmitting 1212, by the processor(s) 243, a message to the user 256 requesting a user permission status to transmit 1204 the stored 1202 audio (e.g., archive audio file(s) for the stored 1206 received speech of the request(s) 252 and/or files for the stored 1224 speech sample) to the TTS engine 1110 (e.g., running on a voice personalization server). In an example, in a system 1100 block 1112, processor(s) 243 transmit 1212 user permission status request message(s) to user(s) 256 using display(s) 234, GUIs 502, and/or audio loudspeaker(s) 232. In the embodiment, method 400 includes receiving 1214 the user permission status from the user(s) 256 for whom the recorded audio was stored 1202.

In an example, processor(s) 243 utilize a logic operation 1224 (e.g., in a block 1112 of system 1100) to determine if an affirmative user permission status is received 1214. In the example, if processor(s) 243 determine that an affirmative user permission status is not received 1214 (or a negative user permission status is received 1214) from user(s) 256, method 400 includes deleting 1222, by processor(s) 243 (e.g., in a system 1100 block 1114) the stored 1202 audio of the user(s) 256 for whom the recorded audio of the request 252 received as speech, and/or the recorded audio of the speech sample, was stored 1202 from memory 240.

In the example, if processor(s) 243 utilizing logic operation 1224 determined that an affirmative user permission status is received 1214, method 400 includes transmitting 1204, by processor(s) 243 and using transceiver(s) 238, the stored 1202 audio to the TTS engine 1110 (e.g., running on a voice personalization server) for voice model generation. Following the voice model being generated by the TTS engine 1110, method 400 includes receiving 1218, by processor(s) 243 (e.g., in a system 1100 block 1116) and using transceiver(s) 238, the generated voice model from the TTS engine 1110 (e.g., running on a voice personalization server), and storing 1220, by the processor(s) 243, the received 1218 voice model in memory 240. In an example, processor(s) 243 utilize a system 1100 block 1118 to store 1220 the received 1218 voice model in memory 240 according to a user identity of the user 256 for whom the recorded audio of the request 252 received as speech was stored 1202 (e.g., in a like manner as shown and described with respect to the data structure 906 of FIG. 9). In an embodiment, system 1100 includes a block 1120 for facilitating processor(s) 243 handling errors with respect to the transmitting 1204, receiving 1218, and/or storing 1220 processes described above for method 400.

Figure 13:
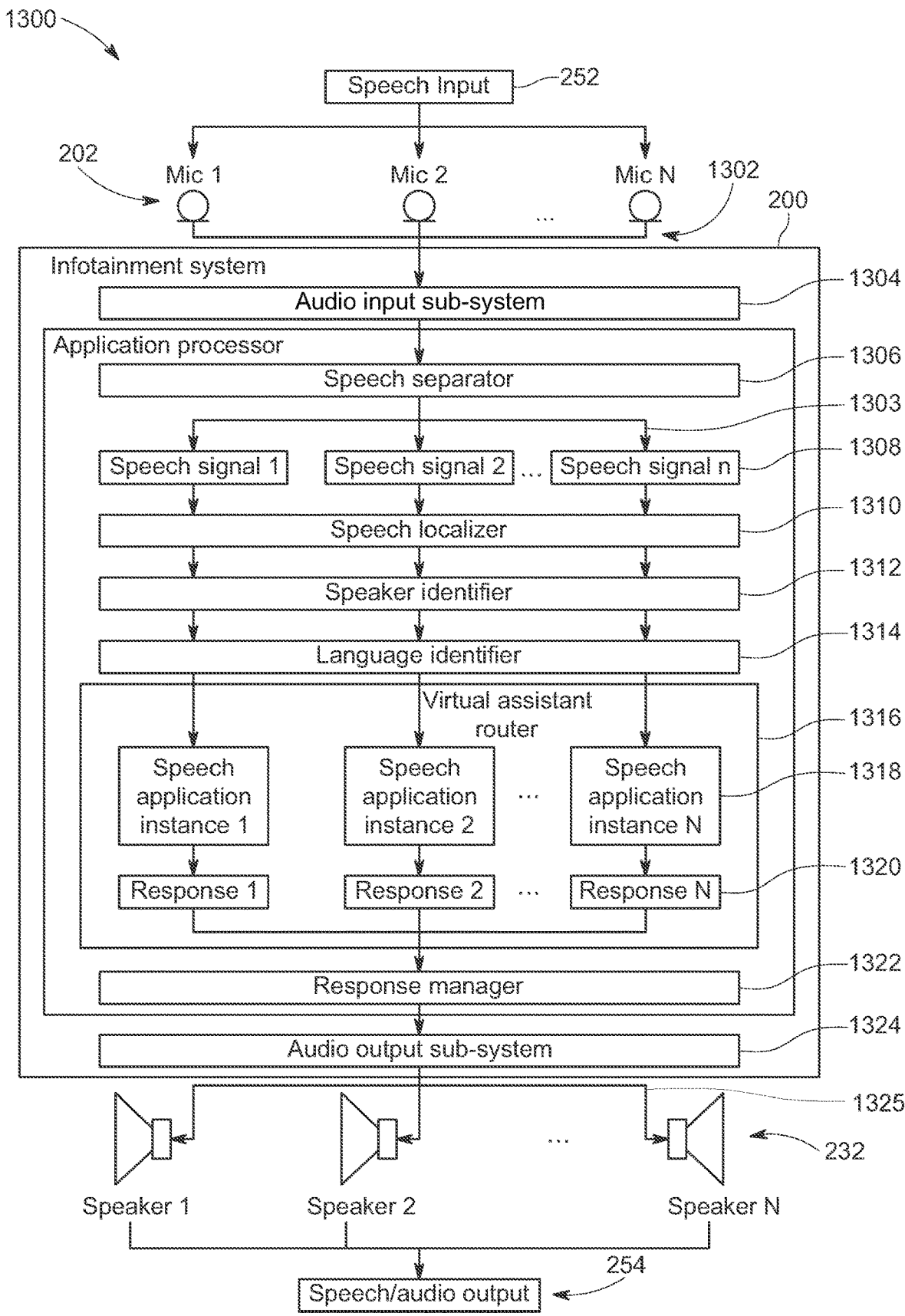
FIG. 13 is a block diagram illustrating exemplary aspects of a system for processing requests from users of an infotainment system.

FIG. 13 is a block diagram of one aspect of a system 1300 for processing requests 252 from users 256 of an infotainment system (e.g., system 200). FIGS. 14A-16 are flow charts of exemplary aspects of method 400 according to exemplary embodiments of the disclosure. Referring to FIGS. 1-16, system 1300 may be a subsystem of system 200 and may be implemented, at least in part by system 200. System 1300 utilizes the one or more I/O devices of system 200. For example, system 1300 utilizes microphone(s) 202 and audio loudspeaker(s) 232 in communication with processor(s) 243. The user 256 may include one or more users 256 of the infotainment system (e.g., system 200).

The embodiments shown and described herein provide a new and improved methodology and system architecture for presenting speech feedback from a speech recognition application in an environment (e.g., automobile) for infotainment system operations and interactions by users. In operation, the user experience of multi-user, concurrent operation of speech recognition applications is improved as compared to known systems and methods.

In cases where one or more vehicle passengers using a speech recognition application on the infotainment system, any auditory feedback from the speech application is played only in the audio zone in the passengers invoking the speech recognition application is seated. Additionally, any speech-based feedback from the speech application is synthesized using the identified language spoken by the user.

In cases where multiple vehicle passengers using a speech recognition application on the infotainment system concurrently, simultaneously and/or consecutively, auditory feedback (e.g., responses 254 to user 256 requests 252) are presented according to schemes such as: (a) from among the several spoken voice commands (e.g., requests 252), the infotainment system answers each of the voice commands in a first in-first out (FIFO), a last in-first out (LIFO), or shortest response time fashion (e.g., based on respectively determined processing times for each of the requests 252); FIFO, LIFO or shortest response time style may be selectable by user(s) ahead of time; (b) for each voice command received simultaneously, the infotainment system precedes the response by speaking, using text-to-speech (TTS), the name of the user who issued the voice command, or the name of the audio zone (e.g., "rear left user", "driver", "front passenger", etc.); and (c) for each voice command received simultaneously, the infotainment system precedes the response by speaking, using TTS, a rephrased version of the voice command. In the disclosure, "response time" is used synonymously with "processing time" and "computation time," and refers to an amount of time it takes for a user 256 to receive a response 254 to their request 252.

One or multiple users' 256 speech is captured by a plurality of microphones 202. The raw speech signal is processed by a speech signal separator processing block 1306, which separates the multi-user speech signal into individual speech signals 1308 containing the recorded speech of each user in the vehicle. The speech signal separator 1306 is also responsible for calculating the time of arrival of each speech signal 1308 (e.g., corresponding to users 256 who spoke first) and the duration of each speech signal (how long they spoke for); these values are used for later use as input to the response manager 1322. The individual speech signals 1308 are each passed through a speech localizer processing block 1310, which identifies the position source of each speech signal 1308 relative to the vehicle cabin (e.g., driver, front passenger, rear left passenger, rear right passenger, etc.). The position of each speech signal 1308 is stored for later use as input to the response manager 1322. The individual speech signals 1308 are then passed through a speaker identifier processing block 1312, which identifies the speaking user's voice against a set of pre-registered user profiles (e.g., Bob, Cindy, Tina, Larry, Guest, etc.). The profile name associated with each speech signal 1308 is stored for later use as input to the response manager 1322. The individual speech signals 1308 are then passed through a language identifier processing block 1314, which identifies the spoken language. The spoken language associated with each speech signal 1308 is stored for later use as input to both the virtual assistant router 1316 and the response manager 1322. The individual speech signals 1308 are then passed to an instance of the speech application 1318 within the virtual assistant router 1316. Each instance of the speech application 1318 converts the individual speech signals 1308 into text (e.g., "What's the weather in San Diego, California?"). Each instance of the speech application 1318 uses the identified language from the individual speech signal 1308 to select which language the speech application 1318 should use for presenting feedback to the user 256. The speech application instance 1318 generates a text response 1320 in the identified language, according to its own dialogue logic. The speech application 1318 instance also generates a rephrased version of each speech signal's 1308 command (e.g., request 252) ("weather in San Diego, Calif."), as well as the response time for the speech command 1308. The text response is sent to the response manager 1322. The response manager 1322 converts the text response into a synthesized speech signal 1325 and plays the response 254 using the vehicle's audio system (e.g., audio loudspeakers 232).

The inputs to the response manager are, or include: 1) time of arrival of each speech signal 1308; 2) duration of each speech signal 1308; 3) source position of each speech signal 1308; 4) profile name associated for the source position; 5) identified spoken language; and 6) response style (e.g., as determined by a user setting).

For each speech command and/or request 252 spoken 1318 concurrently, simultaneously and/or consecutively by a plurality of users 256, the response manager 1322 presents the synthesized speech signal 1325 for the feedback and/or response 254 according to a unique pattern. First, the response manager 1322 determines the sequence ("Response Style") of presenting the speech feedback/response 254. In the case of FIFO response style, a speech input request 252 whose arrival time was first, as determined by the speech signal separator 1306, is responded to first. Then, the next speech input request 252 whose arrival time was second, relative to the speech input request 252 whose arrival time was first, or computation time was second fastest, relative to the speech input request 252 whose computational time was first, is responded to next, and so on. In the case of LIFO, the speech input request 252 whose arrival time was last, as determined by the speech signal separator 1306, is responded to first. Then, the next most recent speech input request 252 whose arrival was second before last, relative to the speech input request 252 whose arrival time was last, is responded to, and so on. Alternatively, the speech input request 252 whose computation time was shortest is responded to first.

After determining the sequence of presentation of speech feedback/response 254, the response manager 1322 prepends the profile name of the user 256 (e.g., John) who spoke the command/request 252 originally, to the text response 1320. After appending the profile name, the response manager 1322 appends a rephrased version of the speech command after the profile name (e.g., John), but before any additional text response 1320. Afterward, the response manager 1322 plays the appropriate response using the vehicle's audio system (e.g., audio loudspeakers 232), using only the loudspeaker(s) 232 proximate to the user 256.

The following two tables illustrate example use cases according to some of the disclosed embodiments:

| Vehicle seating configuration: | Spoken commands uttered simultaneously: | Speech signal time of arrival | Response Time |
|---|---|---|---|
| John (driver) | "What's the weather in San Diego California?" | n sec | 0.5 sec |
| Mary (front passgr.) | "Change the temperature to 68 degrees" | n + 1 sec | 0.75 sec |
| Dave (rear left passgr.) | "Play the Beatles" | n + 2 sec | 0.1 sec |
| Guest (rear right pasgrs.) | "In what year did the Beatles release their last studio album?" | n + 3 sec | 1.5 sec |

| System Response (FIFO) | System Response (LIFO) | System Response (shortest response time) |
|---|---|---|
| (spoken over driver loudspeakers) "John, you asked about the weather in San Diego, it's 68 and sunny" (spoken over front passgr. loudspeakers) "Mary, you want the temperature changed to 68, I'll go ahead and do that" (spoken over rear left passgr. loudspeakers) "Dave, you wanted to play the Beatles, I'll add Rubber Soul to the playlist" (spoken over rear right passgr. loudspeakers) "Rear right guest, you wanted to know when the last studio album was released by the Beatles, it was Let it Be, in 1970" | (spoken over rear right passgr. loudspeakers) "Rear right guest, you wanted to know when the last studio album was released by the Beatles, it was Let it Be, in 1970" (spoken over rear left passgr. loudspeakers) "Dave, you wanted to play the Beatles, I'll add Rubber Soul to the playlist" (spoken over front passgr. loudspeakers) "Mary, you want the temperature changed to 68, I'll go ahead and do that" (spoken over driver loudspeakers) "John, you asked about the weather in San Diego, it's 68 and sunny" | (spoken over rear left passgr. loudspeakers) "Dave, you wanted to play the Beatles, I'll add Rubber Soul to the playlist" (spoken over driver loudspeakers) "John, you asked about the weather in San Diego, it's 68 and sunny" (spoken over front passgr. loudspeakers) "Mary, you want the temperature changed to 68, I'll go ahead and do that" (spoken over rear right passgr. loudspeakers) "Rear right guest, you wanted to know when the last studio album was released by the Beatles, it was Let it Be, in 1970" |

Figure 14A:
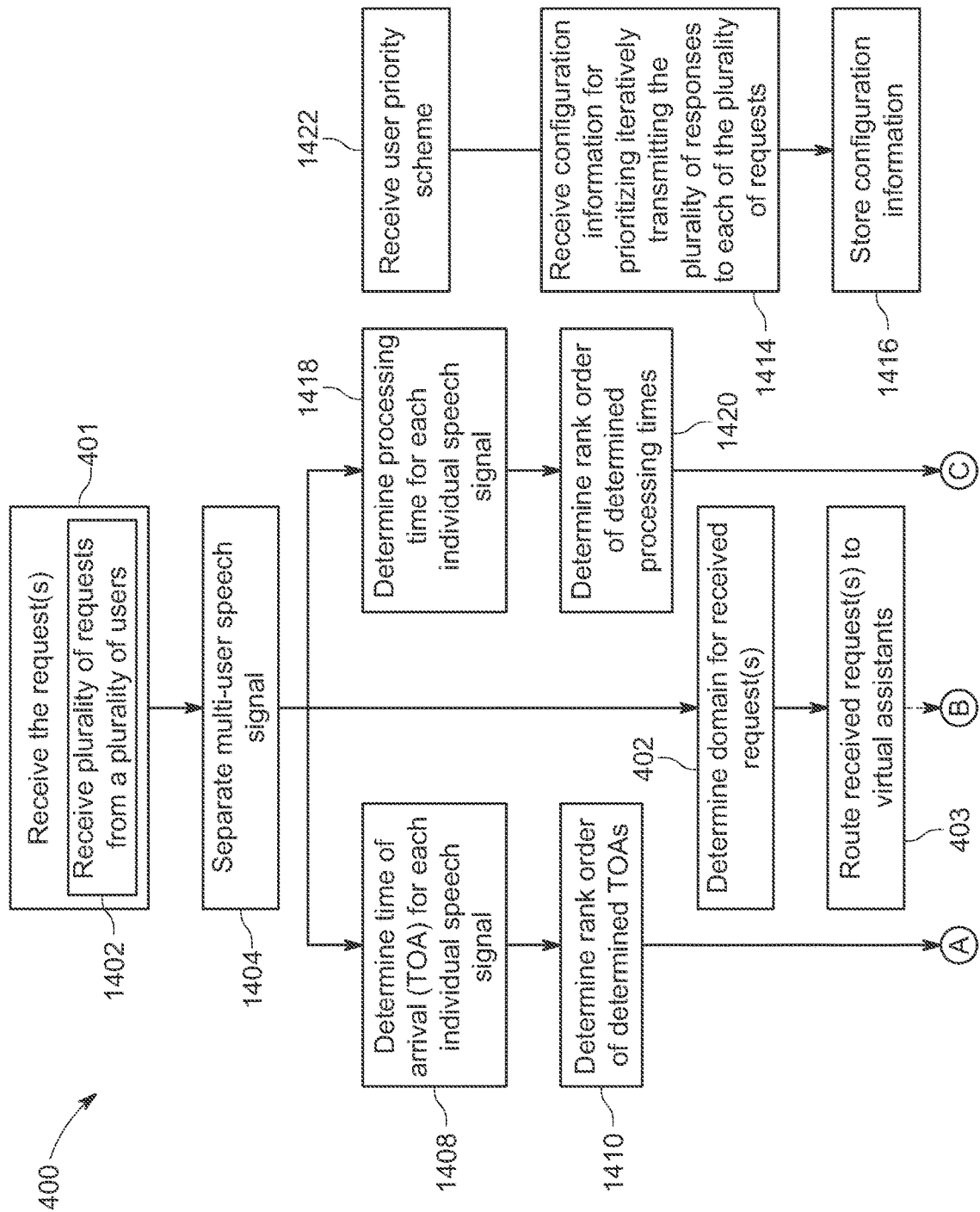
FIG. 14A is a flow chart diagram illustrating exemplary aspects of the method shown in FIG. 4.
Figure 14B:
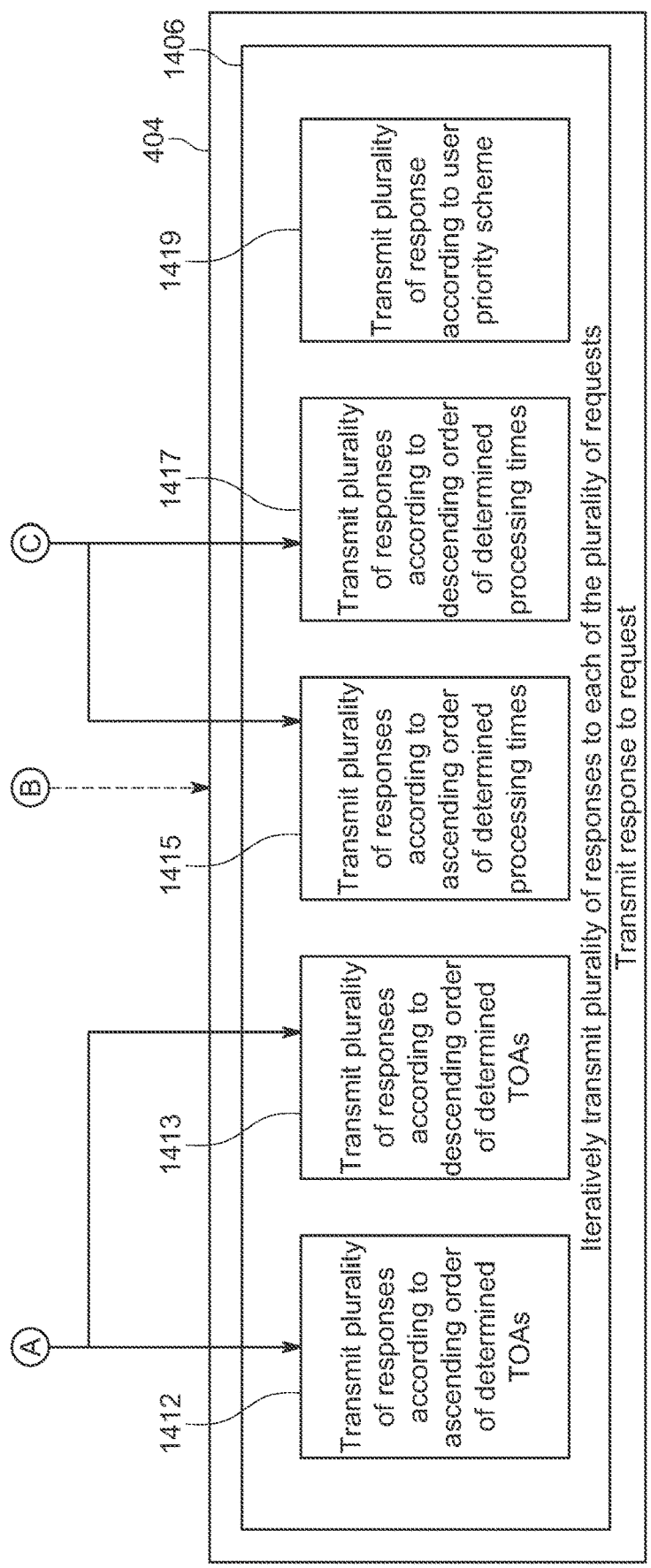
FIG. 14B is a flow chart diagram illustrating exemplary aspects of the method shown in FIG. 4.

Referring to FIGS. 13, 14A and 14B, in an example, receiving 401 the request 252 in method 400 includes receiving 1402, by the processor(s) 243 and using, for example, microphone(s) 202, a plurality of requests 252 from a plurality of users 256 of the infotainment system (e.g., system 200). In an embodiment, the plurality of requests 252 are received 1402 concurrently. In another embodiment, the plurality of requests 252 are received consecutively. In the example, each of the plurality of users 256 are positioned in a plurality of spatially-separated audio zones. For instance, a first user 256 is seated in a driver's seat of a car, a second user 256 is seated in a front passenger seat of the car, and a third user 256 is seated in a rear passenger seat of the car. System 1300 includes a plurality of microphones 202, and at least one microphone 202 of the plurality of microphones 202 is positioned in each of the plurality of spatially-separated audio zones (e.g., of the car). In the example, each microphone 202 is conveniently accessible by a respective user 256 of the plurality of users 256 for purposes as system 200 input 201.

In the example, the request 252 received 401 as speech may include a multi-user speech signal 1302 input via the microphones 202 to an audio input subsystem block 1304 of system 1300. From block 1304, the multi-user speech signal 1302 is relayed or otherwise transmitted by processor(s) 243 to a speech separator block 1306 of system 1300. In the example, method 400 includes separating 1404, by the processor(s) 243 and using, for instance, block 1306, the multi-user speech signal 1302 into a plurality of individual speech signals 1303. Each of the plurality of individual speech signals 1303 correspond to a respective received 401 request 252 for each of the plurality of users 256. Each of the plurality of individual speech signals 1303 are illustrated in FIG. 13 as speech signal blocks 1310 for users 256 (e.g., 1, 2, ..., N). Each of the plurality of individual speech signals 1303 includes the information contained in the respectively received 401 request 252.

In an example, method 400 includes determining 1408, by the processor(s) 243 using, for instance, block 1306 of system 1300, a time of arrival (TOA) for each of the plurality of individual speech signals 1303. In the example, method 400 includes determining 1410, by the processor(s) 243 using, for instance, block 1306, a rank order of the determined 1408 TOAs.

In an example, for each of the plurality of individual speech signals 1303, method 400 includes determining 1418, by the processor(s) 243 and using, for instance, block 1306 of system 1300, a processing time for determining 402 the domain 509 for the received request 252 based on the information contained in the received 401 request 252. In the example, method 400 includes determining 1420, by the processor(s) 243 using, for instance, block 1306, a rank order of determined 1418 processing times.

In an example, the method 400 step of transmitting 404 the response 254 to the request 252 to the user 256 includes iteratively transmitting 1406, by the processor(s) 243 in, for instance, the virtual assistant route block 1316 of system 1300, and using, for instance, audio loudspeaker(s) 232, a plurality of responses 254 to each of the plurality of requests 252. In the virtual assistant router block 1316 of system 1300, processor(s) 243 iteratively determine (e.g., perform the determining 402 step of method 400 iteratively for each of the plurality of requests 252) and iteratively route (e.g., perform the routing 403 step of method 400 iteratively for each of the plurality of requests 252).

In an example, processor(s) 243 determine a respective domain 509 for each of the plurality of requests 252 based on the information contained in each individual speech signal 1303. Thus, for each of the plurality of individual speech signals 1303, processor(s) 243 use transceiver(s) 238 in respective instances of blocks 1318 and 1320 (e.g., 1, 2, ..., N), route 403 each request 252 and receive and transmit 404 (e.g., in response manager 1322 and audio output subsystem 1324 blocks) corresponding responses 254 to one or more audio loudspeaker(s) 232. In one embodiment, the functionality processor(s) 243 implement or otherwise facilitate in block 1316 is or includes the processes shown and described above with respect to FIGS. 5-8.

In one embodiment, iteratively transmitting 1406 the plurality of responses 254 includes first transmitting 1412, by the processor(s) 243 using audio loudspeaker(s) 232, one of the plurality of responses 254 having the least determined 1408 TOA. Alternatively, in the embodiment, iteratively transmitting 1406 the plurality of responses 254 includes first transmitting 1413, by processor(s) 243 using loudspeaker(s) 232, one of the plurality of responses 254 having the greatest determined 1408 TOA Likewise, in the embodiment, the processor(s) 243 may iteratively transmit 1406 the plurality of responses 254 according to either an ascending order of determined 1408 TOAs, or a descending order of determined 1408 TOAs.

In another embodiment, iteratively transmitting 1406 the plurality of responses 254 includes first transmitting 1415, by the processor(s) 243 using, for instance, audio loudspeaker(s) 232, one of the plurality of responses 254 having the least determined 1418 processing time. Alternatively, in the embodiment, iteratively transmitting 1406 the plurality of responses 254 includes first transmitting 1417, by processor(s) 243 using loudspeaker(s) 232, one of the plurality of responses 254 having the greatest determined 1418 processing time. Likewise, in the embodiment, the processor(s) 243 may iteratively transmit 1406 the plurality of responses 254 according to either an ascending order of determined 1418 processing times, or a descending order of determined 1418 processing times.

In an example, method 400 includes receiving 1414, by processor(s) 243 and using, for instance, GUI 502, configuration information for prioritizing iteratively transmitting 1406 the plurality of responses 254 to each of the plurality of requests 252 according to the determined 1408 TOAs and/or determined 1418 processing times. In the example, method 400 includes storing 1416, by the processor(s) 243 and in memory 240, the configuration information for prioritizing iteratively transmitting 1406 the plurality of responses 254. The received configuration information for prioritizing iteratively transmitting 1406 the responses 254 to the requests 252 directs processor(s) 243 to iteratively transmit 1406 the responses 254 (e.g., via loudspeaker(s) 232) to requests 252 using as priority ordering for this transmitting 1406 the respectively determined (1408 and/or 1418) TOAs and/or processing times, but not to direct processor(s) 243 to sequence of otherwise give priority to specific virtual assistant(s) 246 from among a plurality of the same.

In one embodiment, the received 1414 and/or stored 1416 configuration information specifies or otherwise directs processor(s) 243 to iteratively transmit 1406 the plurality of responses 254 according to either the descending order of determined 1408 TOAs or the ascending order of determined 1408 TOAs. In another embodiment, the received 1414 and/or stored 1416 configuration information specifies or otherwise directs processor(s) 243 to iteratively transmit 1406 the plurality of responses 254 according to either the descending order of determined 1418 processing times or the ascending order of determined 1418 processing times.

In an example, the method 400 step of receiving 1414 and storing 1416 the configuration information for prioritizing iteratively transmitting 1406 to plurality of responses 254 includes receiving 1420 and storing 1416, by the processor(s) 243 and using, for instance, GUI 502, a user priority scheme for prioritizing iteratively transmitting 1406 the plurality of responses 254. The user priority scheme specifies or otherwise directs processor(s) 243 to iteratively transmit 1406 a first response 254 of the plurality of responses 254 to a first user 256 of the plurality of users 256 before iteratively transmitting 1406 at least a second response 254 to at least a second user 256. In one embodiment, the user priority scheme operates in the iteratively transmitting 1406 step of method 400 instead of, or in addition to, iteratively transmitting 1406 the plurality of responses according to determined 1408 TOAs and/or determined 1418 processing times. Thus, wherein the user priority scheme is received 1414 and/or stored 1416, iteratively transmitting 1406 the plurality of responses 254 includes iteratively transmitting 1419, by processor(s) 243 using loudspeaker(s) 232, the plurality of responses 254 according to the user priority scheme.

Figure 15:
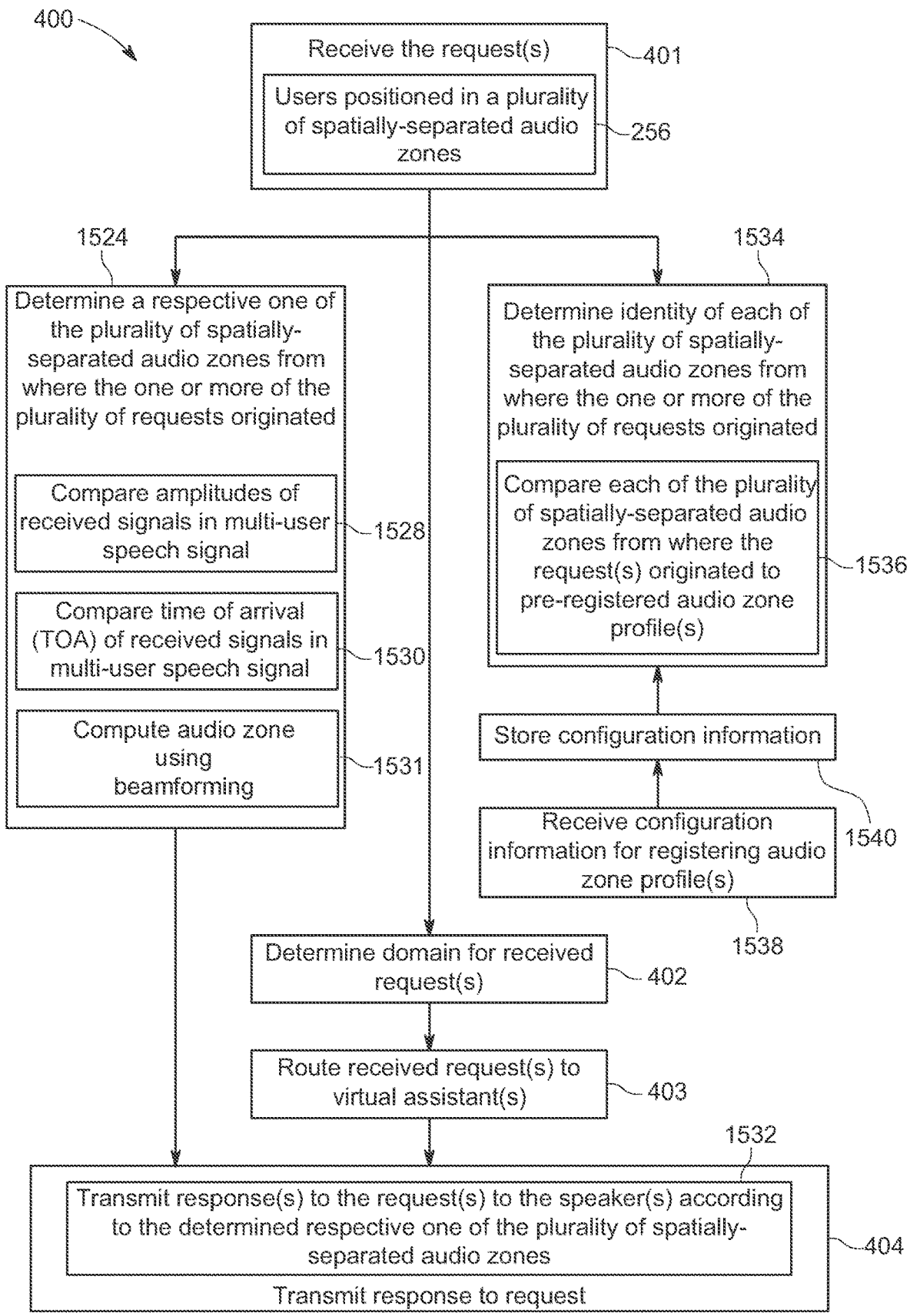
FIG. 15 is a flow chart diagram illustrating exemplary aspects of the method shown in FIG. 4.

Referring to FIGS. 13 and 15, method 400 includes determining 1524, by the processor(s) 243 using, for instance, the speech localizer block 1310 of system 1300, a respective one of the plurality of spatially-separated audio zones from where one or more of the plurality of requests 252 originated. In one embodiment, determining 1524 the respective one of the plurality of spatially-separated audio zones from where the request(s) 252 originated includes comparing 1528, by the processor(s) 243, amplitudes of received signals in the multi-user speech signal 1302. In the embodiment, processor(s) 243 may concurrently receive 401 one of the request(s) 252 via two or more microphones 202, and the microphone 202 providing a greatest speech signal amplitude may correspond to the respective one of the plurality of spatially-separated audio zones from where the request(s) 252 originated.

In another embodiment, determining 1524 the respective one of the plurality of spatially-separated audio zones from where the request(s) 252 originated includes use of beamforming to compute 1531 the audio zone. In yet another embodiment, determining 1524 the respective one of the plurality of spatially-separated audio zones from where the request(s) 252 originated includes comparing 1530, by the processor(s) 243, TOAs of received signals in the multi-user speech signal 1302. In the embodiment, processor(s) 243 may concurrently or consecutively receive 401 one of the request(s) 252 via two or more microphones 202, and the microphone 202 providing a signal having the least determined 1408 TOA may correspond to the respective one of the plurality of spatially-separated audio zones from where the request(s) 252 originated. In yet another embodiment, determining 1524 the respective one of the plurality of spatially-separated audio zones from where the request(s) 252 originated includes both of the above described comparing steps (1528 and 1530). In still another embodiment, determining 1524 the respective one of the plurality of spatially-separated audio zones from where the request(s) 252 originated includes any combination of the comparing 1528, beamforming 1531, and comparing 1530 steps.

In an example, the I/O device(s) include a plurality of audio loudspeakers 232, and at least two of the plurality of spatially-isolated audio zones includes a respective one or more loudspeaker(s) 232. In the example, the method 400 step of transmitting 404 the response 254 to the request 252 to the user 256 includes transmitting 1532, by the processor(s) 243, each of the plurality of responses 254 to the respective one or more loudspeaker(s) 232 according to the determined 1524 respective one or more of the plurality of spatially-separated audio zones.

In another example, each of the plurality of spatially-isolated audio zones includes a respective one or more audio loudspeakers 232 of the plurality of loudspeakers 232. In the example, the method 400 step of transmitting 404 the response 254 to the request 252 to the user 256 includes transmitting 1532, by the processor(s) 243, each of the plurality of responses 254 to the respective one or more loudspeakers 232 according to the determined 1524 respective one of the plurality of spatially-separated audio zones.

In an example, method 400 includes determining 1534, by the processor(s) 243 in, for instance, system 1300 block 1310, an identity of each of the plurality of spatially-separated audio zones from where the one or more of the plurality of requests 252 originated. In one embodiment, determining 1534 the identity of the each of the plurality of spatially-separated audio zones includes comparing 1536, by the processor(s) 243, each of the plurality of spatially-separated audio zones from where the one or more requests 252 originated to one or more pre-registered audio zone profiles stored in memory 240. In another embodiment, determining 1534 the identity of the each of the plurality of spatially-separated audio zones includes reading, by the processor(s) 243, identifying information encoded in signals received 401 from respective microphones 202. In the embodiment, each of the plurality of microphones 202 may transmit a unique piece of identifying information along with the audio signal of the request 252. For instance, along with transmitting the audio signal of the request 252, each of the plurality of microphones 202 may also transmit data in the form of an identification number or other alphanumeric string as, for example, and without limitation, as a header. In the embodiment, determining 1534 the identity of the each of the plurality of spatially-separated audio zones includes comparing, by processor(s) 243, the read identifying information to corresponding microphone 202 identifying information stored in memory 240. In this manner, processor(s) 243 determine 1534 the identity of the each of the plurality of spatially-separated audio zones based on the read identifying information for the respective microphone 202.

In an example, method 400 includes receiving 1538, by processor(s) 243 and using, for instance, GUI 502, configuration information for registering audio zone profile(s) for one or more of the plurality of spatially-separated zones; and store 1540 this configuration information in memory 240. In the example, method 400 includes storing 1540 this configuration information for registering audio zone profile(s) in memory 240. The audio zone profile(s) include a name and/or a location for the one or more of the plurality of spatially-separated audio zones.

Figure 16:
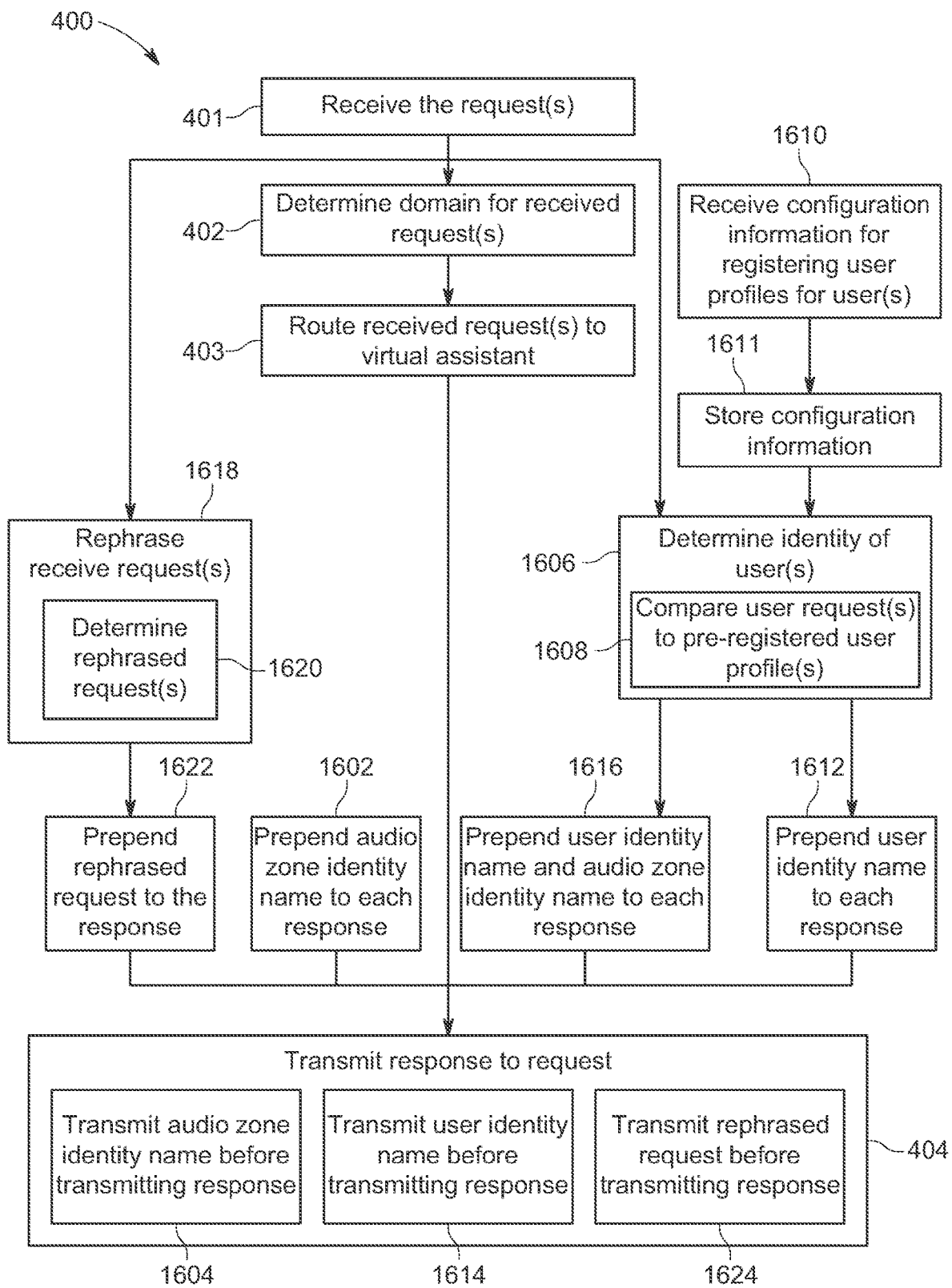
FIG. 16 is a flow chart diagram illustrating exemplary aspects of the method shown in FIG. 4.

Referring to FIGS. 13 and 16, method 400 includes determining 1606, by the processor(s) 243 in, for instance, the speaker identifier block 1312 of system 1300, an identity of each of the plurality of users 256 from whom the one or more of the plurality of requests 252 originated. In one embodiment, processor(s) 243 determine 1606 the identity of each of the plurality of users 256 based on information contained in the plurality of individual speech signals 1303. In the embodiment, determining 1606 the identity of each of the plurality of users 256 includes comparing 1608 each of the plurality of users 256 from whom the one or more of the plurality of requests 252 originated to one or more pre-registered user profiles stored in memory 240. In another embodiment, determining 1606 the identity of each of the plurality of users 256 includes reading, by the processor(s) 243, each of the individual speech signals 1303 and comparing, by processor(s) 243, the read signals 1303 to user 256 speech profiles stored in memory 240. In this manner, processor(s) 243 determine 1606 the identity of the each of the plurality of users 256 based on the read signals 1303 received 401 from the respective microphone(s) 202.

In an example, method 400 includes receiving 1610, by processor(s) 243 and using, for instance, GUI 502, configuration information for registering user profile(s) for one or more users 256 of the infotainment system (e.g., system 200). In the example, method 400 includes storing 1611, by the processor(s) 243, the configuration information for registering user profile(s) in memory 240. The user profile(s) include at least one of a first name, a last name, a nickname, and a title, for the one or more users 256.

In the language identifier block 1314 of system 1300, processor(s) 243 determine the spoken language for each of the plurality of individual speech signals 1303. In an example, processor(s) 243 determine the spoken language for each individual speech signal 1303 based on the information contained in each individual speech signal 1303. In one embodiment, the functionality processor(s) 243 implement or otherwise facilitate in block 1314 is or includes the processes shown and described above with respect to FIGS. 9-12.

In one example, method 400 includes prepending 1602, by the processor(s) 243 in, for instance, the response manager block 1322 of system 1300, a name of a respectively determined 1534 audio zone identity to each of the plurality of responses 254. In the example, the method 400 step of transmitting 404 the response 254 to the request 252 to the user 256 includes transmitting 1604, by processor(s) 243 using audio loudspeaker(s) 232, the name of the respectively determined 1534 audio zone identity prior to transmitting 404 the response 252.

In another example, method 400 includes prepending 1612 by processor(s) 243 in, for instance, response manager block 1322, a name of a respectively determined 1606 user identity to each of the plurality of responses 252. In the example, the method 400 step of transmitting 404 the response 254 to the request 252 to the user 256 includes transmitting 1614, by processor(s) 243 using loudspeaker(s) 232, the name of the respectively determined 1606 user identity prior to transmitting 404 the response 252.

In yet another example, method 400 includes prepending 1616 by processor(s) 243 in, for instance, response manager block 1322, both the name of the respectively determined 1606 user identity and the name of the respectively determined 1534 audio zone identity, to each of the plurality of responses 252. In the example, the method 400 step of transmitting 404 the response 254 to the request 252 to the user 256 includes transmitting, by processor(s) 243 in, for instance, response manager block 1322, both the name of the respectively determined 1606 user identity and the name of the respectively determined 1534 audio zone identity, prior to transmitting 404 the response 252.

In still another example, method 400 includes rephrasing 1618, by processor(s) 243 in, for instance, response manager block 1322, the received 401 request 252. In the example, rephrasing 1618 the request 252 includes determining 1620, by processor(s) 243 in, for instance, block 1322, a rephrased request 252 based on the information contained in the request 252 and/or based on information contained in the respective individual speech signal 1303.

In one embodiment, method 400 includes prepending 1622, by the processor(s) 243 in, for instance, block 1322, the rephrased request 252 to the response 254 to the request 242. In one example, the method 400 step of transmitting 404 the response 254 to the request 252 to the user 256 includes transmitting 1624 the rephrased request 252 prior to transmitting 404 the response 254 to the received 401 request 252. In another example, the method 400 step of transmitting 404 the response 254 to the request 252 to the user 256 includes transmitting the rephrased request 252 and transmitting one or more of the respectively determined 1606 user identity and the name of the respectively determined 1534 audio zone identity, prior to transmitting 404 the response 254 to the received 401 request 252.

Figure 17:
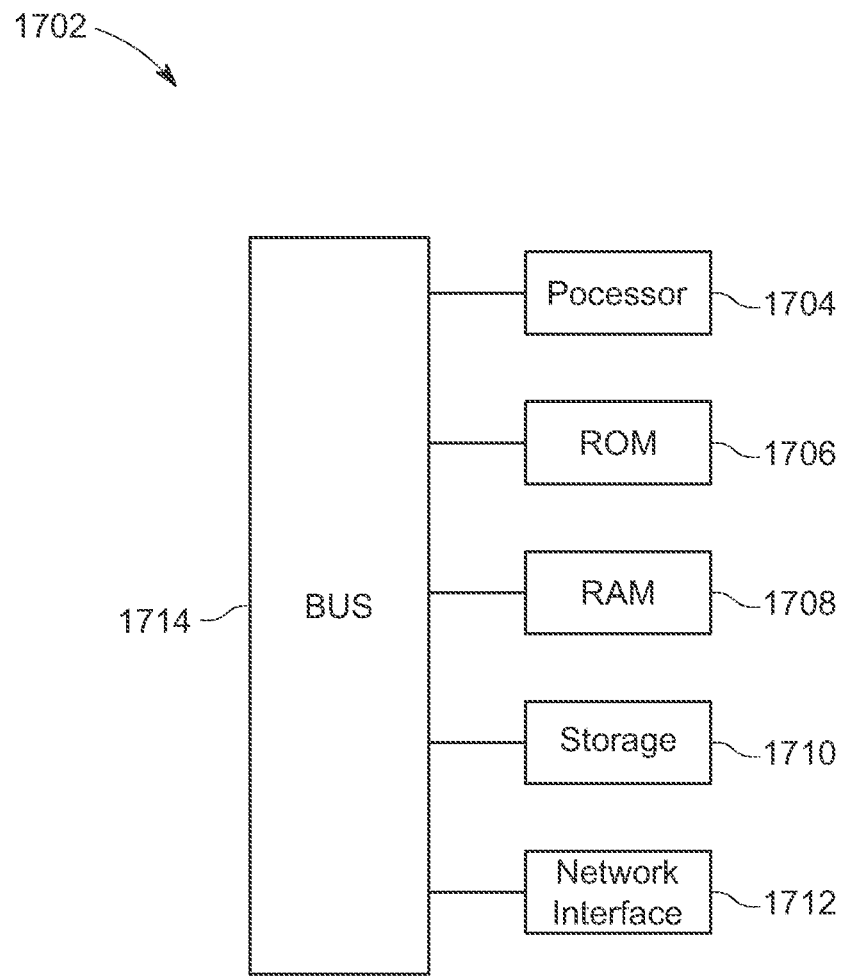
FIG. 17 is a block diagram illustrating exemplary components of a processing system.

FIG. 17 is a block diagram of a processing system 1702 according to one embodiment. The processing system can be used to implement the systems described above. The processing system includes at least one processor 1704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 1710, which may be a hard drive or flash drive. Read Only Memory (ROM) 1706 includes computer executable instructions for initializing the processor 1704, while the Random Access Memory (RAM) 1708 is the main memory for loading and processing instructions executed by the processor 1704. The network interface 1712 may connect to a cellular network or may interface with a smartphone or other device over a wired or wireless connection. The smartphone or other device can then provide the processing system with internet or other network access. Devices (1704, 1706, 1708, 1710, and 1712) of processing system 1702 are operably coupled in electric power and/or data communication with one another via at least one bus 1714.

The above-described systems, methods and software for virtual assistant routing provide a new and improved methodology and system architecture for processing and routing virtual assistant requests and responses thereto. Users of the systems, methods and software disclosed herein are provided with a more comfortable, user-friendly, responsive, and safe interface for making virtual assistant requests and receiving prompt and accurate responses from pertinent and reliable sources of information. Technical effects and user advantages such as these may be enjoyed in either single- or multi-user contexts, including vehicles such as automobiles. In environments such as driving or riding in an automobile, user(s) operating and/or otherwise interacting with the infotainment systems and related methods and software described above are provided with convenient and effective information and/or fulfillment of their various requests in manner that is less prone to cause undue distraction and discomfort for the driver, and thus safety and comfort of all vehicle occupants is significantly enhanced.

These and other substantial and numerous technical benefits and beneficial effects appreciable to persons of ordinary skill in the art are especially evident as compared to known systems and methods in applications involving virtual assistant routing. These improvements over known systems and methods are not accomplished by merely utilizing conventional and routine processing systems and methods. Even in cases where such improvements may be quantified in terms of request processing times, network communication speed and similar measures, over relevant time periods (e.g., from hours to years) and as compared to known processes, the disclosed systems and methods for virtual assistant routing utilize computing, network, memory, electric power, personnel, among other, resources at significantly greater efficiencies to provide improved user experiences in a wide variety of use environments.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed devices, systems, software, and methods without departing from the spirit and scope of what is disclosed. Such embodiments should be understood to fall within the scope of the present disclosure as determined based upon the claims and any equivalents thereof.

What is claimed is:

1. A method for processing requests from users of an infotainment system, comprising:
   receiving a request from a user of the infotainment system;
   determining a domain for the received request based on information contained in the received request, the domain specifying one or more categories for the request;
   routing the received request to a virtual assistant assigned to handle requests for the determined domain, wherein the virtual assistant is one of a plurality of virtual assistants respectively assigned to handle requests for a plurality of respectively assigned domains, wherein routing the received request to the virtual assistant comprises routing the received request to one of the plurality of virtual assistants respectively assigned to handle requests for the determined domain;
   receiving a designation of a default assistant that is different from the virtual assistants, and wherein routing the received request to the virtual assistant comprises:
      determining an availability of the one of the plurality of virtual assistants respectively assigned to handle requests for the determined domain; and
      if the one of the plurality of virtual assistants is available, then
         transmitting the request to the one of the plurality of virtual assistants, else,
      transmitting the request to the default virtual assistant; and
   transmitting a response to the request to the user, wherein:
   determining the availability of the one of the plurality of virtual assistants respectively assigned to handle requests for the determined domain comprises:
      if, after a first request transmission attempt, the one of the plurality of virtual assistants assigned to handle requests for the determined domain is not available, then
         for at least a second attempt, retransmitting the request to the one of the plurality of virtual assistants;
   transmitting the request to the default virtual assistant comprises transmitting the request to the default virtual assistant when, after the at least a second attempt, the one of the plurality of virtual assistants is not available; and
   the method further comprises:
      determining an availability of the default virtual assistant, wherein determining the availability of the default assistant comprises:
         if, after at least a first request transmission attempt, the default assistant is not available, then
            for at least a second attempt, retransmitting the request to the default virtual assistant; and
      when, after the at least a second attempt, the default virtual assistant is not available, then transmitting a message to the user indicating that no virtual assistants are available.

2. The method of claim 1, wherein:
   receiving the request comprises receiving the request as a compound request including two or more requests from the user;
   determining the domain for the received request comprises iteratively determining a respective domain for each of the two or more requests; and routing the received request to the virtual assistant comprises iteratively routing each of the two or more requests to the one of the plurality of virtual assistants assigned to handle requests for each respectively determined domain.

3. A method for processing requests from users of an infotainment system, comprising:
receiving a request from a user of the infotainment system, wherein receiving the request comprises receiving the request from the user as speech;
storing recorded audio of the received speech;
determining a domain for the received request based on information contained in the received request, the domain specifying one or more categories for the request, wherein determining the domain for the received request comprises determining the domain for the received request based on information contained in the speech;
routing the received request to a virtual assistant assigned to handle requests for the determined domain, wherein the virtual assistant is one of a plurality of virtual assistants respectively assigned to handle requests for a plurality of respectively assigned domains; and
receiving a user permission status from the user for whom the recorded audio of the request received as speech was stored to transmit the stored audio to a TTS engine for voice model generation; and
if an affirmative user permission status is received, then transmitting the stored audio to the TTS engine;
receiving the generated voice model from the TTS engine; and
storing the received voice model according to a user identity of the user for whom the recorded audio of the request received as speech was stored,
else,
deleting the stored audio of the user for whom the recorded audio of the request received as speech was stored.

4. The method of claim 3 further comprising transmitting a message to the user requesting a user permission status to transmit the stored audio to a text-to-speech (TTS) engine.

5. The method of claim 3 further comprising identifying a spoken language based on the information contained in the received speech, wherein transmitting the response to the request to the user comprises transmitting the response in the identified spoken language.

6. The method of claim 3 further comprising:
determining a spoken language of the user based on the received speech of the user; and
selecting a language model according to the determined spoken language for at least one of: speech to text conversion, and text to speech conversion, in one or more of the receiving, determining, routing, and transmitting steps of the method,
wherein transmitting the response to the request to the user comprises transmitting the response in the determined spoken language.

7. A method for processing requests from users of an infotainment system, comprising:
receiving a request from a user of the infotainment system, wherein receiving the request comprises receiving the request from the user as speech and receiving the request further comprises receiving a plurality of requests from a plurality of users of the infotainment system as a multi-user speech signal;
separating the multi-user speech signal into a plurality of individual speech signals for each of the plurality of users;
determining a domain for the received request based on information contained in the received request, the domain specifying one or more categories for the request, wherein determining the domain for the received request comprises determining the domain for the received request based on information contained in the speech;
routing the received request to a virtual assistant assigned to handle requests for the determined domain, wherein the virtual assistant is one of a plurality of virtual assistants respectively assigned to handle requests for a plurality of respectively assigned domains; and
transmitting a response to the request to the user;
determining a time of arrival (TOA) for each of the plurality of individual speech signals, wherein:
transmitting the response to the request to the user comprises iteratively transmitting a plurality of responses to each of the plurality of requests; and
iteratively transmitting the plurality of responses comprises one of:
transmitting the plurality of responses according to an ascending rank order of determined TOA; and
transmitting the plurality of responses according to a descending rank order of determined TOA, wherein:
receiving the plurality of requests comprises receiving the plurality of requests as a multi-user speech signal and separating the multi-user speech signal into a plurality of individual speech signals for each of the plurality of users.

8. A method for processing requests from users of an infotainment system, comprising:
receiving a request from a user of the infotainment system, wherein receiving the request comprises receiving the request from the user as speech and receiving the request further comprises receiving a plurality of requests from a plurality of users of the infotainment system as a multi-user speech signal;
separating the multi-user speech signal into a plurality of individual speech signals for each of the plurality of users;
determining a domain for the received request based on information contained in the received request, the domain specifying one or more categories for the request, wherein determining the domain for the received request comprises determining the domain for the received request based on information contained in the speech;
routing the received request to a virtual assistant assigned to handle requests for the determined domain, wherein the virtual assistant is one of a plurality of virtual assistants respectively assigned to handle requests for a plurality of respectively assigned domains; and
transmitting a response to the request to the user;
for each of the plurality of individual speech signals, determining a processing time for determining the domain for the received request based on the information contained in the received request, wherein:
transmitting the response to the request to the user comprises iteratively transmitting a plurality of responses to each of the plurality of requests; and
iteratively transmitting the plurality of responses comprises transmitting plurality of responses according to one of: an ascending rank order, and a descending rank order, of determined processing time, wherein:

receiving the plurality of requests comprises receiving the plurality of requests as a multi-user speech signal and separating the multi-user speech signal into a plurality of individual speech signals for each of the plurality of users.

9. A method for processing requests from users of an infotainment system, comprising:

receiving a request from a user of the infotainment system, wherein receiving the request comprises receiving the request from the user as speech and receiving the request further comprises receiving a plurality of requests from a plurality of users of the infotainment system as a multi-user speech signal;

separating the multi-user speech signal into a plurality of individual speech signals for each of the plurality of users;

determining a domain for the received request based on information contained in the received request, the domain specifying one or more categories for the request, wherein determining the domain for the received request comprises determining the domain for the received request based on information contained in the speech;

routing the received request to a virtual assistant assigned to handle requests for the determined domain, wherein the virtual assistant is one of a plurality of virtual assistants respectively assigned to handle requests for a plurality of respectively assigned domains; and transmitting a response to the request to the user, wherein:

each of the plurality of users are positioned in a respective one of a plurality of spatially-separated audio zones;

at least two of the plurality of spatially-isolated audio zones include a respective one or more audio loudspeakers; and the method further comprises determining a respective one or more of the plurality of spatially-separated audio zones from where one or more of the plurality of requests originated, wherein:

receiving the plurality of requests comprises receiving the plurality of requests as a multi-user speech signal and separating the multi-user speech signal into a plurality of individual speech signals for each of the plurality of users.

10. The method of claim 9, wherein transmitting the response to the request to the user comprises transmitting each of the plurality of responses to the respective one or more loudspeakers according to the determined respective one or more of the plurality of spatially-separated audio zones.

11. The method of claim 7 further comprising:

determining an identity of each of the plurality of users from whom one or more of the plurality of requests originated; and prepending a name of a respectively determined user identity to each of a plurality of responses to each of the plurality of requests, wherein transmitting the response to the request to the user comprises transmitting the name of the respectively determined user identity prior to transmitting the response.

* * * * *